United States Patent
Fee

(10) Patent No.: US 9,557,006 B2
(45) Date of Patent: Jan. 31, 2017

(54) CAMERA RIG AND ACCESSORIES

(71) Applicant: PROMARK INTERNATIONAL, INC., Bartlett, IL (US)

(72) Inventor: Patrick J. Fee, Pittsburgh, PA (US)

(73) Assignee: PROMARK INTERNATIONAL, INC., Bartlett, IL (US)

( * ) Notice: Subject to any disclaimer, the term of this patent is extended or adjusted under 35 U.S.C. 154(b) by 0 days.

(21) Appl. No.: 14/676,563

(22) Filed: Apr. 1, 2015

(65) Prior Publication Data
US 2015/0288858 A1 Oct. 8, 2015

Related U.S. Application Data

(60) Provisional application No. 61/974,323, filed on Apr. 2, 2014.

(51) Int. Cl.
*F16M 13/04* (2006.01)
*G03B 17/56* (2006.01)
*H04N 5/225* (2006.01)

(52) U.S. Cl.
CPC ............ *F16M 13/04* (2013.01); *G03B 17/561* (2013.01); *G03B 17/563* (2013.01); *H04N 5/2251* (2013.01)

(58) Field of Classification Search
CPC ..................... G03B 17/561; G03B 17/563
See application file for complete search history.

(56) References Cited

U.S. PATENT DOCUMENTS

| | | | | |
|---|---|---|---|---|
| 6,056,449 A * | 5/2000 | Hart | ........................ | F16M 13/04 396/421 |
| 8,128,295 B2 * | 3/2012 | Pizzo | ..................... | G03B 17/00 396/420 |
| 8,413,936 B2 * | 4/2013 | Wang | ..................... | F16M 11/10 248/155 |
| 8,477,238 B2 * | 7/2013 | Jannard | ................ | H04N 5/2252 348/372 |
| 8,534,934 B1 * | 9/2013 | Carney | .................. | F16M 11/02 248/178.1 |
| 8,567,952 B2 * | 10/2013 | Taylor | ................... | B66F 11/048 352/243 |
| D728,001 S * | 4/2015 | Zhan | ........................... | D16/243 |
| 9,039,307 B2 * | 5/2015 | Lecuna Aguerrevere | ........ | F16M 11/048 396/420 |
| 9,046,743 B2 * | 6/2015 | Koymen | ............. | G03B 17/561 |

(Continued)

FOREIGN PATENT DOCUMENTS

JP 2012091597 5/2012

OTHER PUBLICATIONS

Zacuto QR Dovetail plate, known and accessible to the public at least prior to Apr. 2014, retrieved from the Internet at http://store.zacuto.com/qr-dovetail/, 2 pages.

(Continued)

*Primary Examiner* — Albert Cutler
(74) *Attorney, Agent, or Firm* — Michael Best & Friedrich, LLP

(57) ABSTRACT

A support assembly for a camera rig. The support assembly includes a frame having a first end and a second end and a positioning member movably coupled to the frame. The positioning member is configured to removably secure a camera. A support member presents a mounting surface and is pivotably coupled to the frame adjacent the first end or the second end.

14 Claims, 64 Drawing Sheets

(56) References Cited

U.S. PATENT DOCUMENTS

| | | | |
|---|---|---|---|
| 2002/0168189 A1 | 11/2002 | Mulcahy | |
| 2010/0243014 A1* | 9/2010 | Shires | E04H 15/42 |
| | | | 135/124 |
| 2010/0254696 A1 | 10/2010 | McKay | |
| 2013/0336644 A1 | 12/2013 | Schultz et al. | |
| 2013/0336645 A1 | 12/2013 | Chapman | |
| 2014/0099092 A1* | 4/2014 | Di Leo | G03B 17/563 |
| | | | 396/420 |

OTHER PUBLICATIONS

Zacuto QR Shoulder Pad, known and accessible to the public at least prior to Apr. 2014, retrieved from the Internet at http://store.zacuto.com/qr-shoulder-pad/, 2 pages.

Zacuto Mini DSLR Baseplate, known and accessible to the public at least prior to Apr. 2014, retrieved from the Internet at http://store.zacuto.com/mini-dslr-baseplate/, 2 pages.

Redrockmicro DSLR Field Cinema V2, Nikon Gold—Limited Edition, known and accessible to the public at least prior to Apr. 2014, retrieved from the Internet at http://store.redrockmicro.com/Catalog/DSLRShoulderMountedRigs/Nikon-Gold-FieldCinema.html, 1 page.

Shape Sony FS7, known and accessible to the public at least prior to Apr. 2014, retrieved from the Internet at http://www.shapewlb.com/en/sony-fs7.aspx, 2 pages.

Ikan DSLR Shoulder Rig w/ Follow Focus and Counter Weights (Tilta) known and accessible to the public at least prior to Apr. 2014, retrieved from the Internet at http://ikancorp.com/productlisting.php?id=227, 2 pages.

Wooden Camera Shoulder Rig v2 (Premium, Brown Leather), known and accessible to the public at least prior to Apr. 2014, retrieved from the Internet at http://woodencamera.com/Shoulder-Rig-v2-Premium-Brown-Leather.html, 1 page.

Shape 8000 V-Lock Quick Release Baseplate (Without Handles), known and accessible to the public at least prior to Apr. 2014, retrieved from the Internet at http://www.shapewlb.com/en/product/products/shape-support/baseplate-series/8000-v-lock-quick-release-baseplate-__295.aspx?id__page__parent=200, 2 pages.

Ikan 15 mm Vct-U14 Quick Release Base Plate (Tilta), known and accessible to the public at least prior to Apr. 2014, retrieved from the Internet at http://ikancorp.com/productdetail.php?id=705, 2 pages.

Sony VCT14 Tripod Adaptor, known and accessible to the public at least prior to Apr. 2014, retrieved from the Internet at https://pro.sony.com/bbsc/ssr/product-VCT14/, 1 page.

International Search Report and Written Opinion for Application No. PCT/US2015/033550 dated Dec. 30, 2015 (10 pages).

* cited by examiner

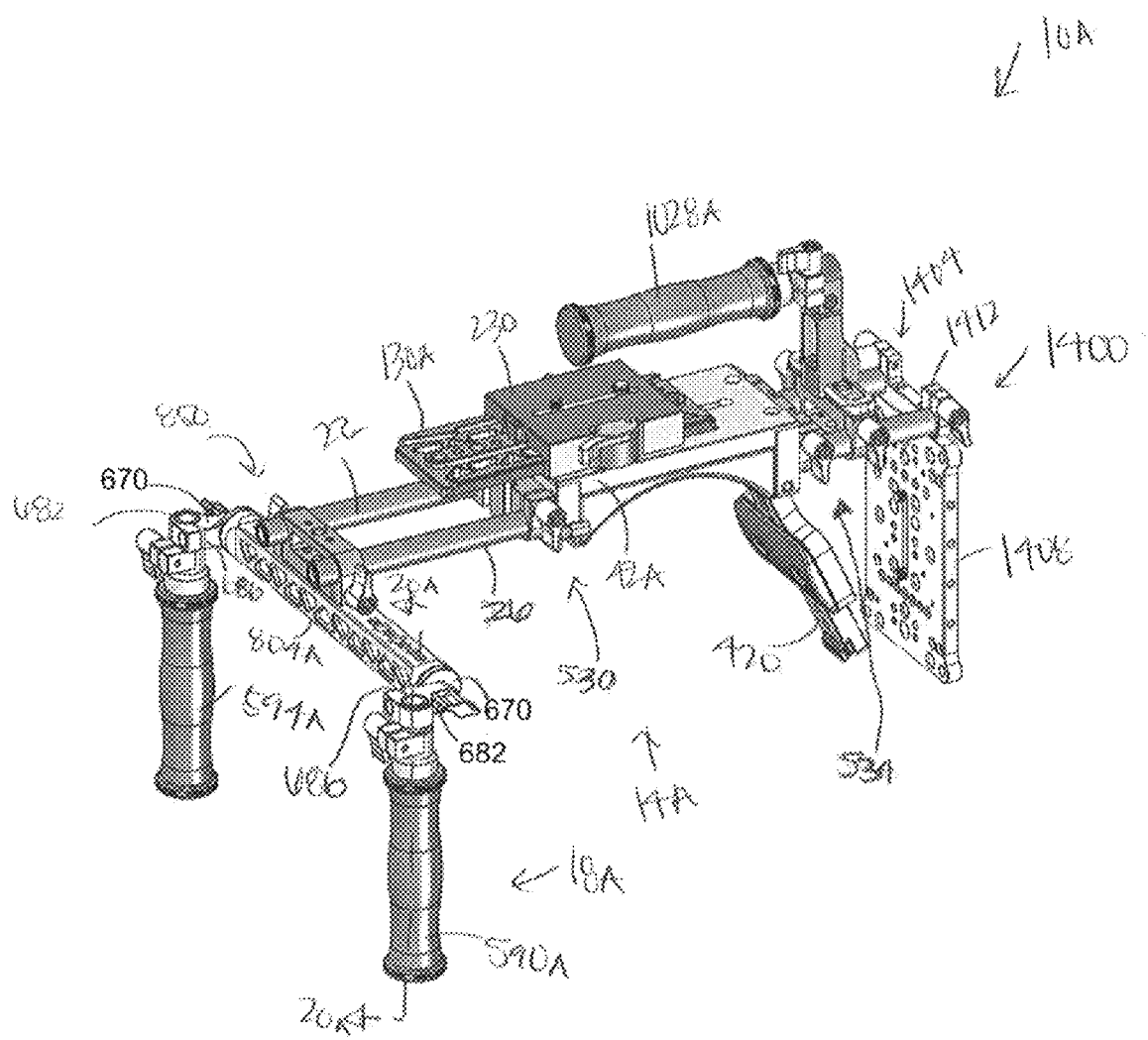

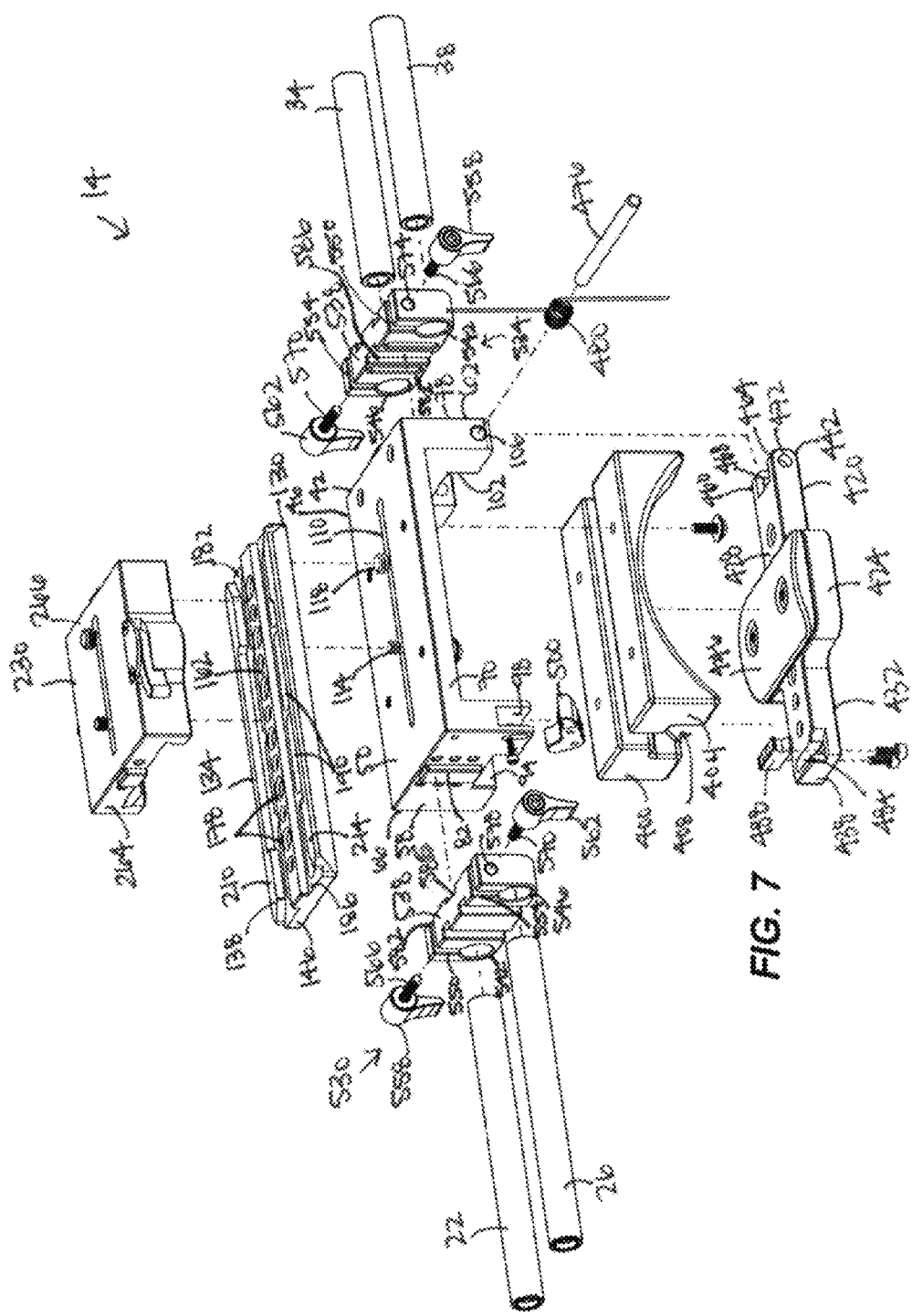

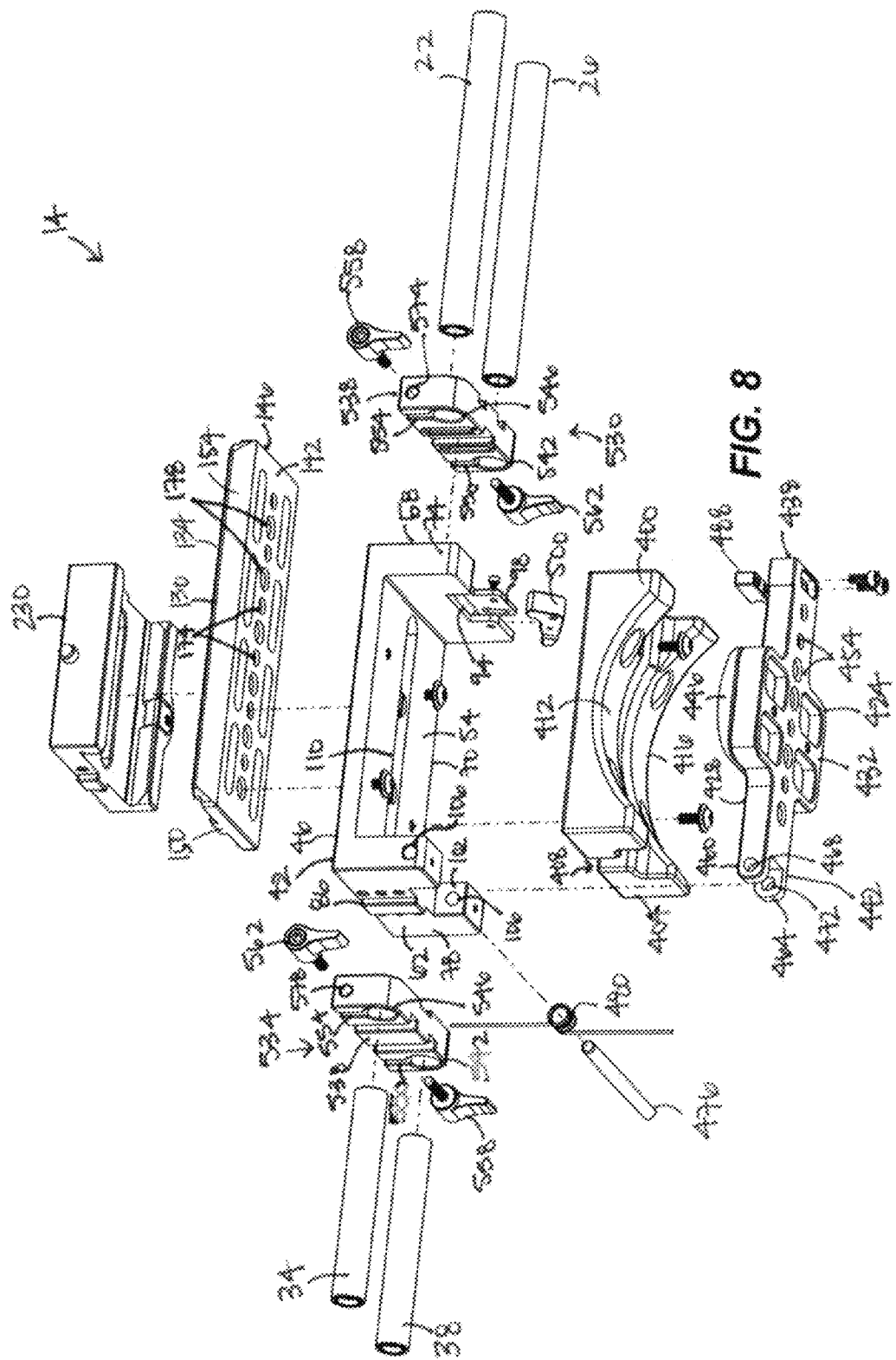

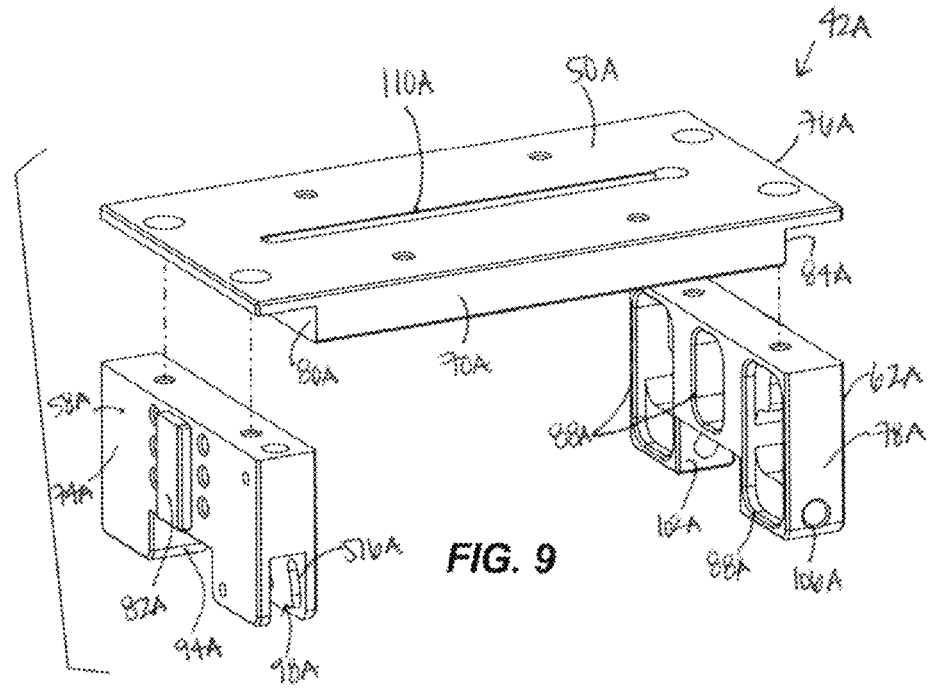
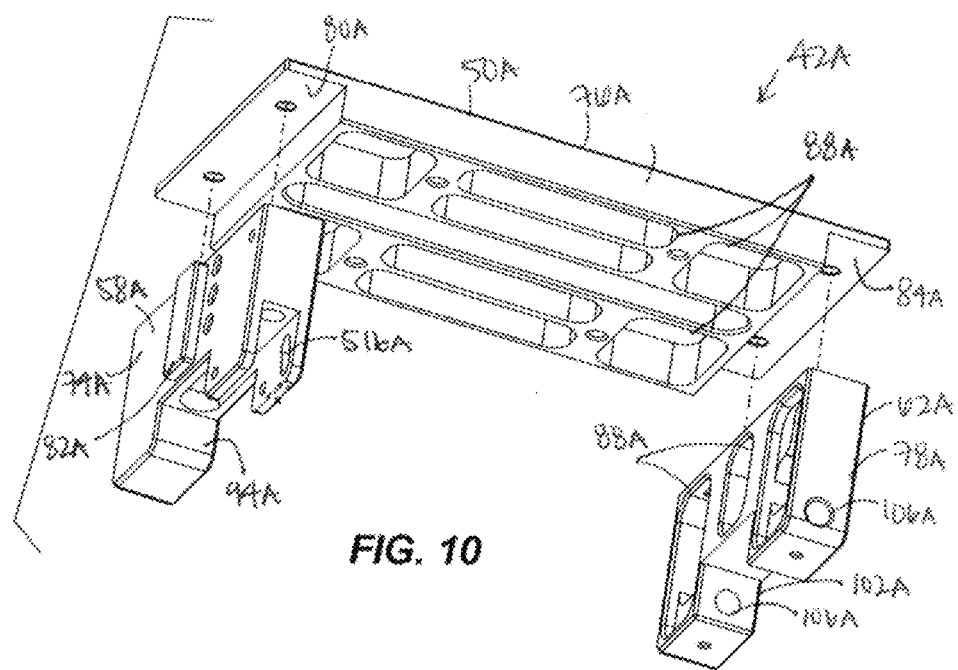

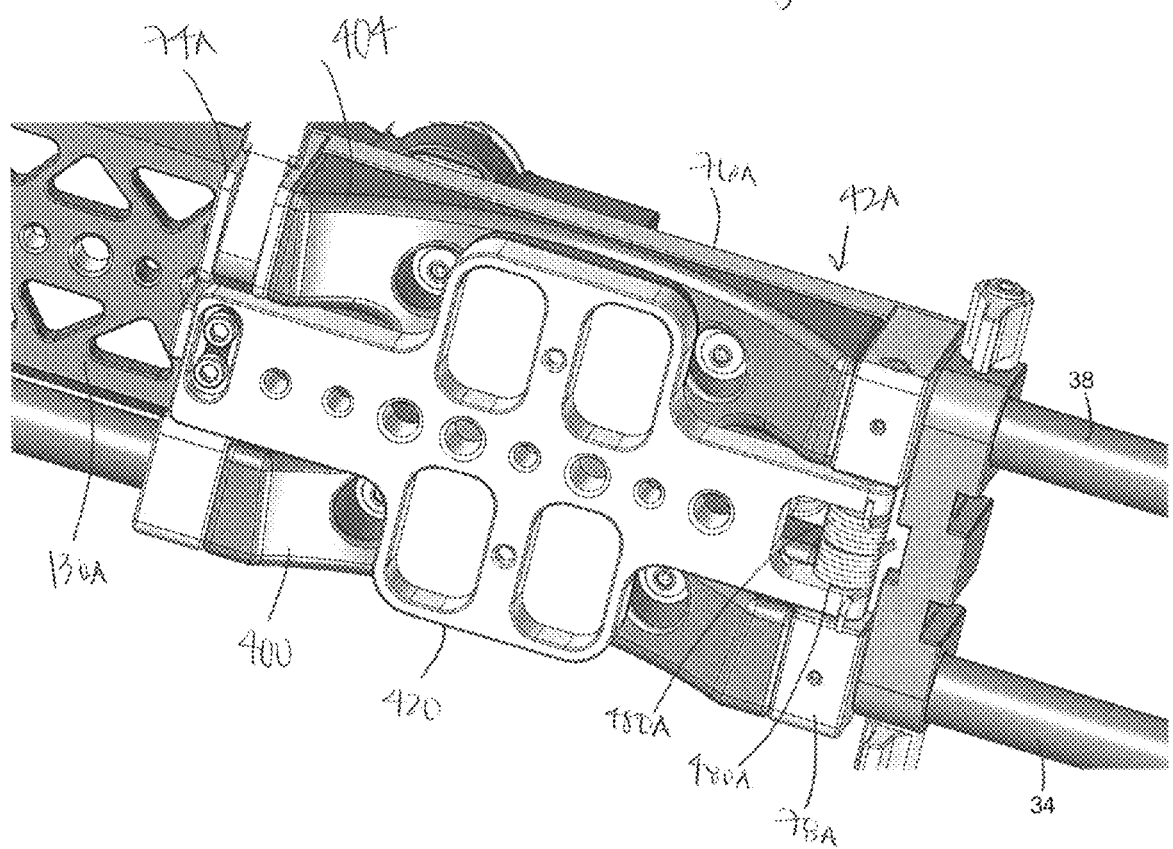

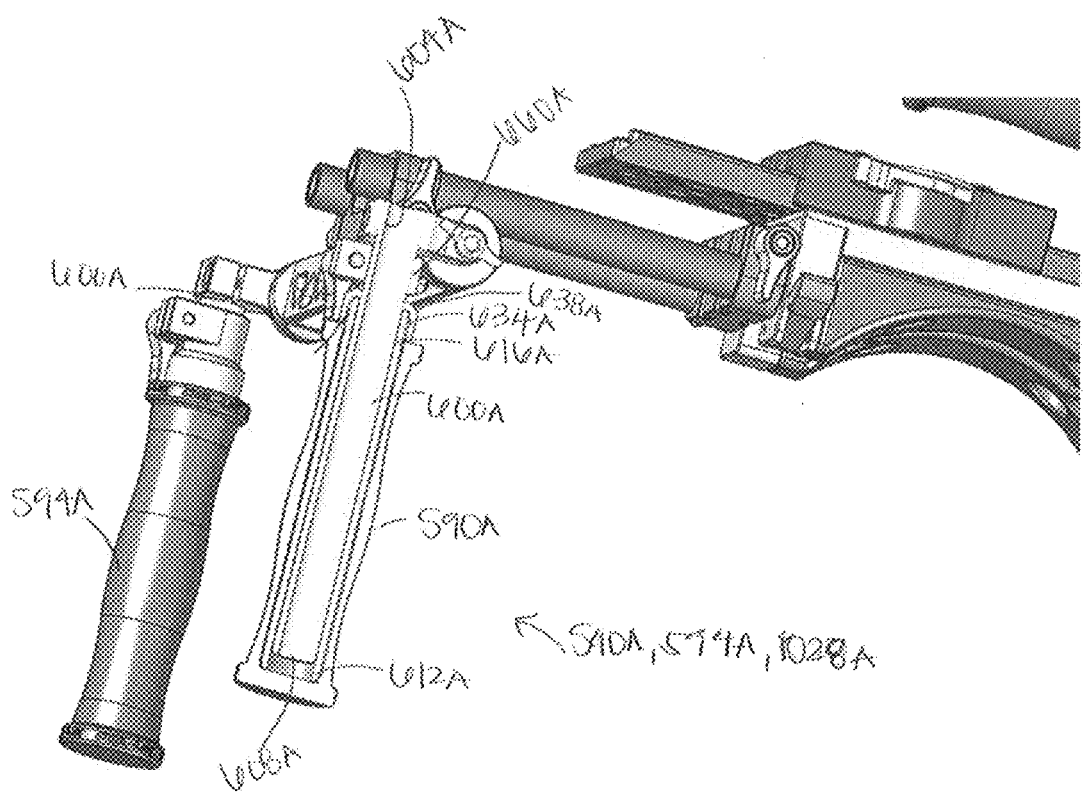

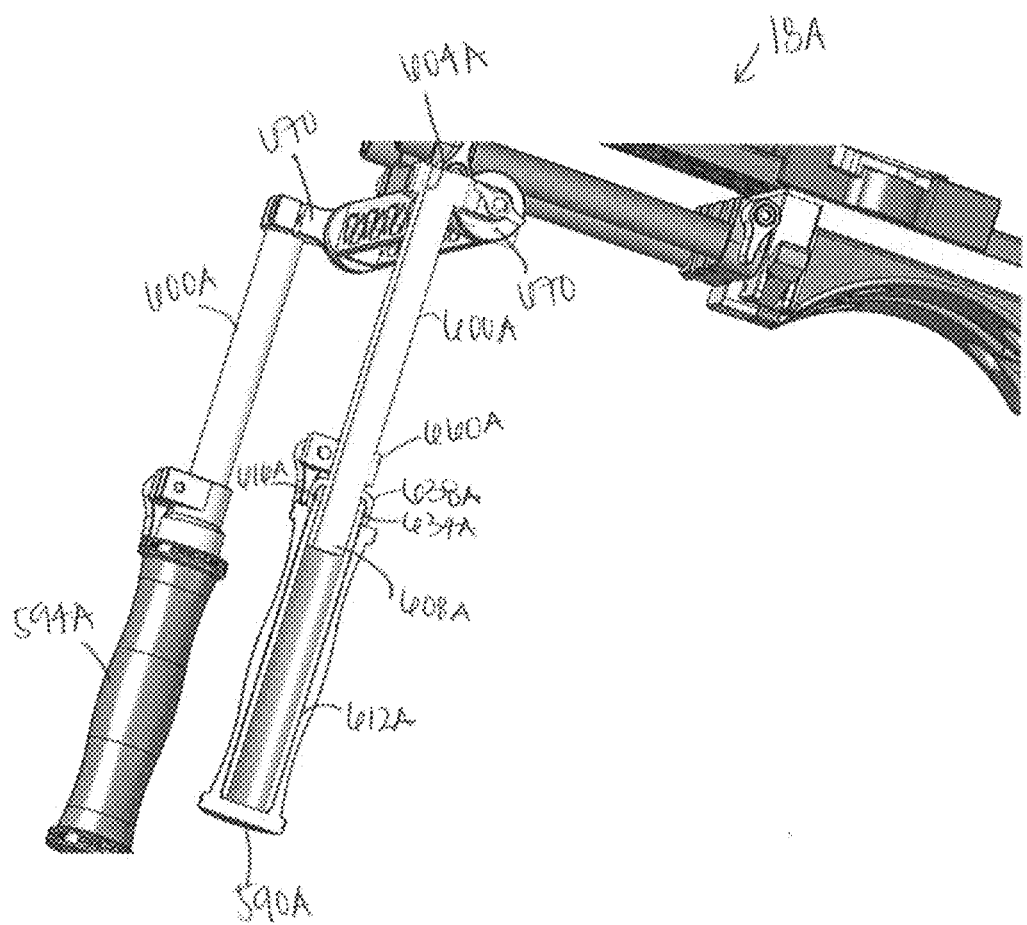

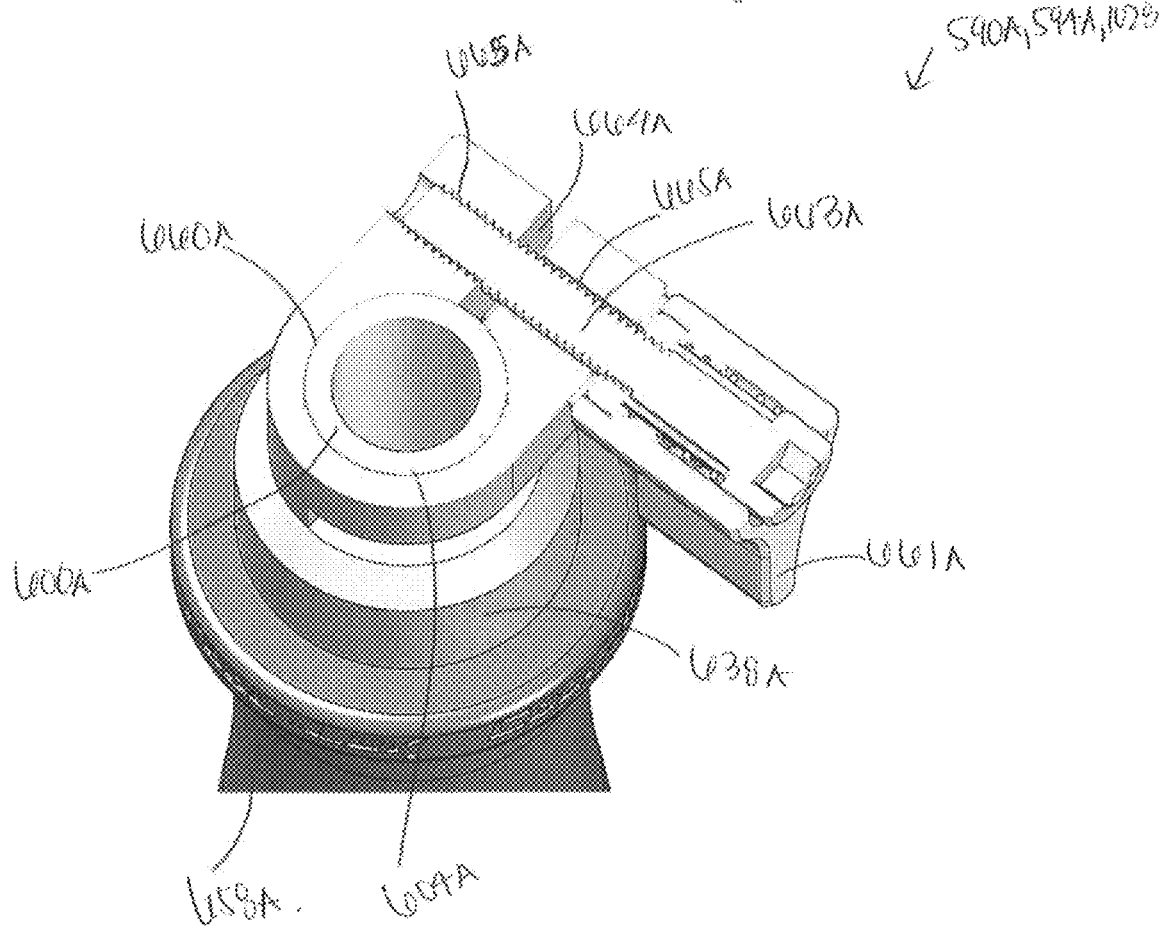

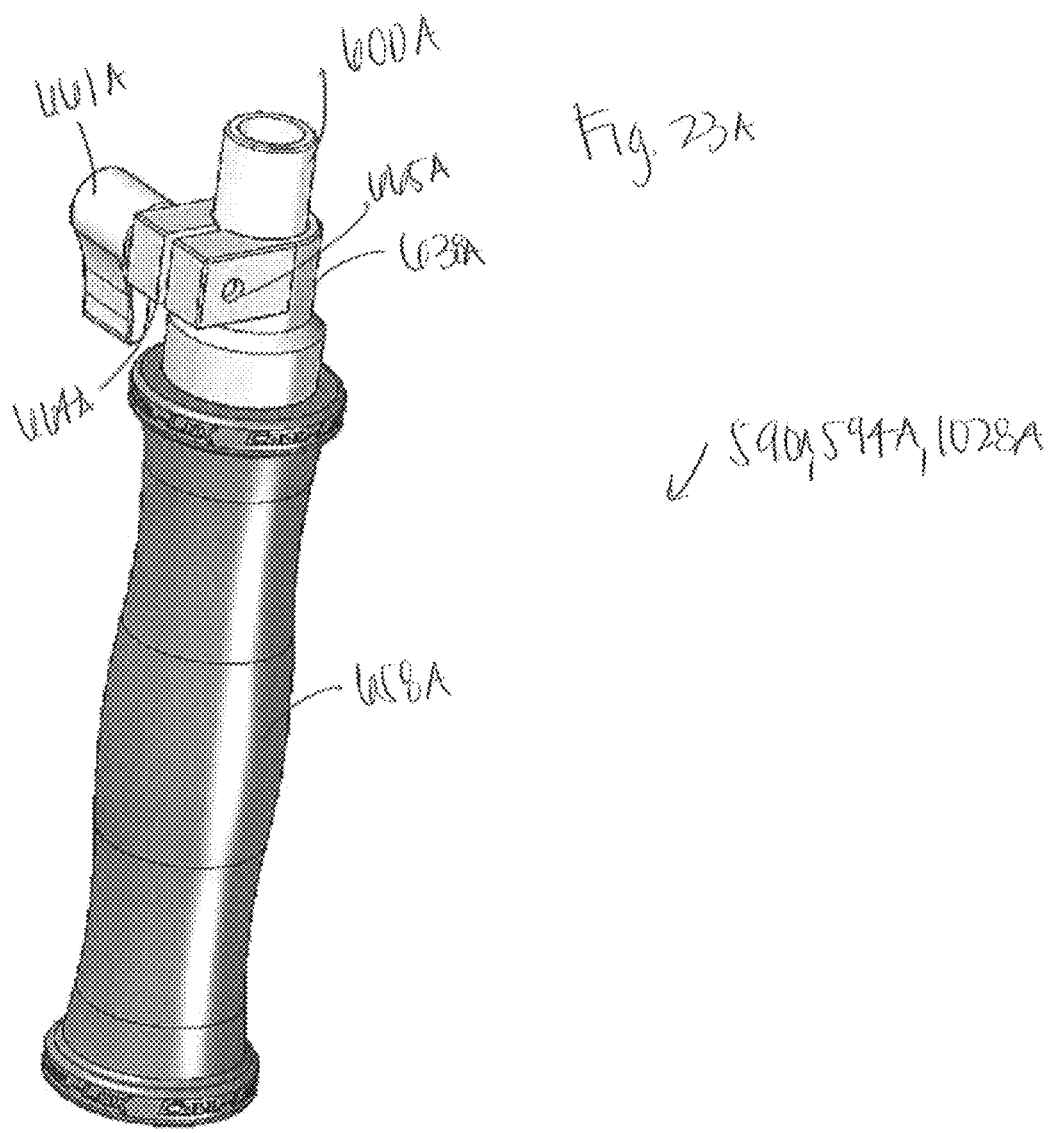

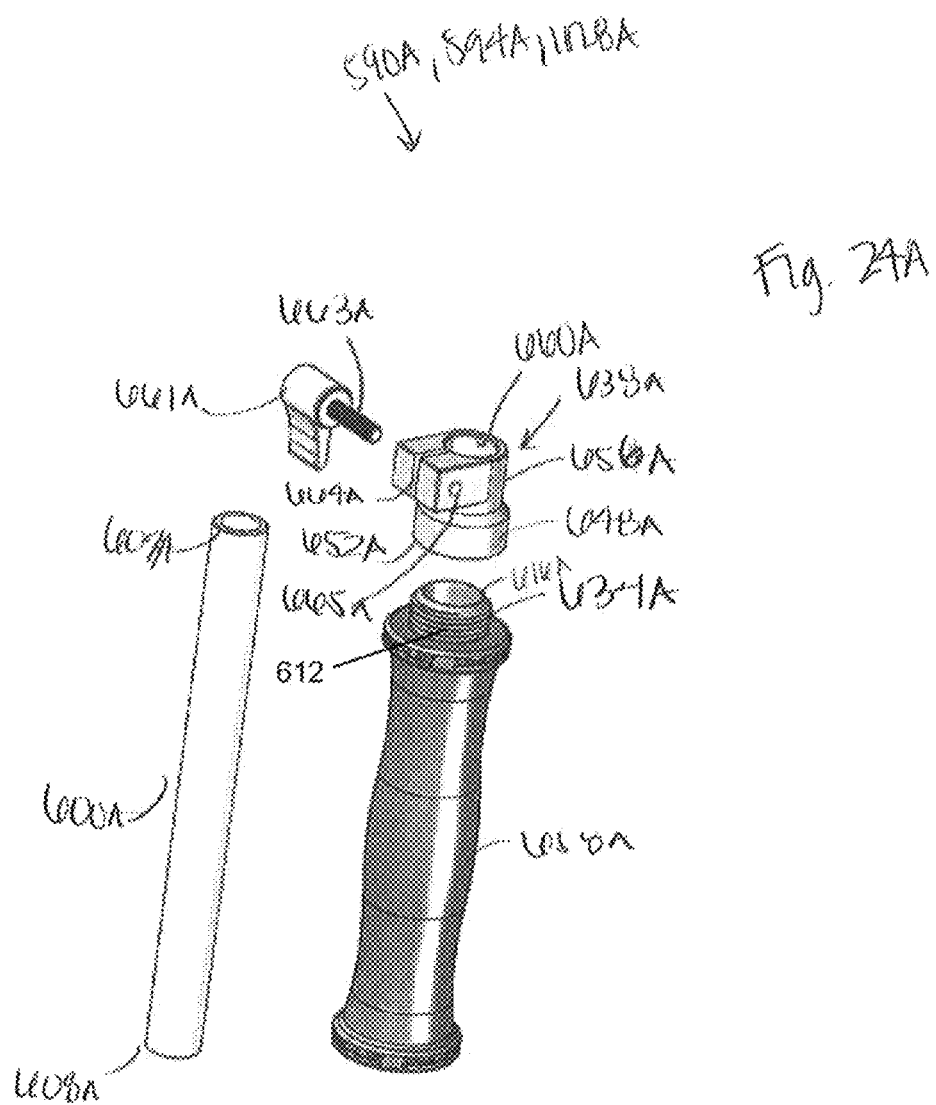

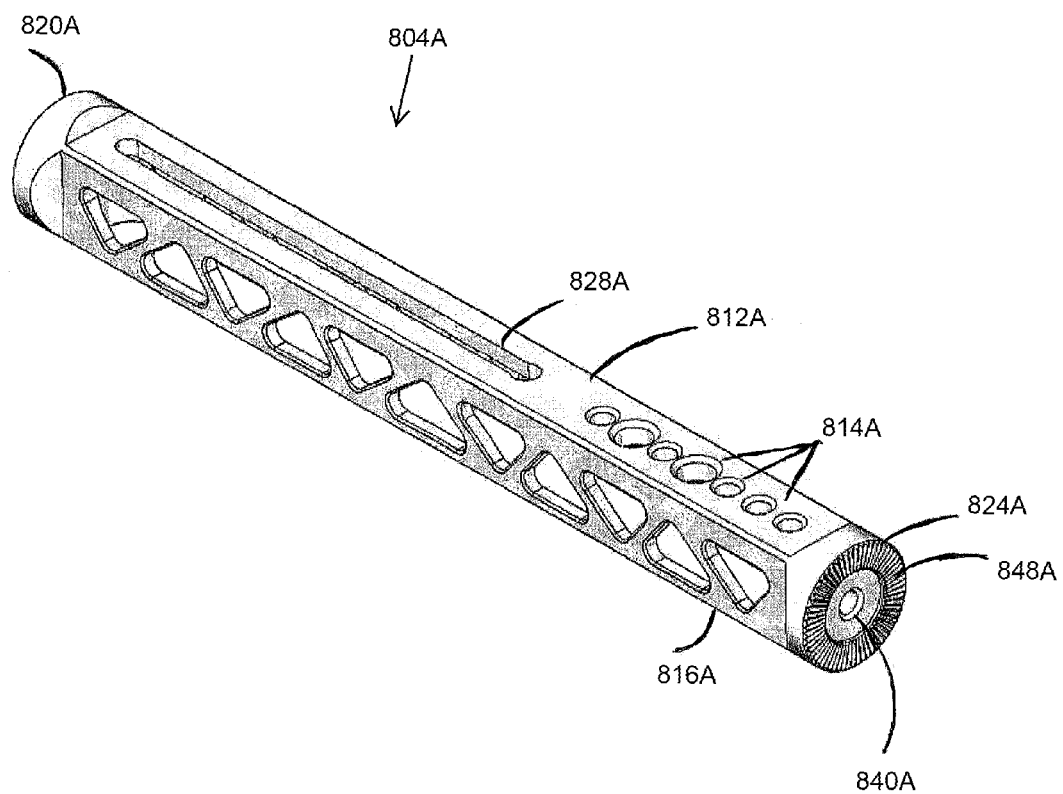

Fig. 37
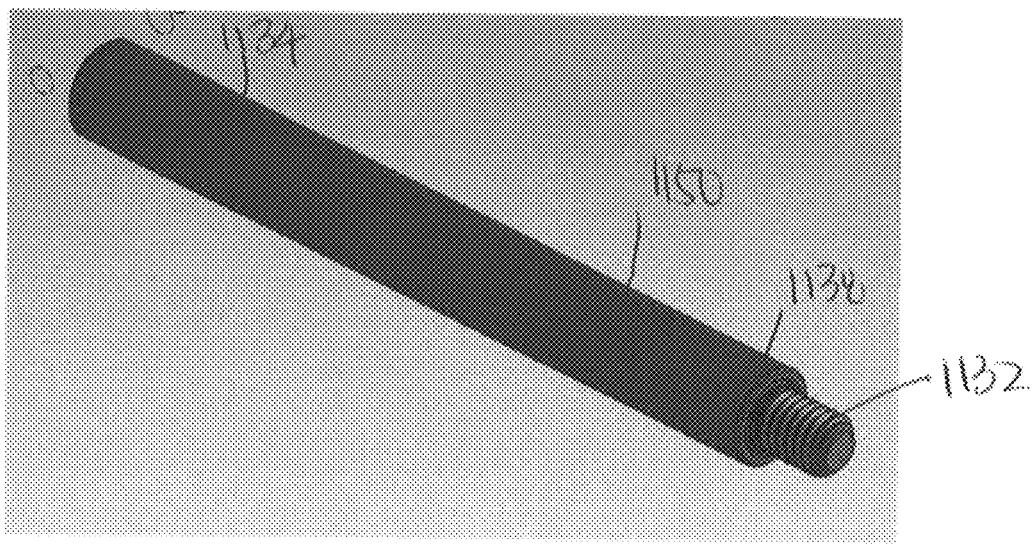
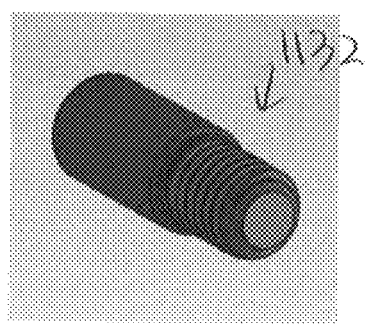
Fig. 38

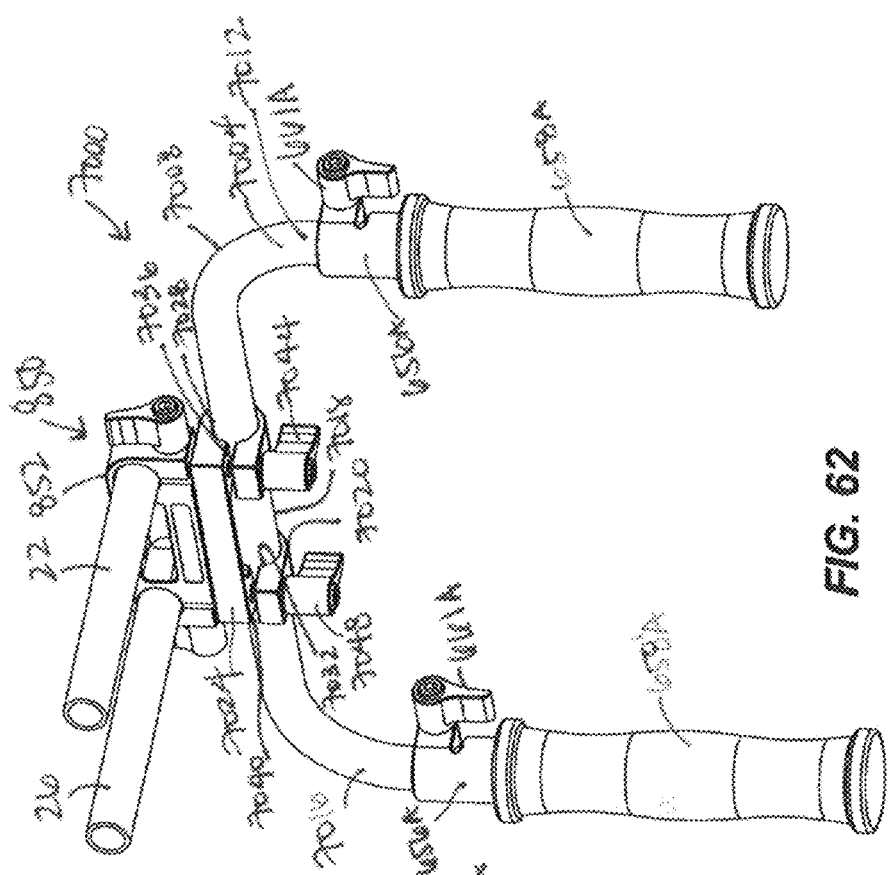
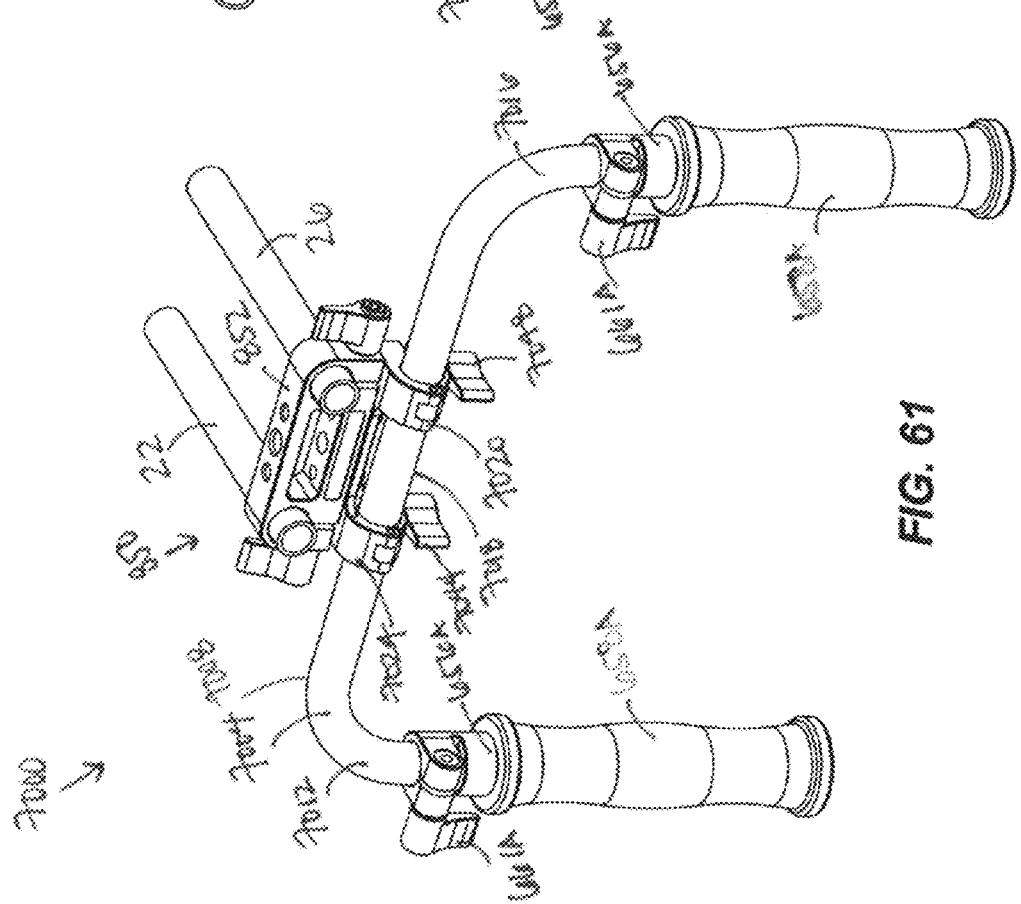
FIG. 61
FIG. 62

CAMERA RIG AND ACCESSORIES

CROSS-REFERENCE TO RELATED APPLICATIONS

This application claims priority to U.S. Provisional Patent Application No. 61/974,323 filed on Apr. 2, 2014, the entire content of which is incorporated herein by reference.

BACKGROUND

The present invention relates to a camera rig and accessories for the same.

SUMMARY

In one embodiment the disclosure provides a support assembly for a camera rig. The support assembly includes a frame having a first end and a second end and a positioning member movably coupled to the frame. The positioning member is configured to removably secure a camera. A support member presents a mounting surface and is pivotably coupled to the frame adjacent the first end or the second end.

In another embodiment the disclosure provides a camera rig including a frame having a first leg and a second leg. A positioning member is translatable along the frame, wherein the positioning member is configured for affixing a camera thereto. A support member pivotably coupled to the frame member at one of the first and second legs. The support member is securable to a surface. A counterweight assembly is couplable to the first leg or the second leg of the frame member. A handle assembly is couplable to the other of the first leg or the second leg of the frame. The handle assembly includes first and second handles retractable and extendable in a telescoping manner.

BRIEF DESCRIPTION OF THE DRAWINGS

FIGS. 1A and 2A are front perspective views of another camera rig including a main support assembly, a handle assembly, and an accessory mount.

FIGS. 7 and 8 are exploded views of a main support assembly of the camera rig illustrated in FIGS. 1 and 2.

FIGS. 9 and 10 are exploded views of an alternative shoulder support member of the main support assembly illustrated in FIGS. 1A and 2A.

FIG. 12A is a perspective view of another positioning member as illustrated in FIGS. 1A and 2A.

FIG. 18A is an enlarged partial view of the camera rig of FIGS. 1A and 2A.

FIG. 20A is a section view taken along line 20A-20A of FIG. 1A.

FIG. 21A is a section view taken along line 21A-21A of FIG. 2A.

FIG. 22A is a detailed view of a portion of FIG. 20A.

FIG. 23A is a perspective view of a handle of the handle assembly illustrated in FIGS. 1A and 2A.

FIG. 24A is an exploded view of the handle of FIG. 23A.

FIG. 31A is a perspective view of another support member of as illustrated in FIGS. 1A and 2A.

FIG. 37 is a perspective view of a carbon fiber rod including a male insert.

FIG. 38 is a perspective view of the male insert illustrated in FIG. 37.

FIGS. 61 and 62 are perspective views of the handle assembly of FIG. 50.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. And as used herein and in the appended claims, the terms "upper", "lower", "top", "bottom", "front", "back", and other directional terms are not intended to require any particular orientation, but are instead used for purposes of description only.

Figure 1:
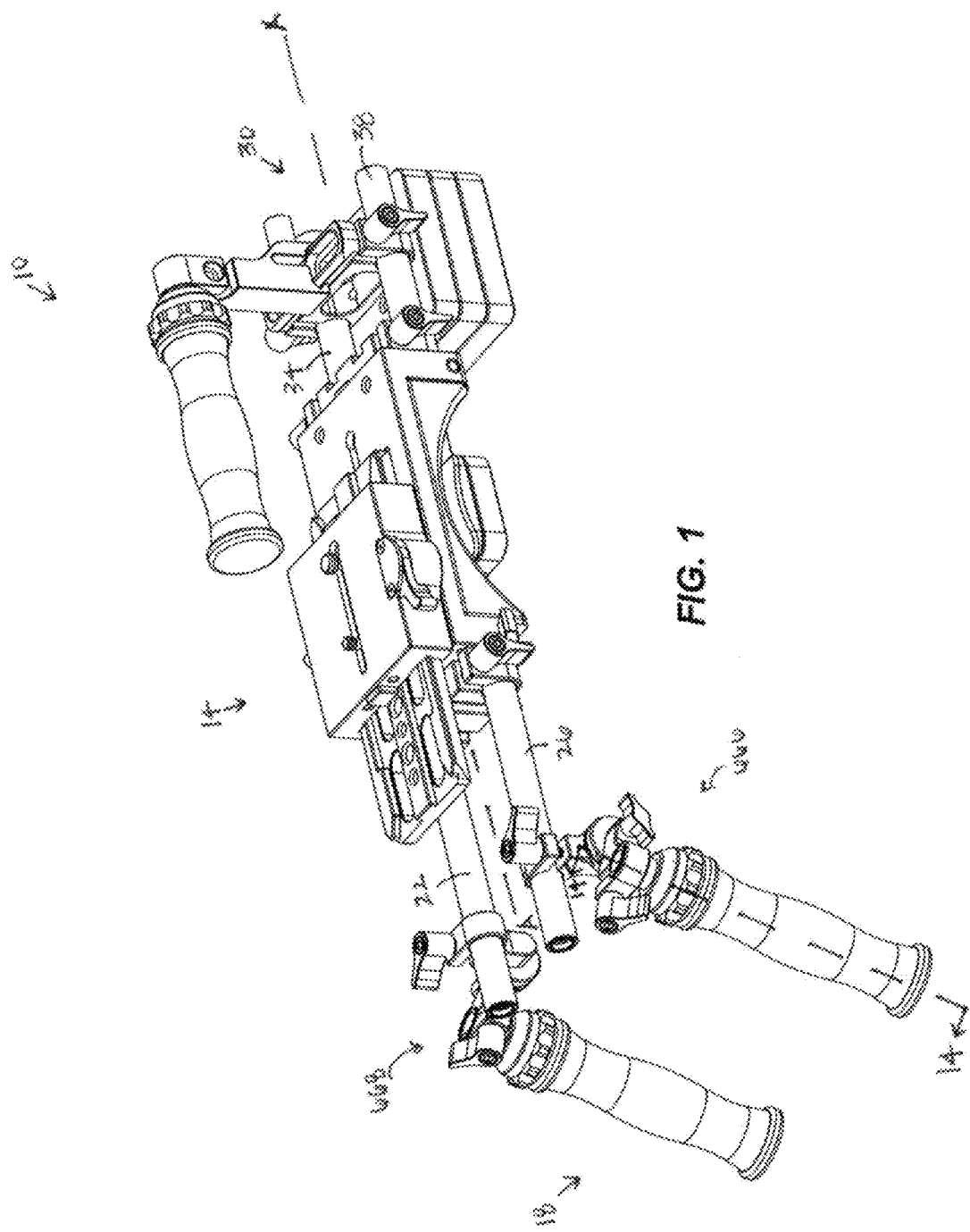
FIGS. 1 and 2 are front perspective views of a camera rig including a main support assembly, a handle assembly, and a counterweight assembly.

A camera rig 10 is generally shown in FIGS. 1, 2, and 3-6 and includes a main or dual-purpose support assembly 14 coupled to a handle assembly 18 by a first pair of carbon fiber rods 22, 26 and to a counterweight assembly 30 by a second pair of carbon fiber rods 34, 38. The camera rig 10 defines a longitudinal axis A (FIG. 1). An alternative camera rig 10A shown in FIGS. 1A and 2A includes a main support assembly 14A coupled to a handle assembly 18A, with components generally referenced with an appended "A" and differences further detailed below.

With further reference to FIGS. 7 and 8, the main support assembly 14 includes a shoulder support member 42 with a frame or body 46 having a top surface 50, a bottom surface 54, front side 58, back side 62, a first side 66, and a second side 70. A first leg 74 is integrally formed as one piece with or is otherwise coupled to the front side 58 thereby defining a first end and a second leg 78 is integrally formed as one piece with or is otherwise coupled to the back side 62 thereby defining a second end. Each of the legs 74, 78 includes an elongated alignment projection 82, 86 oriented perpendicularly to the longitudinal axis A. The first leg 74 forms a first notch 94 extending from the front side 58 therethrough and a recess 98 extending from the second side 70. The second leg 78 forms a second notch 102 extending from the second side 62 therethrough and an aperture 106 passing from the first side 66 to the second side 70 and generally transverse to axis A.

The top surface 50 includes an elongated slot 110 parallel to the longitudinal axis A and through which extends a pair of threaded fasteners 114, 118. In one embodiment, the fasteners 114, 118 may be differently sized. The diameter of the projecting end of each fastener 114, 118 is larger than a width of the slot 110, while the diameter of each shaft of fasteners 114, 118 is smaller than the width of the slot 110. As such, the fasteners 114, 118 are slidable along the length of the slot 110 but will not fall through the slot 110 if not otherwise secured.

Figure 2:
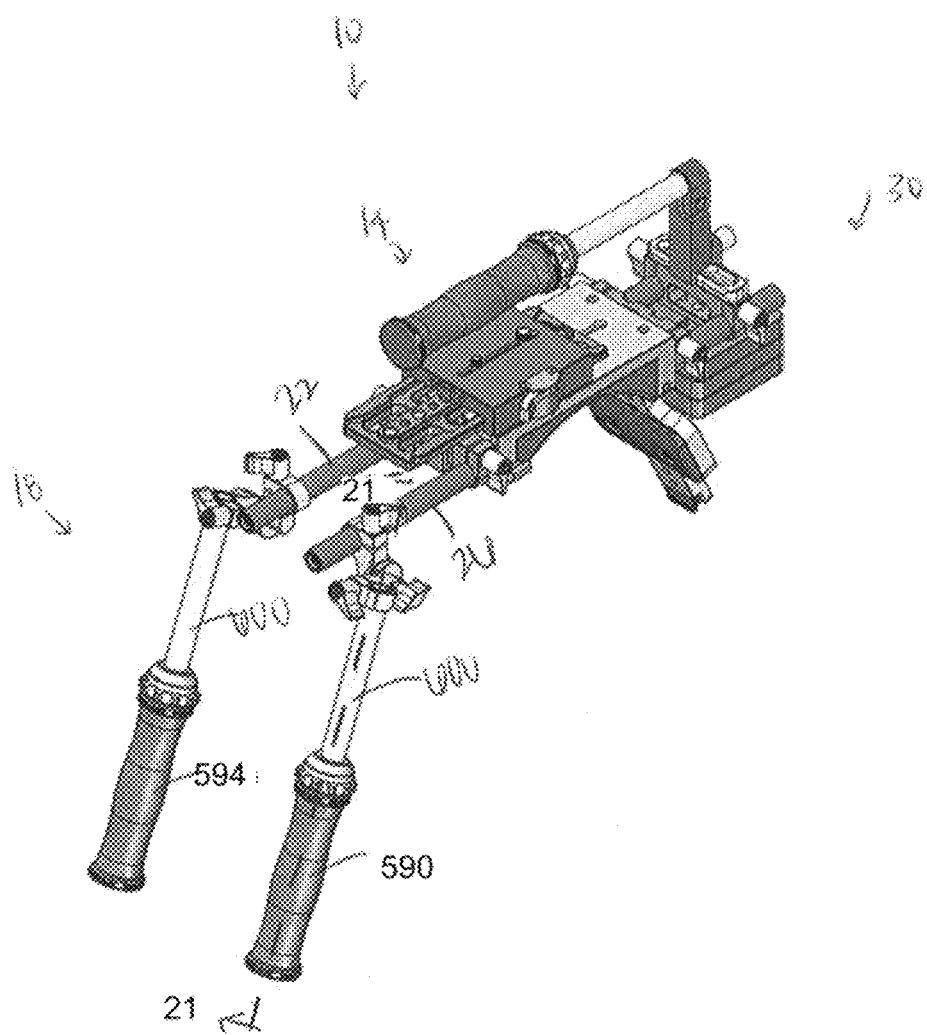
Figure 2A:
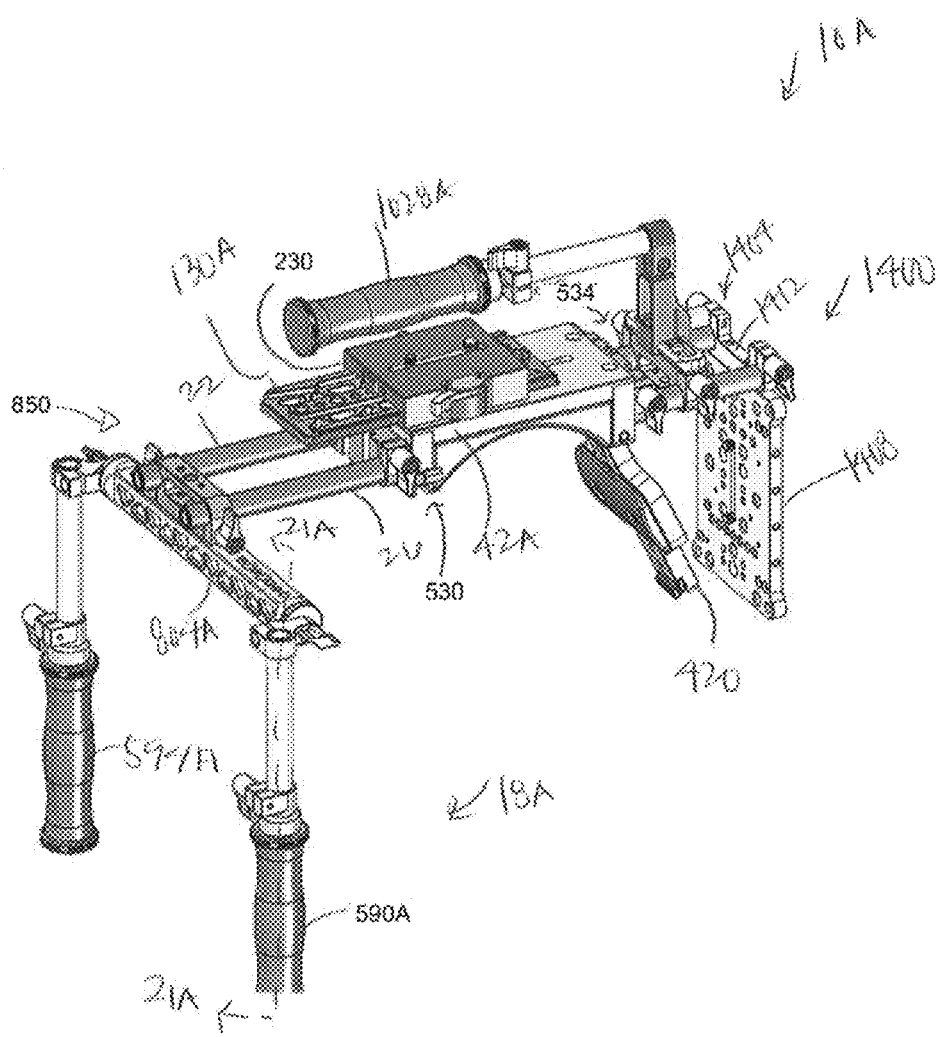
Figure 3:
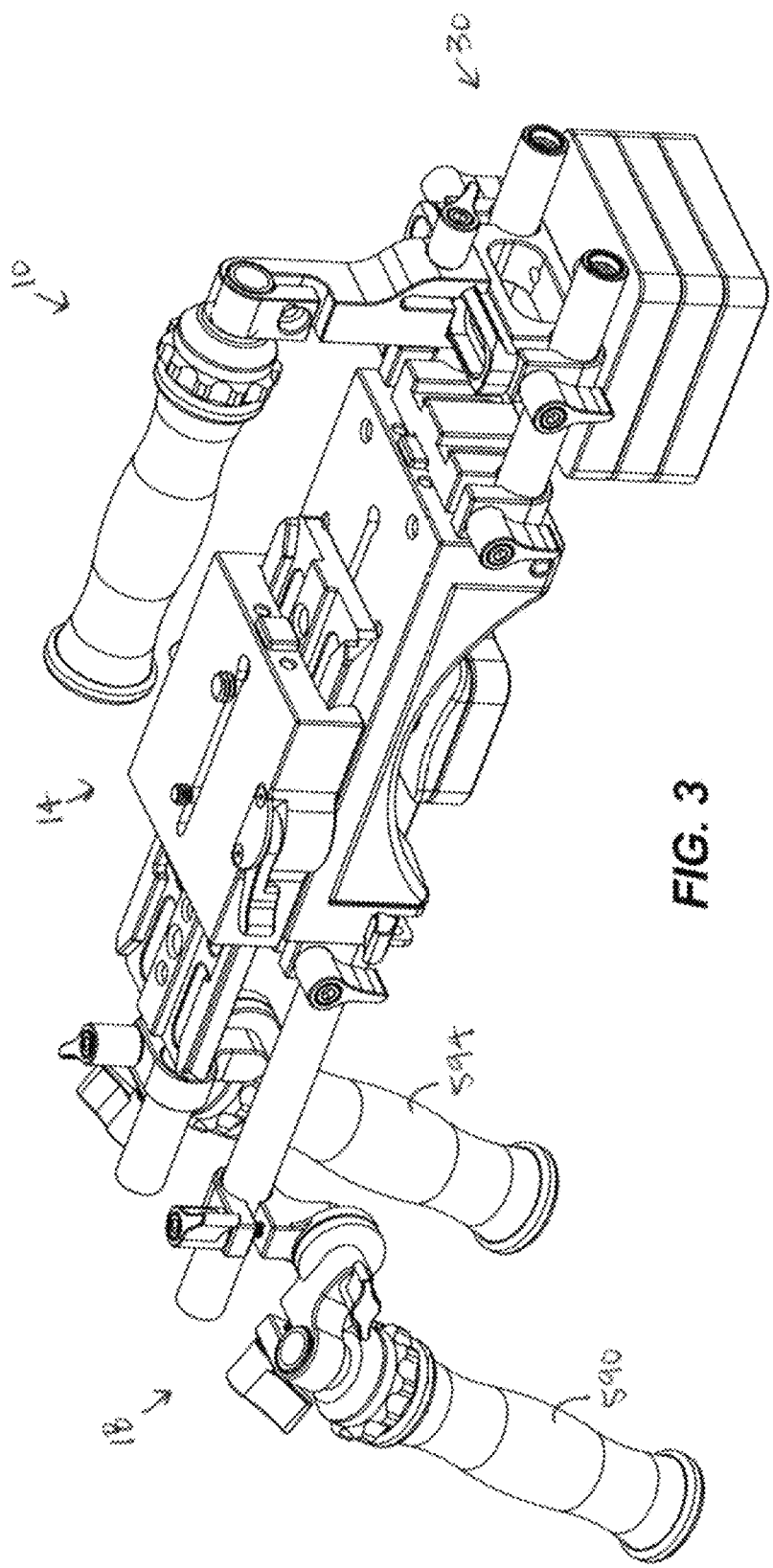
FIGS. 3 and 4 are rear perspective views of the camera rig illustrated in FIGS. 1 and 2.

Referring to FIGS. 9 and 10, and also illustrated in FIGS. 1A and 2A, an alternative shoulder support member 42A is not integrally formed as one piece, but includes a first leg 74A and a second leg 78A coupled to a center member 76A by fasteners (i.e., screws and the like, not shown). The center member 76A includes first and second cutaways 80A, 84A on opposite ends thereof that are sized and shaped to receive the first and the second legs 74A, 78A, respectively. The cutaways 80A, 84A ensure that the front and rear surfaces of the center member 76A are flush with the first leg 74A and the second leg 78A. Additionally, the first leg 74A, the second leg 78A, and the center member 76A each include extruded portions 88A for weight reduction.

Figure 11:
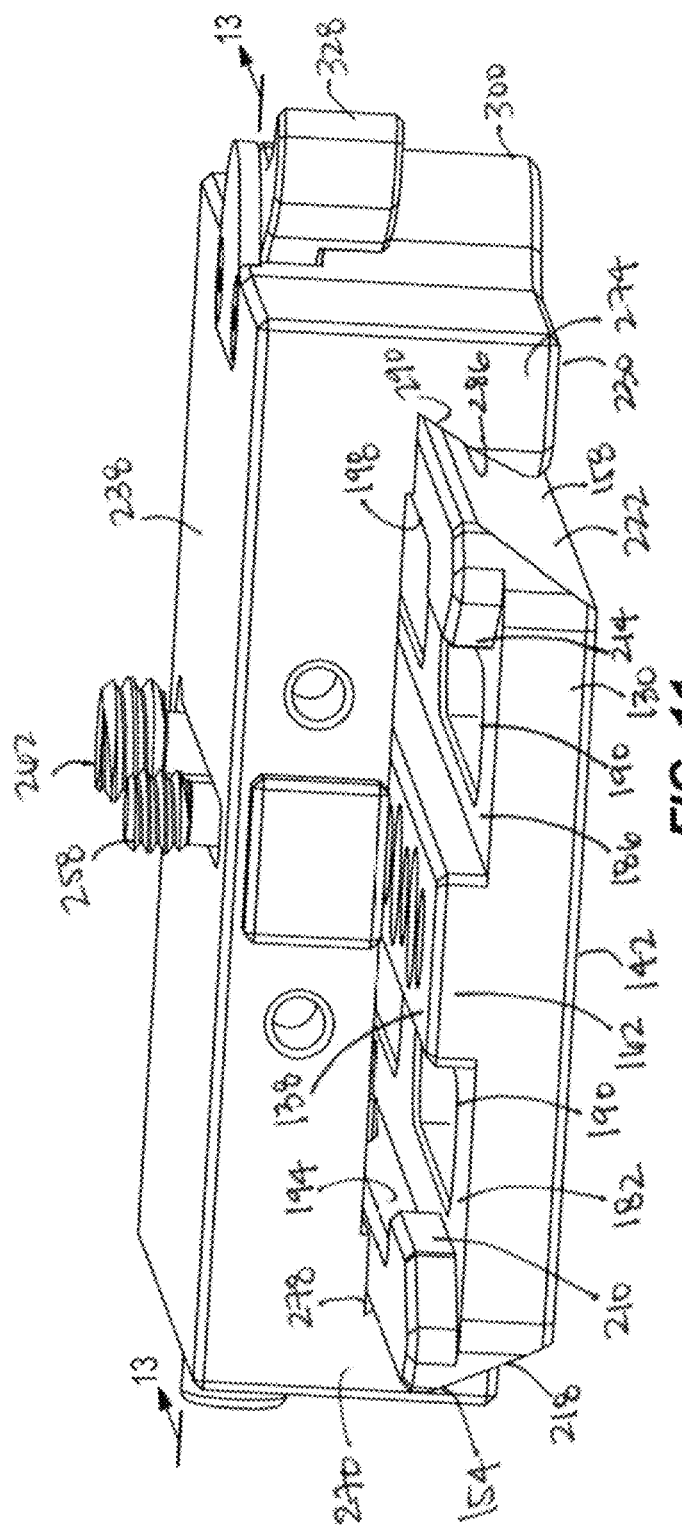
FIG. 11 is a perspective view of a camera mount and a positioning member of the main support assembly illustrated in FIGS. 1 and 2.
Figure 12:
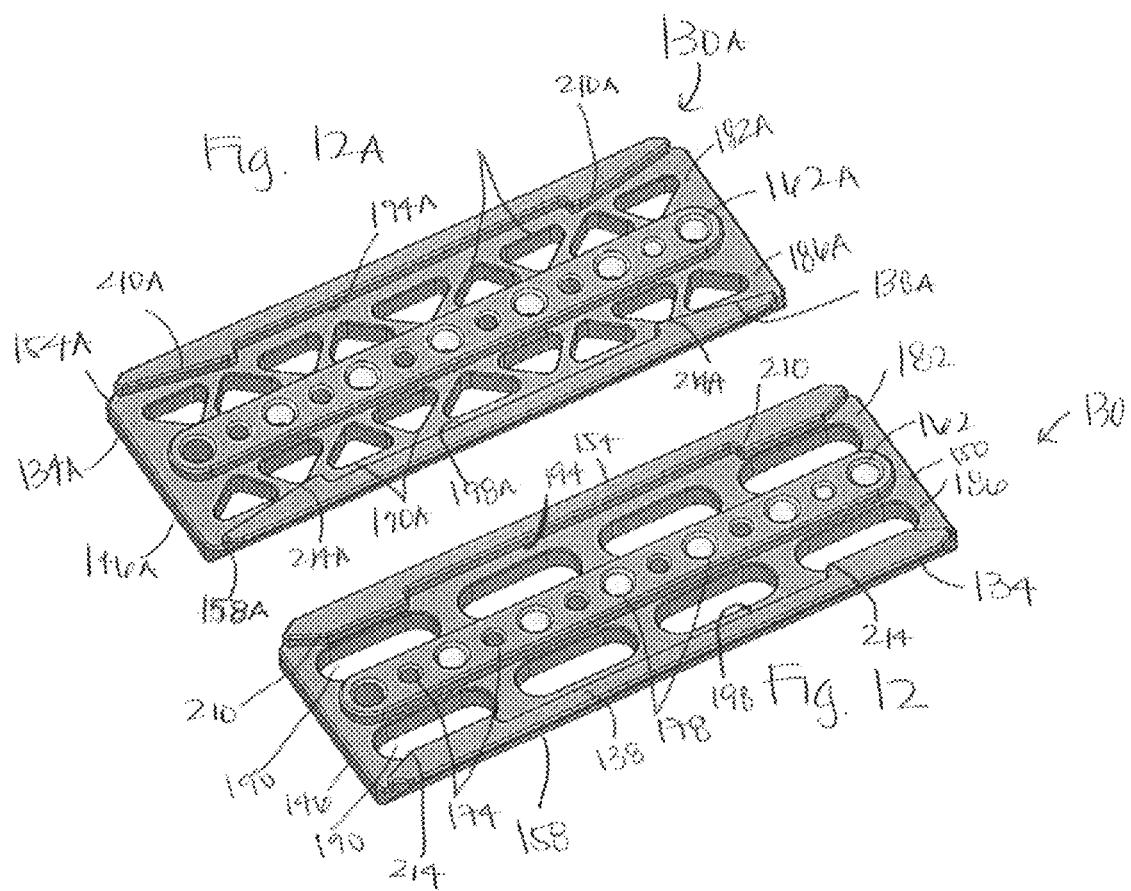
FIG. 12 is a perspective view of the positioning member of FIG. 11.
Figure 13:
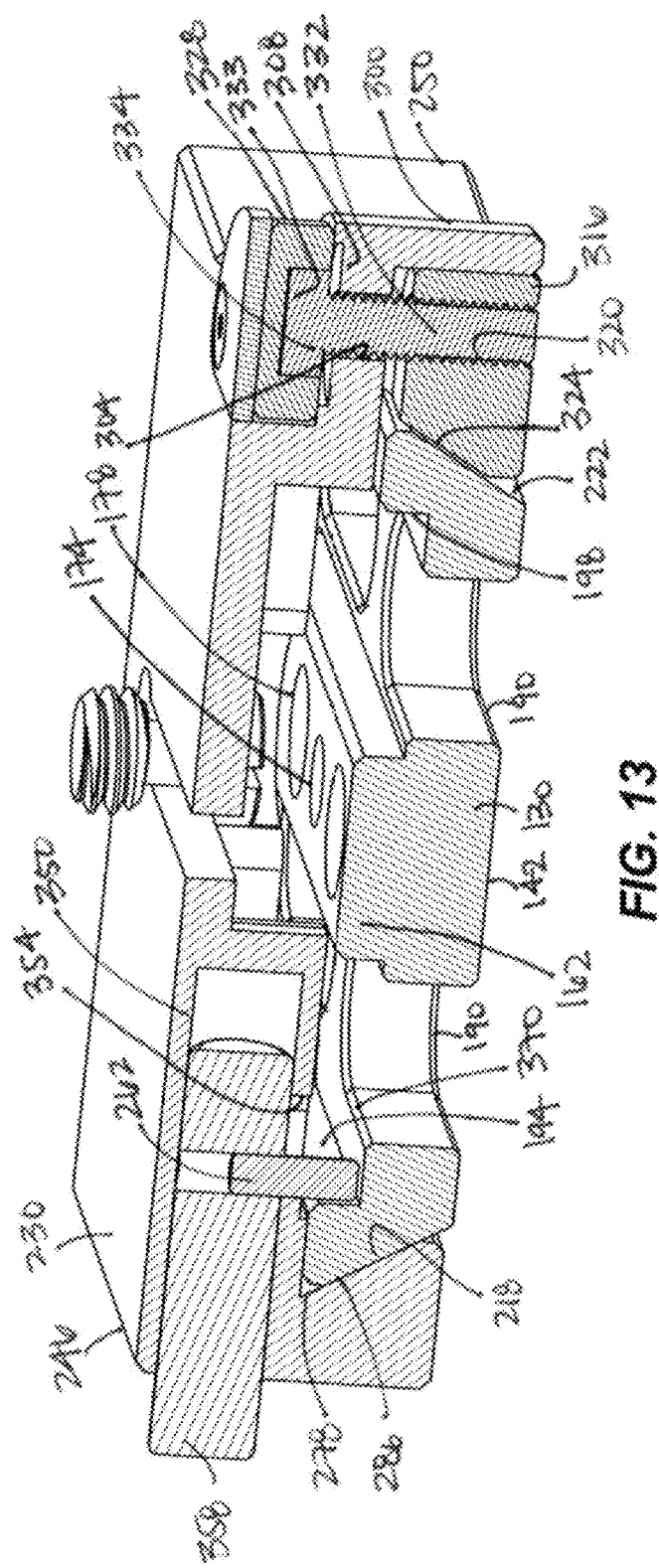
FIG. 13 is a section view along section line 13-13 of FIG. 11.

Referring also to FIGS. 11-13, a positioning member 130 is translatably coupled to the top surface 50 of the shoulder support member 42. The positioning member 130 includes a body 134 having a top surface 138, a bottom surface 142, a front side 146, a back side 150, a first side 154, and a second side 158. A center portion 162 extending along the longitudinal axis A includes a plurality of first apertures 174 and a plurality of second apertures 178. The apertures 174, 178 can be differently sized and extend through the center portion 162 to receive the pair of fasteners 114, 118, which secure the positioning member 130 to the shoulder support member 42.

A first recess 182 extends between the first side 154 and the center portion 162 and a second recess 186 extends between the second side 158 and the center portion 162. Elongated openings 190 aligned in each of the first and the second recesses 182, 186 extend through the positioning member 130. The openings 190 may have any suitable size and shape. For example, the positioning member 130A of FIG. 12A includes openings 190A that are substantially triangular. Adjacent each side 154, 158 is a groove 194, 198 leading to respective projections 210, 214 that extend inward toward the central portion 162. In one embodiment, the projections 210, 214 have a substantially trapezoidal shape but can alternatively have other configurations. For example, as illustrated in FIG. 12A, the projections 210A, 214A may be substantially triangularly shaped. The positioning member 130 presents opposing angled portions in the form of tapered walls 218, 222, best shown in FIG. 11, between the top surface 138 and the bottom surface 142 on each of the first side 154 and the second side 158.

Figure 14:
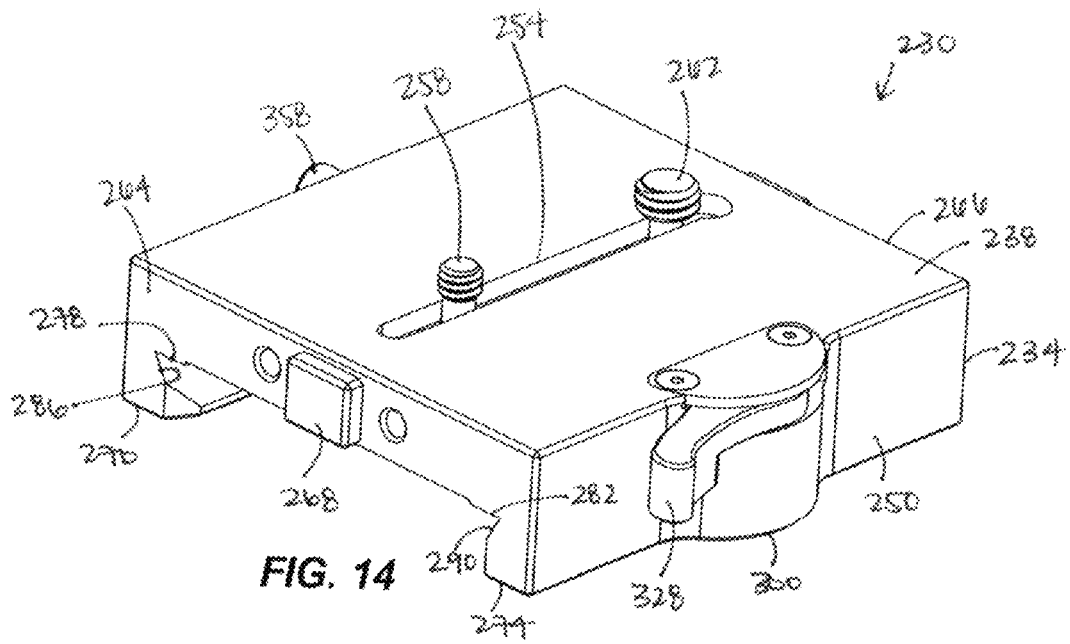
FIGS. 14 and 15 are perspective views of the camera mount illustrated in FIG. 11.
Figure 15:
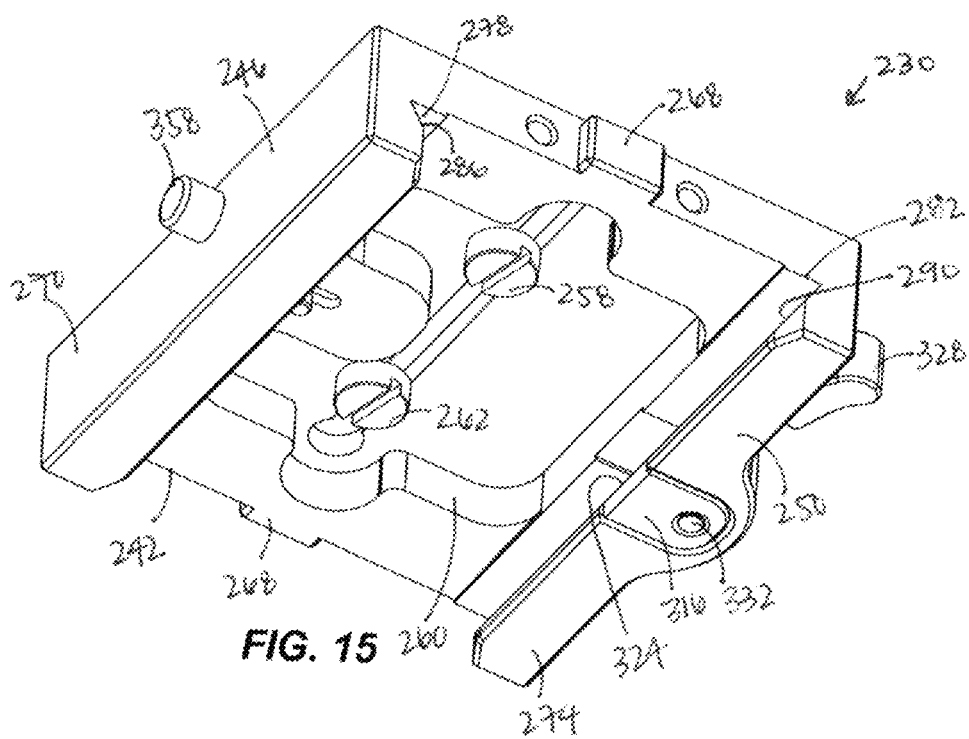

Referring also to FIGS. 14-15, a camera mount 230 includes a body 234 having a top surface 238, a bottom surface 242, a first side 246, and a second side 250. The top surface 238 includes an elongated slot 254 parallel to the longitudinal axis A and through which extends a pair of threaded fasteners 258, 262. In one embodiment, the fasteners 258, 262 may be differently sized. The diameter of each projecting end of each fastener 258, 262 is larger than a width of the slot 254, while the diameter of each shaft of fasteners 258, 262 is smaller than the width of the slot 254. As such, the fasteners 258, 262 are slidable along the length of the slot 254 but will not fall through the slot 254 if not otherwise secured. The bottom surface 242 includes a recess 260, the height of which is equal to or greater than a height of a bottom end of the fasteners 258, 262. A top end of each of the fasteners 258, 262 is configured to threadingly couple to a camera (not shown) thereby securing the camera to the camera mount 230 and accordingly to the main support assembly 14. Front and rear surfaces 264, 266, respectively, of the camera mount 230 further include projections 268.

A first leg 270 is integrally formed as one piece with or is otherwise coupled to the first side 246 and a second leg 274 is integrally formed as one piece with or is otherwise coupled to the second side 250. The first and the second legs 270, 274 project substantially downwardly from beyond the bottom surface 242. Each of the first and the second legs 270, 274 includes a groove or channel 278, 282 with a respective tapered surface 286, 290. The channels 278, 282 receive the opposing angled portions of the positioning member 130, respectively, such that the tapered walls 218, 222 of the positioning member 130 engage the tapered surfaces 286, 290 of the camera mount 230, the interaction of which slidably couples the camera mount 230 to the positioning member 130.

A substantially arcuate projection 300 is formed on the second side 250 of the camera mount 230. The projection 300 defines an aperture 304 and first and second openings 308, 312 (FIG. 13). The opening 312 is configured to receive a cam member 316 having a threaded aperture 320. The cam member 316 includes a tapered surface 324 substantially flush with the second tapered surface 290, as shown in FIG. 15. A lever 328 secured to the projection 300 is operably and removably coupled to an actuating screw 332 extending through the apertures 304, 320. In particular, the lever 328 includes a recess 333 that is sized and shaped to receive and secure a head 334 of the actuating screw 332. In the illustrated embodiment, the recess 333 is a twelve point recess, although other embodiments may include recesses 333 with different configurations.

The camera mount 230 further includes a laterally oriented aperture 350 (FIG. 13) extending inwardly from the first side 246 thereof. The aperture 350 includes an opening 354 accessible from the bottom surface 242. A push button actuator 358 positioned within the aperture 350 controls the movement of a pin 362 retained within a transverse aperture of the actuator 358. The pin 362 extends partially through the opening 354 and laterally translates with movement of the actuator 358. The actuator 358 is biased by a spring or other suitable biasing mechanism (not shown) to a position such that the pin 362 is adjacent to an edge 370 of the groove 194 on the first side 154 of the positioning member 130.

Referring again to FIGS. 7-8, the main support assembly 14 further includes a first cushion or pad 400 and a second cushion or pad 404 coupled to the bottom surface 54 of the shoulder support member 42. The pads 400, 404 extend between the first leg 74 and the second leg 78 and are spaced on opposite sides of the elongated groove 110, forming a recess 408 therebetween. Each of the first and the second pads 400, 404 forms a substantially arcuate edge portion 412, 416. The shoulder pads 400, 404 are interchangeable with one another and constructed from a soft, cushioning material such as rubber (e.g., foam rubber), a gel, silicone, or similar substances.

A pivotable member in the form of a tripod plate or mount 420 (FIGS. 7-8 and 16-18) includes a body 424 having a top surface 428, a bottom surface 432, a front side 438, and a back side 442. An arcuate pad or contact surface 446 is secured to the top surface 428 and substantially conforms to the edge portions 412,416. The arcuate pad 446 is constructed from a soft material such as rubber (e.g., silicone).

The bottom surface 432 is substantially flat and forms a mounting surface for the camera rig, e.g., for mounting the camera rig to a tripod (i.e., tripod interface). In particular, a series of tapped holes 454 are positioned to interface with different tripod quick release plates (not shown). In the illustrated embodiments, the tapped holes 454 are ¼ 20 and ⅜ 16 tapped holes, although other size tapped holes may be used as necessary.

The back side 442 of the mount 420 is coupled within the second notch 102 of the shoulder support member 42. Specifically, the back side 442 comprises a pair of projections 460, 464, each with an aperture 468, 472 configured to receive a pivot pin 476, about which a biasing member, illustrated in the form of a torsion spring 480, is positioned. Other embodiments, such as the one illustrated in FIGS. 1A, 2A, and 18A includes two biasing mechanisms, illustrated in the form of torsion springs 480A, 480A. The ends of the pivot pin 476 are each received in the apertures 106 of the second leg 78 previously described and specifically shown in FIG. 18, such that a pivoting axis B is defined generally perpendicular to the axis A. The front side 438 of the mount 420 has a further aperture 484 that receives a cam member 488 with a cam surface 492. In the illustrated embodiment, the cam member 488 is coupled to the top surface 428 but in other embodiments may be integrally formed as one piece with the mount 420. The aperture 484 joins a recess 496.

Figure 16:
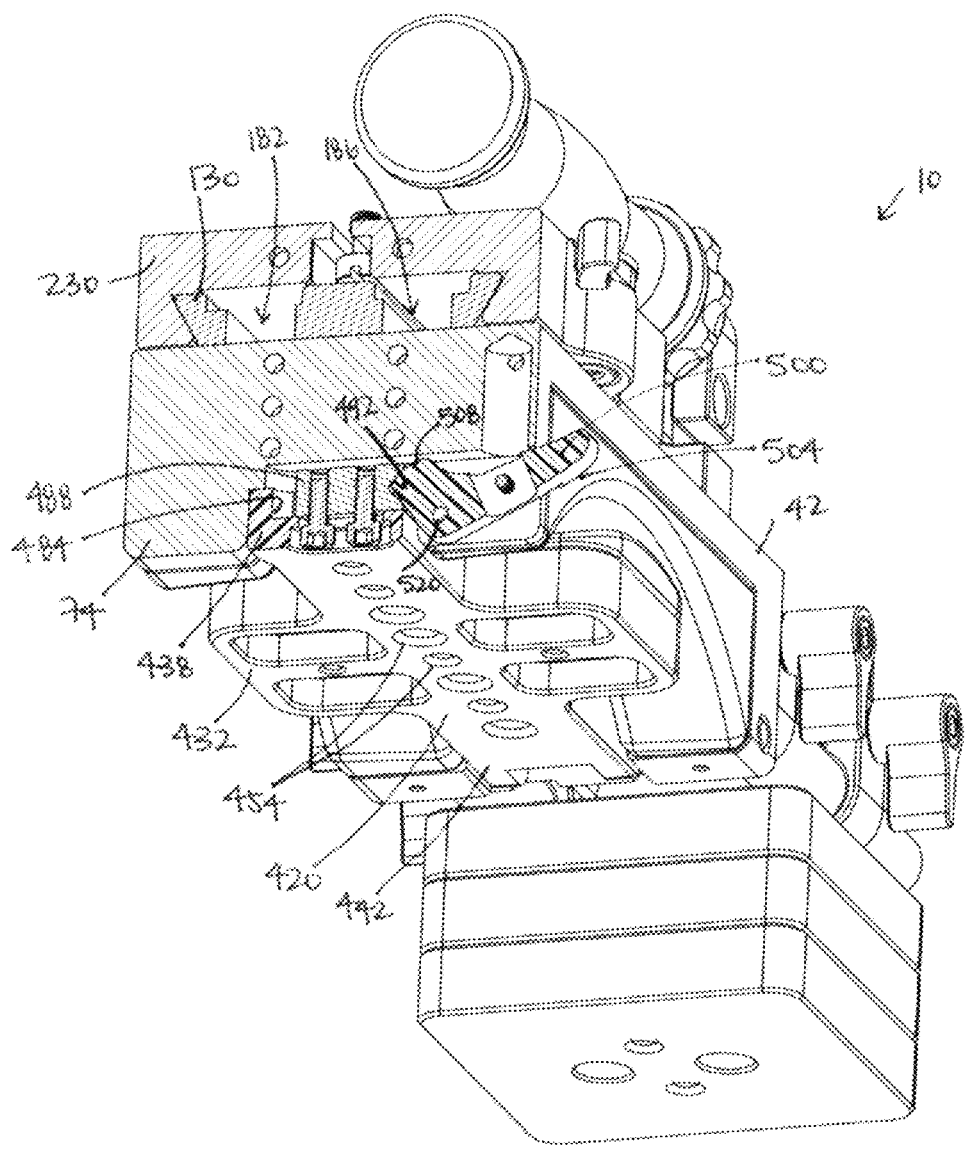
FIG. 16 is a partial section view of the camera rig of FIGS. 1 and 2.
Figure 17:
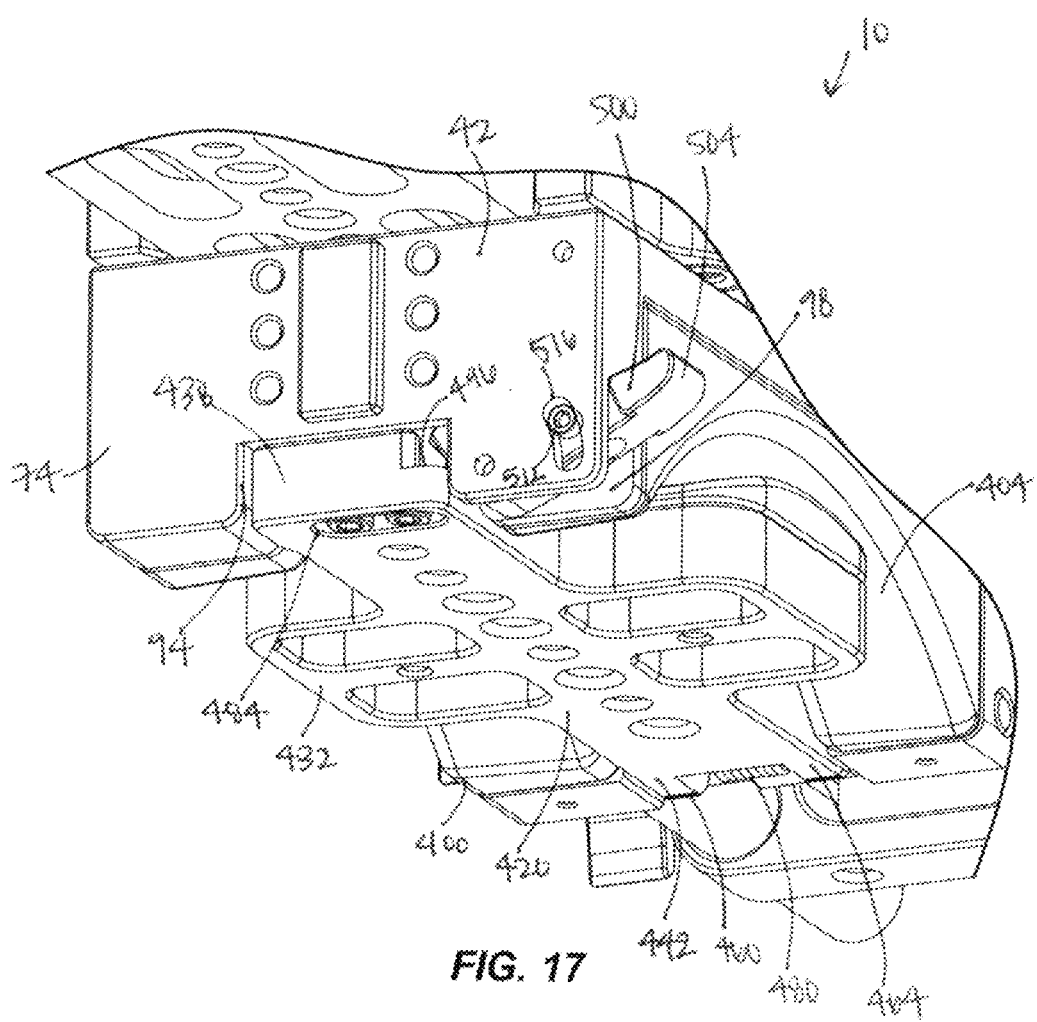
FIG. 17 is an enlarged partial view of the camera rig of FIGS. 1 and 2.

As also illustrated in FIGS. 16-17, an actuating lever 500 includes an arm 504 and an engagement surface 508. A guiding member 512 is coupled to the actuating lever 500 and projects through an arcuate groove 516 in a wall of the first leg 74. A pivot pin (not shown) extends through an aperture 520 of the actuating lever 500 to define a pivot axis parallel to the longitudinal axis A. The actuating lever 500 is rotatable about the pivot pin such that the engagement surface 508 can operatively engage and disengage the cam surface 492, as will be further described below. The actuating lever 500 is biased in a first position as illustrated in FIG. 17, such as with a biasing spring (not shown).

In additional or alternative embodiments, in lieu of a biasing spring 480 oriented about the pivot pin 476, a friction joint operative with the pivot pin 476 may pivotally secure the back side 442 of the mount 420 to the shoulder support member 42. In such a case, an alternative or additional lever (not shown) is configured to move a wedge or similar member against a portion of the mount 420 to secure the mount at that position.

Referring again to FIGS. 7-8, first and second clamping assemblies 530, 534 are coupled to the front side 58 and the back side 62, respectively, of the shoulder support member 42, and are substantially similar such that only the first clamping assembly 530 is described in detail. The first clamping assembly 530 includes a main body 538 having first and second openings 542, 546 extending parallel to the longitudinal axis A. Each of the openings 542, 546 communicates with a channel 550, 554 that defines opposing clamping portions. Each of the openings 542, 546 is configured to receive one of the carbon fiber rods 22, 26. First and second release levers or actuators 558, 562 include threaded shafts 566, 570 that extend through passages 574, 578 and the two clamping portions of each opening 542, 546. Rotation of the release levers 558, 562 operates to tighten or release each opening 542, 546 and therefore a clamping force on each carbon fiber rod 22, 26, as will be further explained below. A rear side 582 of the body 538 includes a recess or channel 586 (i.e., slot) that engages the elongated alignment projection 82. The body 538 is secured to the shoulder support member 42 by a plurality of fasteners (not shown) that extend through the first leg 74. In an alternative embodiment, the first clamping assembly 530 may be coupled to the projection on the first leg of the camera mount 230, alternatively, to accommodate cameras with higher lens mounts.

With respect to FIGS. 20-25, the handle assembly 18 includes a first handle 590 and a second handle 594. The first and the second handles 590, 594 are identical and therefore only the first handle 590 is described in detail. The first handle 590 includes an inner cylindrical rod 600 having a first end 604 and a second end 608, and an outer diameter $D_1$. A second or outer cylindrical rod 612 has a first inner diameter $D_2$. An end 616 of the outer rod 612 includes a threaded outer surface or connector 634 and has an inner diameter $D_3$ greater than inner diameter $D_2$. A locking member 638 includes an annular ribbed surface 646, an inner threaded surface configured for engagement with the threaded outer surface 634, and an orifice 642 extending therethrough. Inner diameter $D_2$ is greater than the outer diameter $D_1$ such that the inner rod 600 is received within and slidable relative to the outer rod 612, as well as through the orifice 642 in the locking member 638. A shaft collar 654 is positioned over the inner rod 600 and at least partially within the end 616 and is in operable engagement with an interior surface of the locking member 638. A gripping member 658 is secured to the outer rod 612 and has a padded, contoured outer surface for user comfort. The gripping member 658 is preferably constructed from a rubber material (e.g., silicone) although other soft materials are contemplated.

An alternative embodiment of the handle assembly 18A is illustrated in FIGS. 20A-25A. The first and the second handles 590A, 594A include an inner cylindrical rod 600A slidable within an outer cylindrical rod 612A having a first end 616A with a threaded connector 634A. As with the handles 590, 594, a gripping member 658A is secured to the outer rod 612A. A locking member 638A includes a body 648A with a first portion 652A and a second portion 656A extending from the first portion 652A. The first portion 652A includes internal threads for engaging the connector 634A. The second portion 656A of the locking member 638A has a clamping aperture 660A extending therethrough and a channel 664A defining opposing clamping portions. The clamping aperture 660A receives the inner rod 600A of the handles 590A, 594A. A release lever or actuator 661A includes a threaded shaft 663A that extends through a passage 665A of the two clamping portions. As discussed above, rotation of the release lever 661A operates to tighten or release the aperture 660A and therefore a clamping force on the inner rod 600A.

Illustrated in FIGS. 1-6 and 25 are a first adjustable handle clamping assembly 666 and a second adjustable handle assembly 668, respectively. The first and the second handle clamping assemblies 666, 668 are identical and therefore only the first handle assembly 666 is described in detail. The first handle clamping assembly 666 includes a first clamping member 670 and a second clamping member 674. The first clamping member 670 includes a body 678 that that has a clamping aperture 682 extending therethrough and a channel 686 defining opposing clamping portions. The clamping aperture 682 receives the inner rod 600 of the handle assembly 590, or the inner rod 600A of the handle assembly 590A. A release lever or actuator 690 includes a threaded shaft 694 that extends through a passage of the two clamping portions. The first clamping member 670 also includes a through-hole 700 surrounded by a serrated face 704.

The second clamping member 674 also includes a body 708 that that has a clamping aperture 712 extending therethrough and a channel 716 defining opposing clamping portions, in a like manner as the first clamping member 670. As with the first clamping member 670, a release lever 720 operates to tighten or release the clamping portion 674. The second clamping member 674 also includes a threaded aperture 750 extending partially through the body 708. A serrated face 758 surrounds the threaded aperture 750. A release handle 762 includes a threaded shaft 766 that extends through the through-hole 700 and into the threaded aperture 750. A retaining ring 696 is sandwiched between the first and the second clamping members 670, 674 and receives the fastener 694. In alternative embodiments such as FIGS. 1A and 2A, the first clamping member 670A may include a threaded hole 700A, which eliminates the need for a retaining ring.

Figure 19:
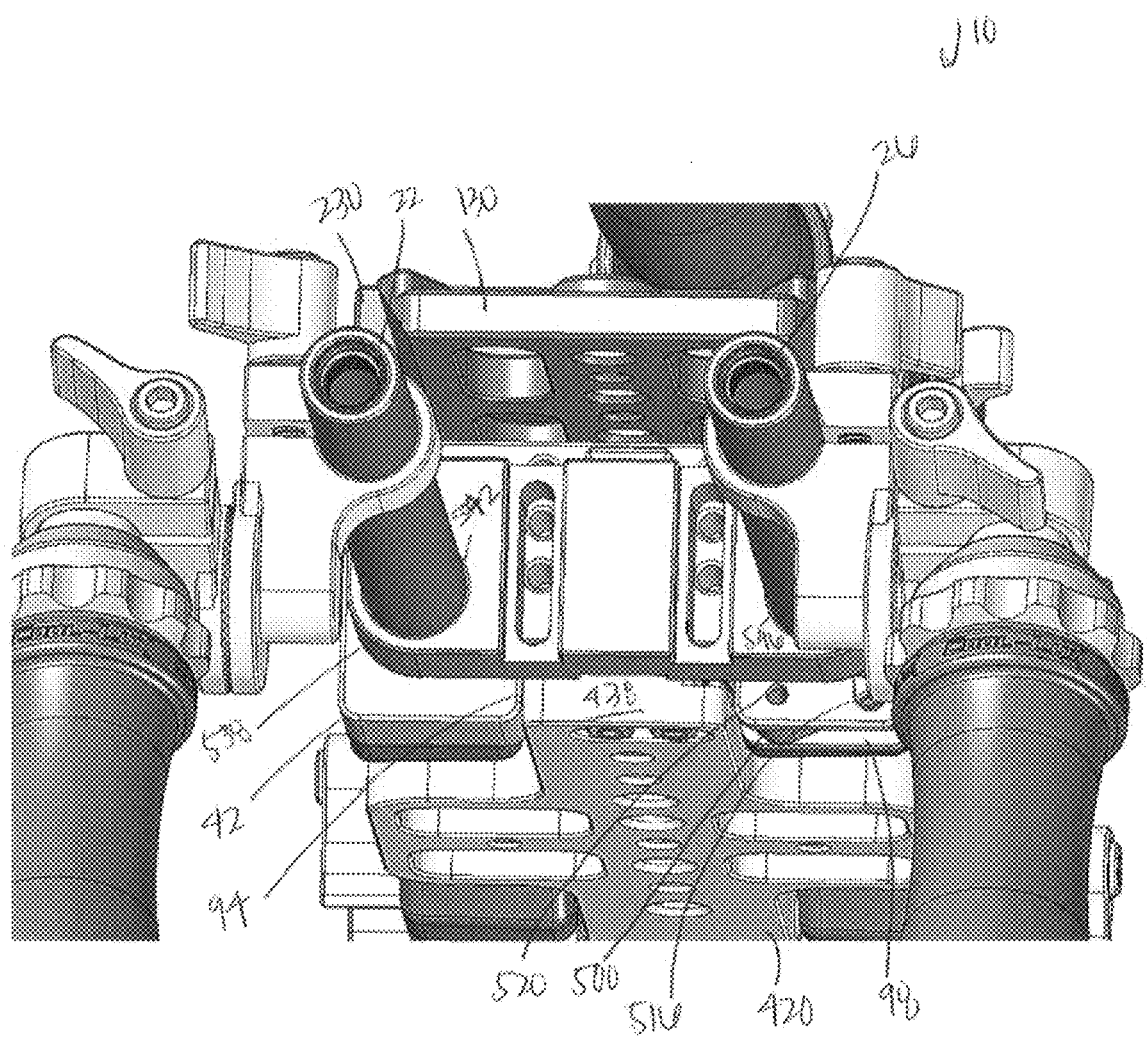
FIG. 19 is another enlarged partial view of the camera rig of FIGS. 1 and 2.
Figure 20:
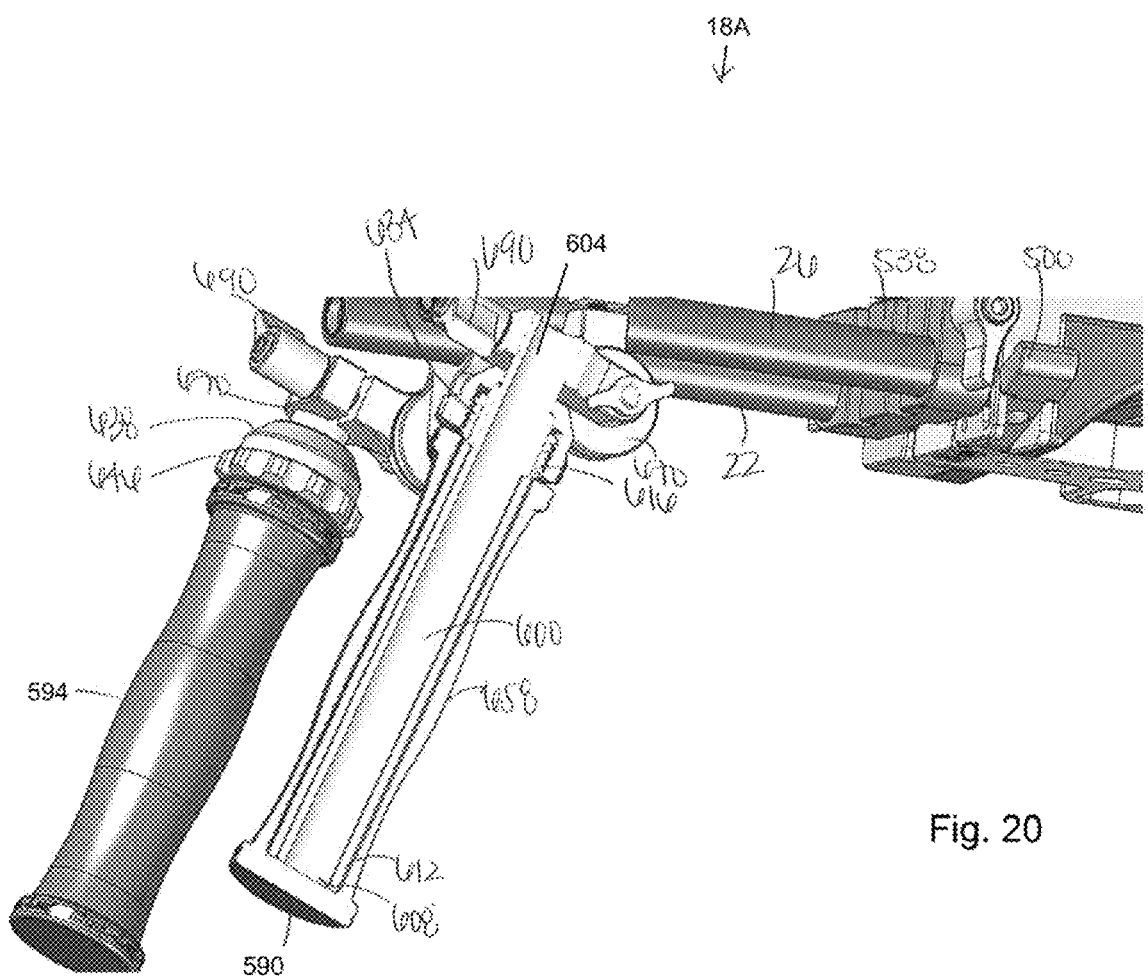
FIG. 20 is a section view taken along line 20-20 of FIG. 1.
Figure 21:
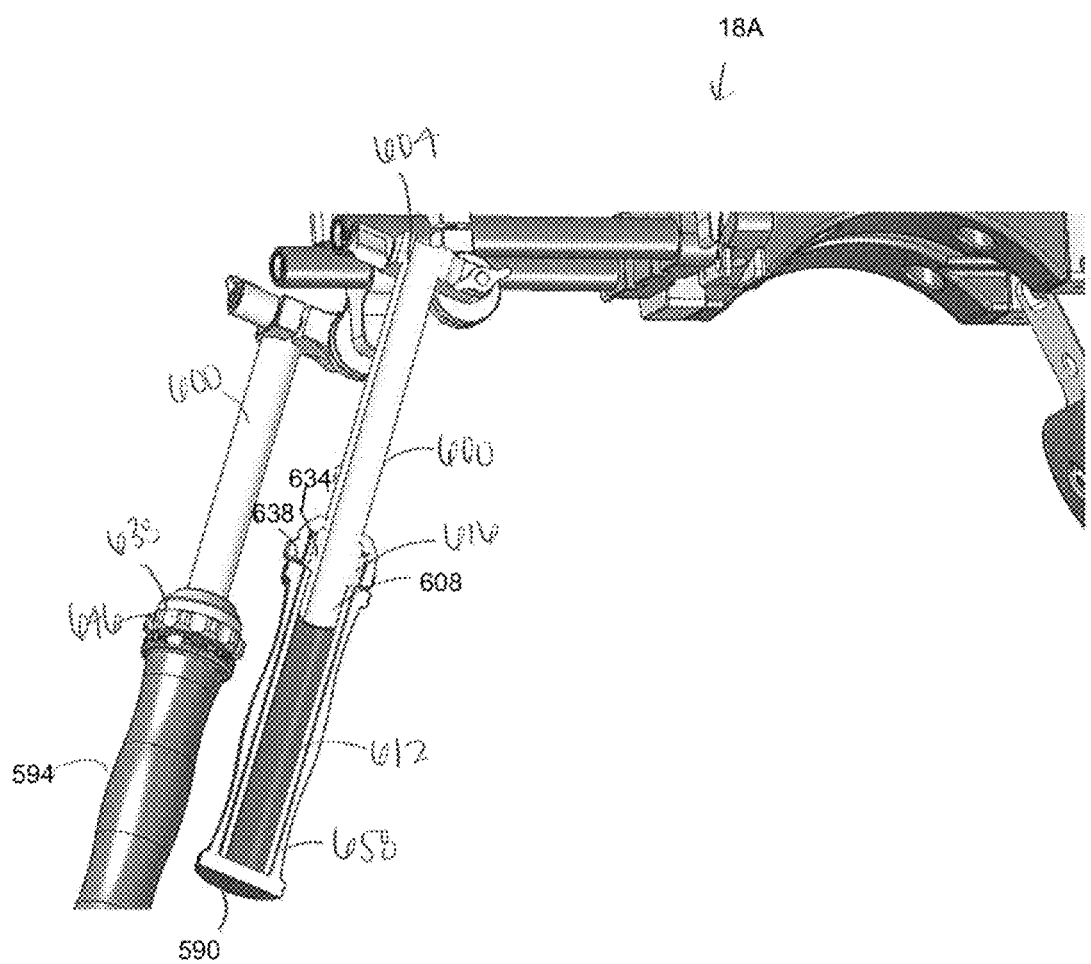
FIG. 21 is a section view taken along line 21-21 of FIG. 2.
Figure 22:
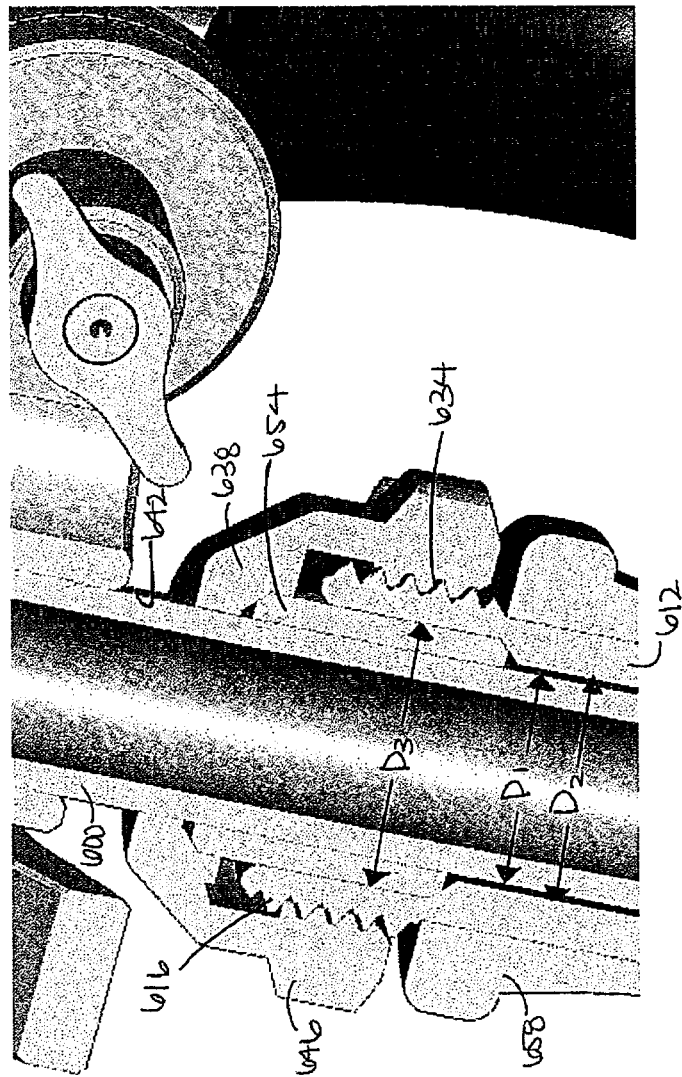
FIG. 22 is a detailed section view of a portion of FIG. 20.
Figure 23:
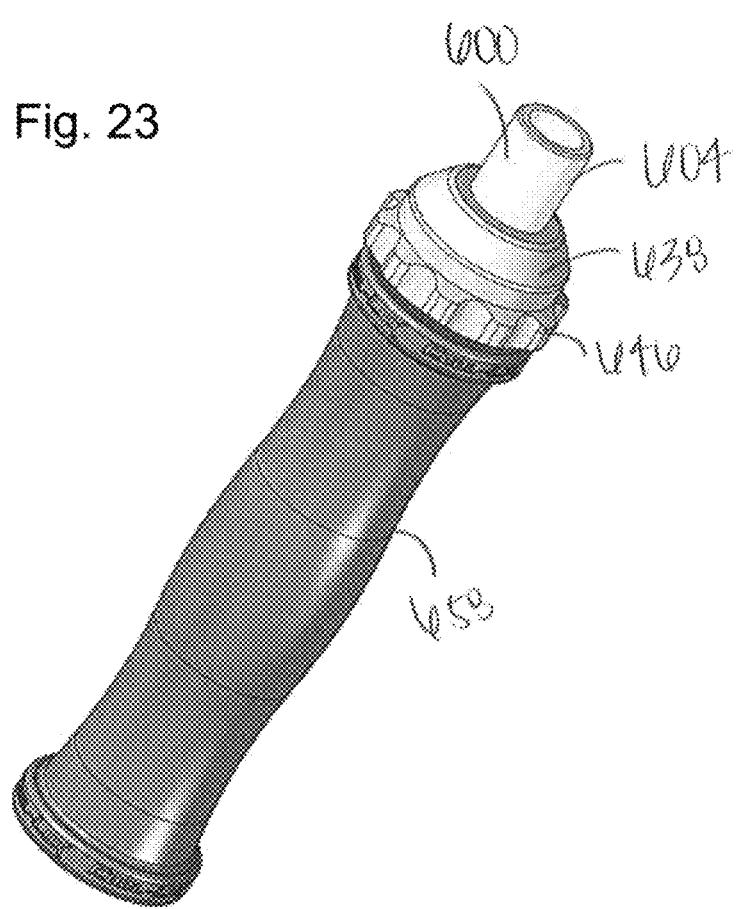
FIG. 23 is a perspective view of a handle of the handle assembly illustrated in FIGS. 1 and 2.
Figure 24:
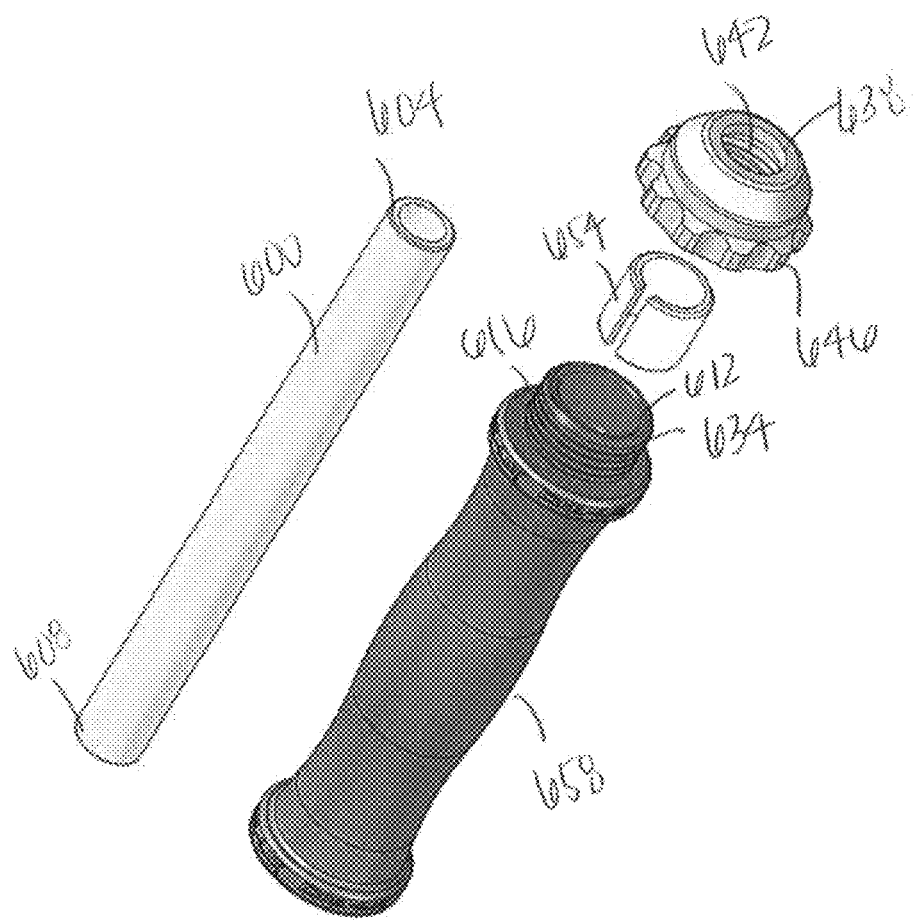
FIG. 24 is an exploded view of the handle of FIG. 23.
Figure 25:
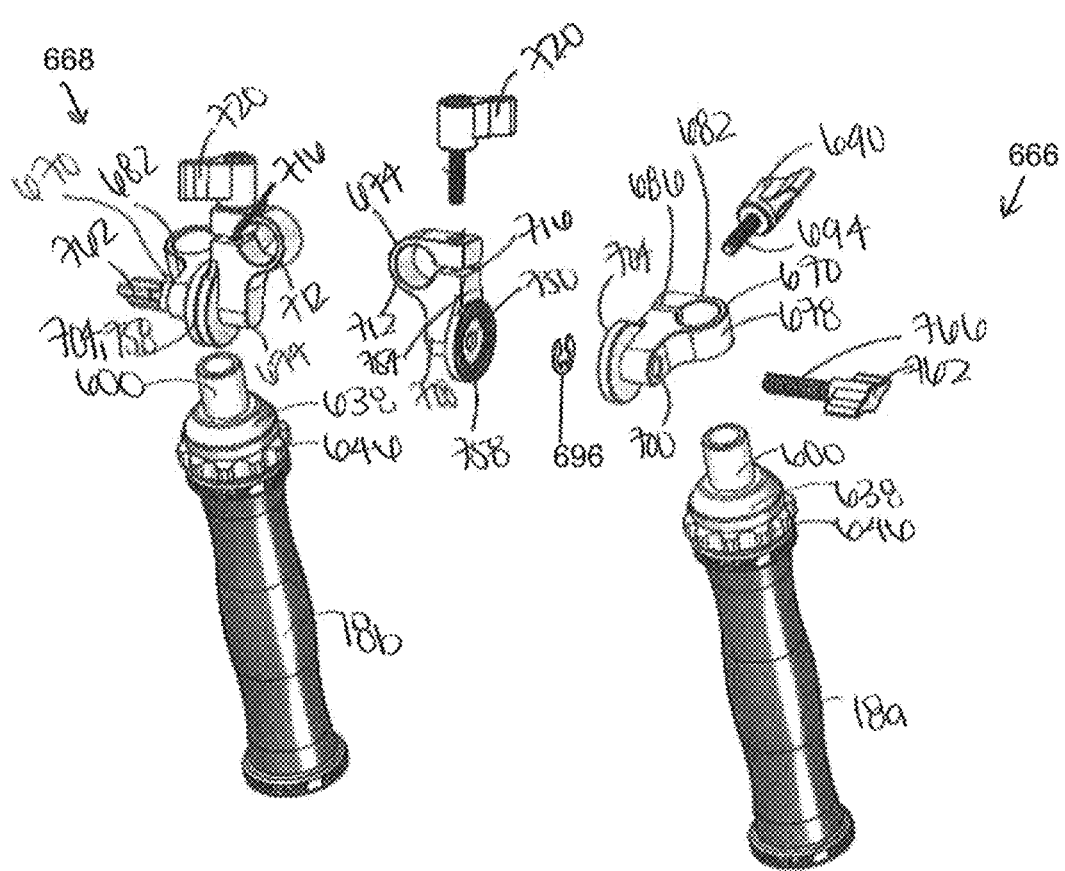
FIG. 25 is an exploded view of the handle assembly illustrated in FIGS. 1 and 2.
Figure 26:
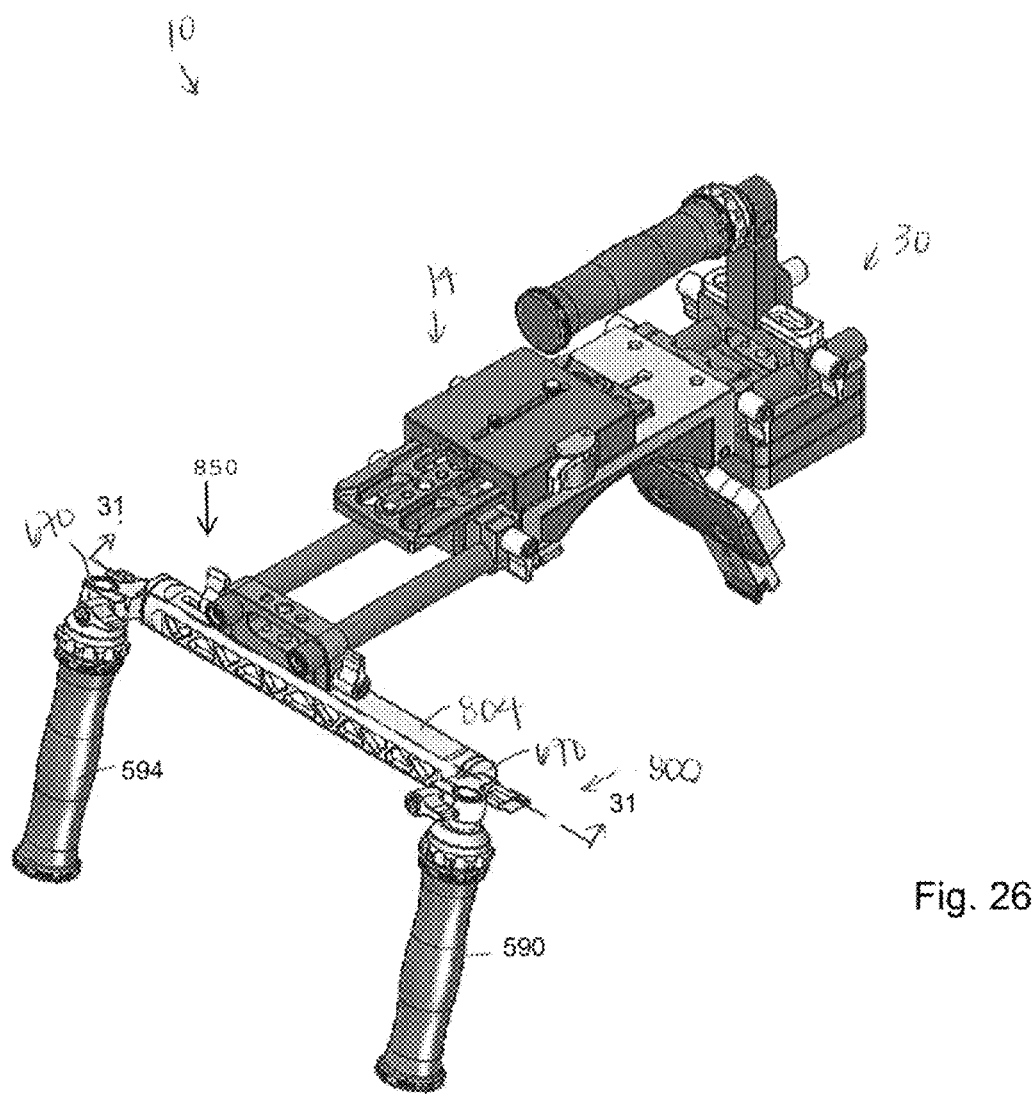
FIG. 26 is a front perspective view of another camera rig having an alternative handle assembly.
Figure 27:
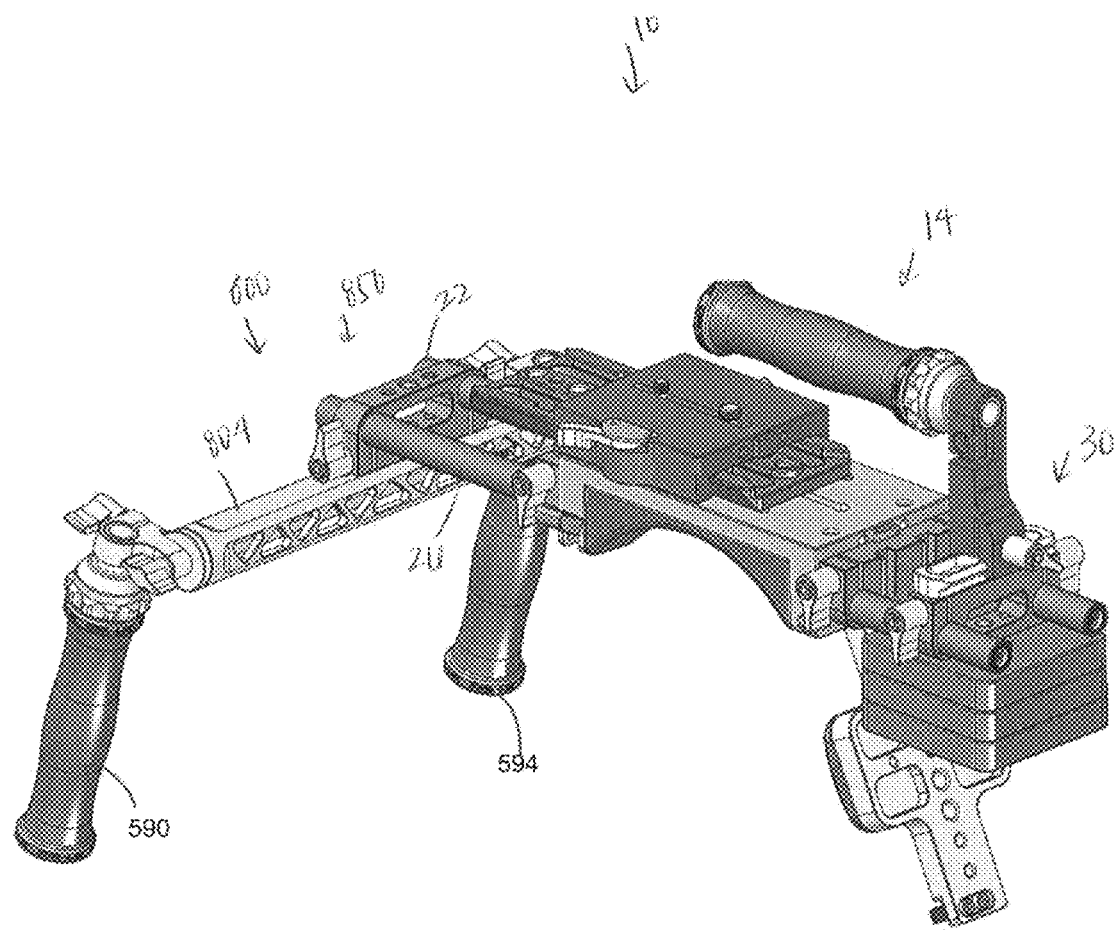
FIG. 27 is a rear perspective view of the camera rig of FIG. 26.
Figure 28:
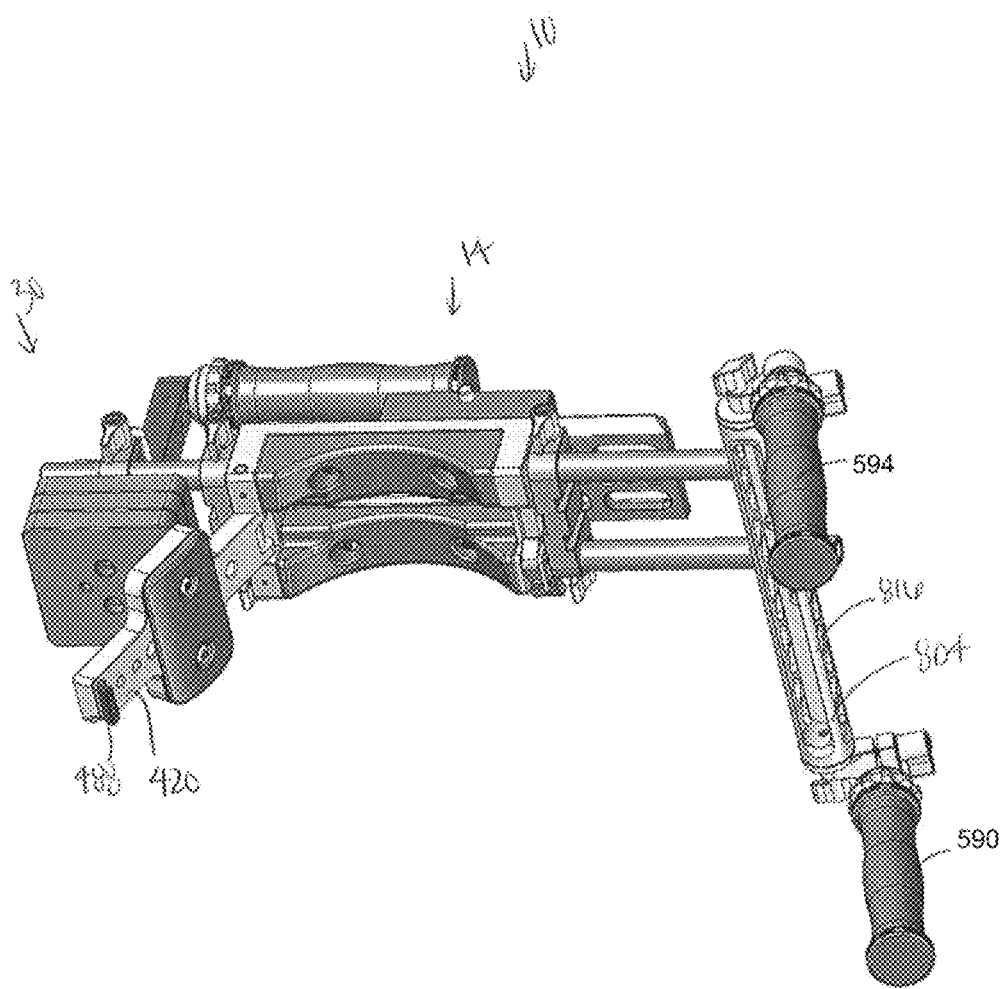
FIG. 28 is a bottom perspective view of the camera rig of FIG. 26.
Figure 29:
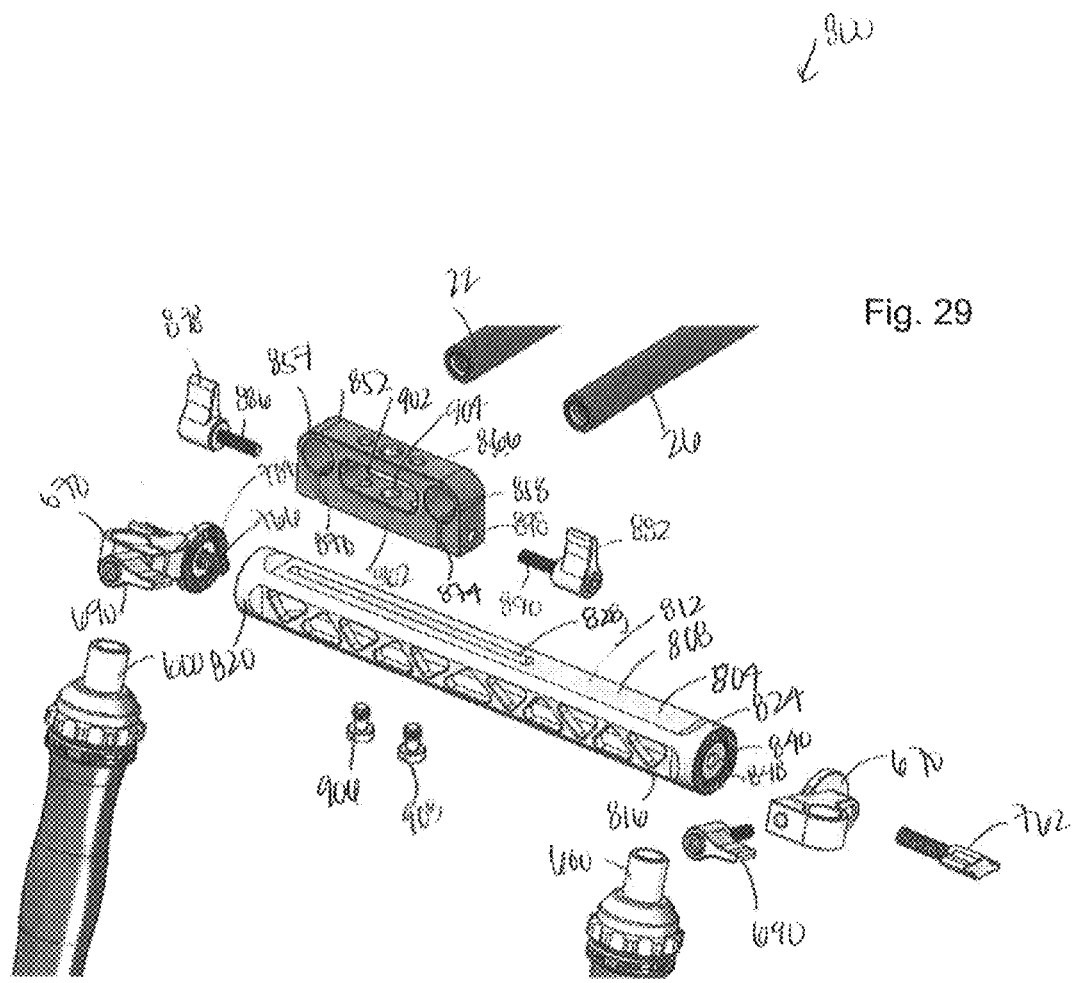
FIGS. 29 and 30 are partial exploded views of the handle assembly illustrated in FIG. 26.
Figure 30:
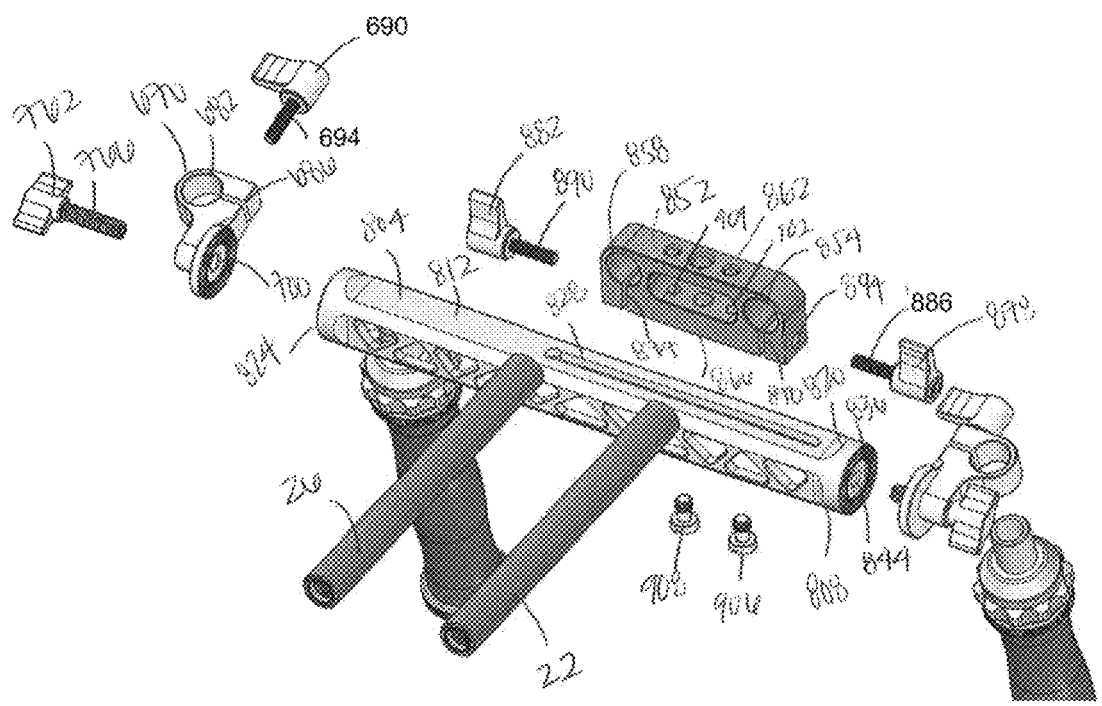

Referring to FIGS. 26-31, an alternative adjustable "wide grip" handle clamping assembly 800 includes a support member 804 having a body 808 with a top surface 812, a bottom surface 816, a first end 820, and a second end 824. An elongated groove 828 extends along the top surface 812. Referring also to FIGS. 1A, 2A, and 31A, in other embodiments the top surface 812A may also include a plurality of holes 814A (FIG. 31A) extending therethrough between the elongated groove 828A and the second end 824A thereof. The holes 814A are preferably ¼ 20 and ⅜ 16 tapped holes, but may be any size. Each of the ends 820, 824 includes a threaded aperture 836, 840 surrounded by a serrated face 844, 848 that is substantially circular, i.e., the ends 820, 824 are configured to operate with a clamping portion such as first clamping member 670. Specifically, as described above with respect to the embodiment of FIG. 19, a first clamping member 670 couples to the support member 804 by aligning the through hole 700 with one of the threaded apertures 836, 840 of a serrated face 844, 848. The release handle 762 operates to tighten and loosen the first clamping member 670 relative to the support member face 844, 848, as described above.

A body 852 of an auxiliary clamping assembly 850 (FIGS. 29-31) is coupled to the top surface 812 of the support member 804. The auxiliary clamping assembly 850 includes a first opening 854 and a second opening 858 extending parallel to the longitudinal axis A from a front side 862 to a back side 866. Each of the openings leads to a channel 870, 874 defining opposing clamping portions and is configured to receive one of the carbon fiber rods 22, 26.

First and second release levers or actuators 878, 882 include threaded shafts 886, 890 that extend through passages 894, 898 and the two clamping portions of each opening 854, 858.

Figure 31:
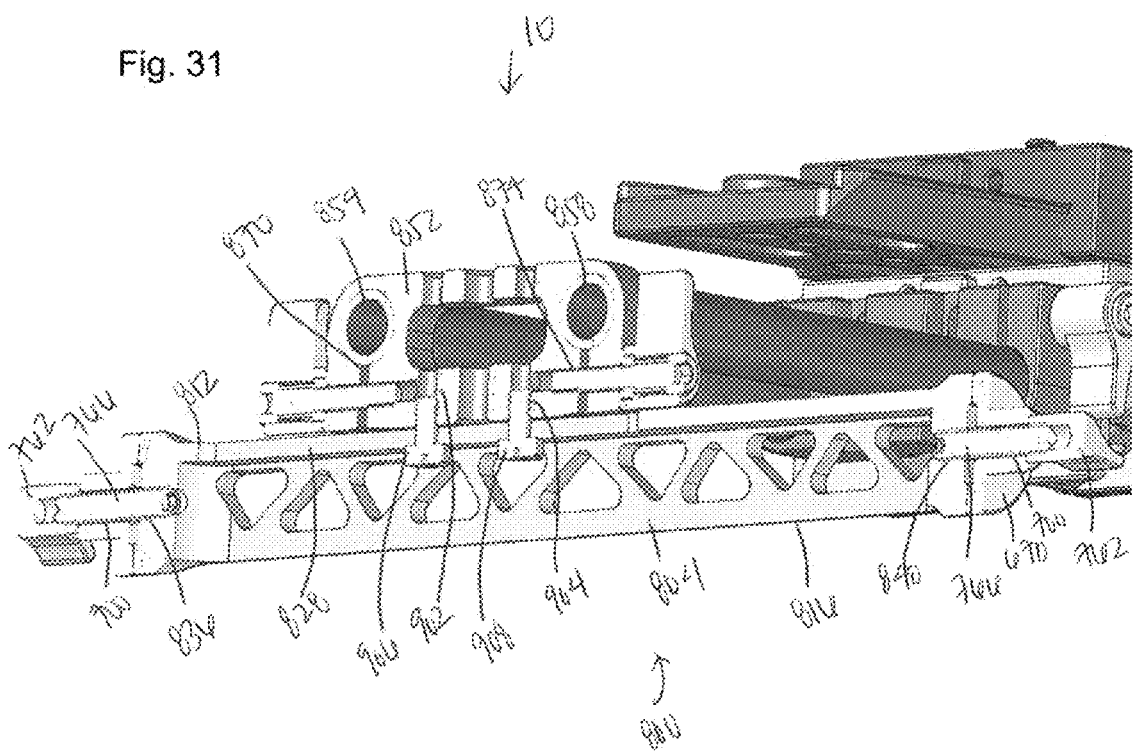
FIG. 31 is a section view taken along line 31-31 of FIG. 26.

With continued reference to FIGS. 26-31, the body 852 is slidably coupled to the top surface 812 of the support member 804. In particular, threaded apertures 902, 904 align with the elongated groove 828 (FIG. 31). Fasteners 906, 908 extend through the elongated groove 828 to couple the support member 804 and the first and the second handles 590,594 to the carbon fiber rods 22, 26 and main support assembly 14. The fasteners 906, 908 are movable such that the body 852 can laterally translate relative to the elongated groove 828 to change the position of the support member 804 with respect to the main support assembly 14.

Figure 32:
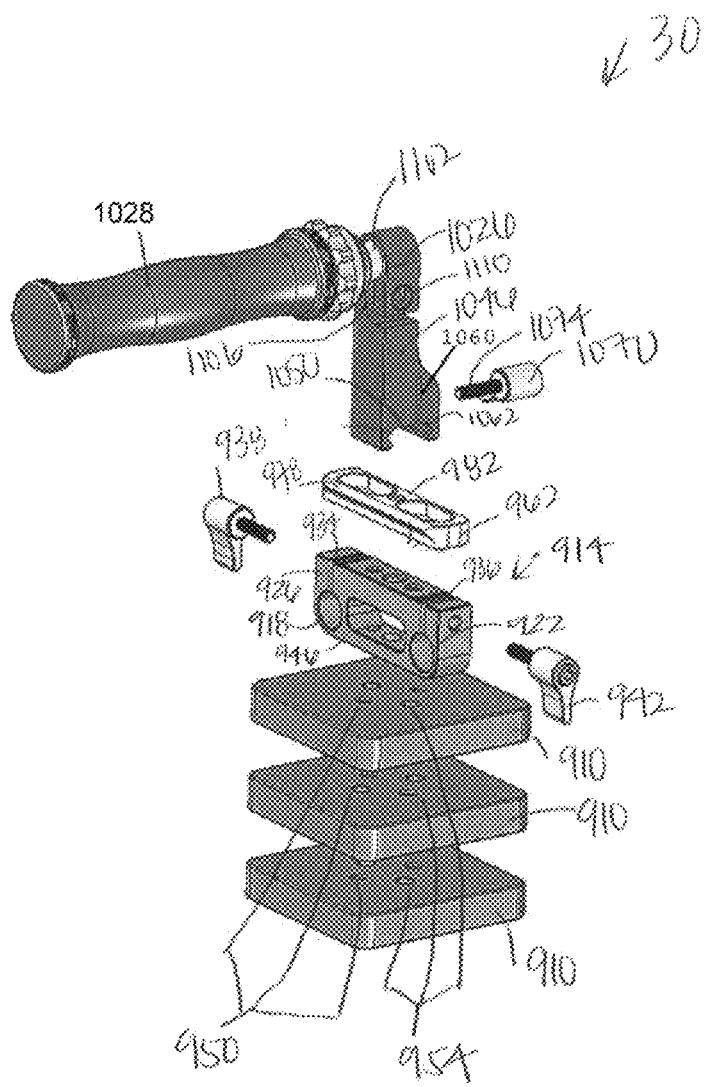
FIGS. 32 and 33 are exploded views of the counterweight assembly illustrated in FIGS. 1 and 2.
Figure 33:
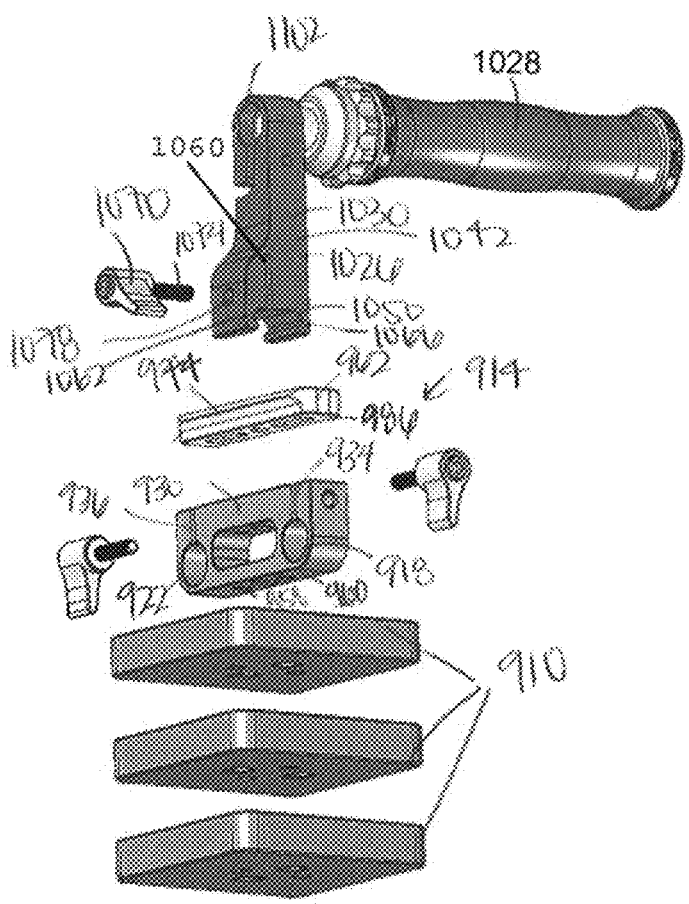

FIGS. 32-33 illustrate the counterweight assembly 30 in greater detail. In particular, one or more weights 910 are coupled to a third clamping assembly 914. The third clamping assembly 914 includes a first opening 918 and a second opening 922 extending parallel to the longitudinal axis A from a front side 926 to the back side 930. Each of the openings 918, 922 leads to a channel 934, 936 defining opposing clamping portions and is configured to receive one of the carbon fiber rods 22, 26. Release levers 938, 942 as previously described are operatively coupled to the respective clamping portions.

The weights 910 are coupled to a body 946 of the third clamping assembly 914 by fasteners (not shown) that extend through apertures 950, 954 in the weights and into threaded apertures 958, 960. The fasteners couple the weights 910 to the third clamping assembly 914, and therefore to the carbon fiber rods 34, 38 and main support assembly 14. The number of weights is adjustable and dependent on the specific application, e.g., the camera type to be used.

A positioning member 962 coupled to the body of the third clamping assembly 910 is oriented perpendicularly to the longitudinal axis A. The positioning member 962 defines opposing tapered walls or rails 974, 978 between a top surface 982 and a bottom surface 986.

A handle mount 1026 comprises a body 1030 that extends vertically upward from the auxiliary positioning member 962. The body 1030 defines a channel 1050 extending from a first side 1042 to a second side 1046 transverse to the axis A. Each interior side of the channel 1050 forms a groove 1062, 1066 that receives the first and the second rails 974, 978 of the auxiliary positioning member 962, respectively, such that the handle mount 1026 is slidably coupled to the auxiliary positioning member 962. A secondary slot 1060 extends orthogonally to the channel 1050 and separates a lower segment of the body 1030 into first and second clamping portions. A release lever or actuator 1070 includes a threaded shaft 1074 that extends through a passage 1078 to engage the clamping portions in a manner previously described.

The handle mount 1026 is configured to couple a third handle 1028 thereto. The third handle 1028 has the same features as the first and the second handles 590, 594 and is not again described. An aperture 1102 in the handle mount 1026 extends parallel to the longitudinal axis A and a channel 1106 opens to the second side 1046 to define opposing clamping portions engaged by a lever (not shown) received in a passage 1110, as previously described, to tighten or loosen the clamping portions about the inner rod 600 of the third handle assembly 1028.

In other embodiments, such as that of FIGS. 1A and 2A, an auxiliary accessory mount or cheeseplate assembly 1400 may be coupled to the second pair of rods 34, 38 at the rear of the main support assembly 14A. Specifically, a cheeseplate or accessory mount 1408 is fixedly or removably secured to a body 1412 of a fourth clamping assembly 1404 by fasteners (not shown). As illustrated, FIGS. 1A and 2A the fourth clamping assembly 1404 is coupled to the second pair of carbon fiber rods 34, 38 in a similar manner as described above for other clamping assemblies. The cheeseplate 1408 is used as an alternative counterweight and accessories, such as battery plates, video recorders, or other related components may be removably coupled to the cheeseplate 1408 for storage and transport.

Figure 34:
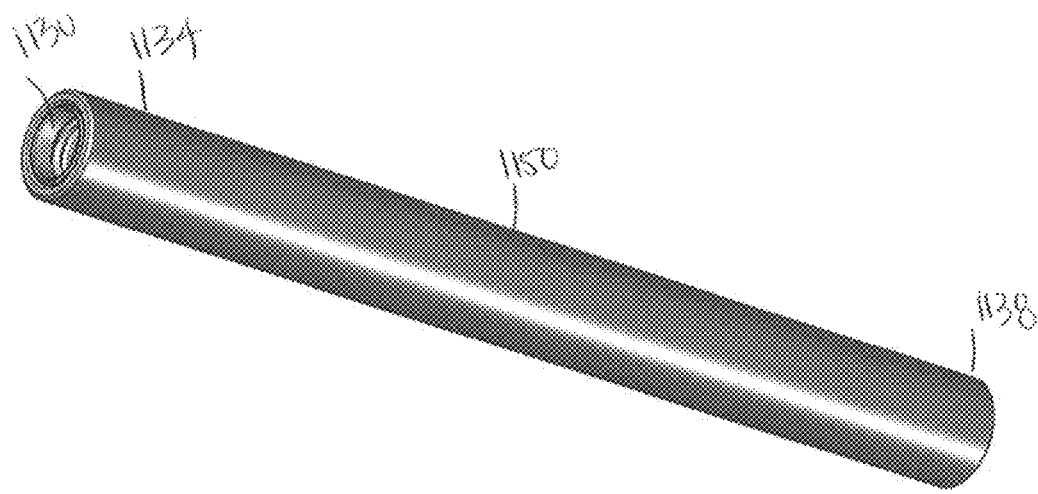
FIG. 34 is a perspective view of one of the carbon fiber rods shown in FIGS. 1-8 and FIGS. 26-28.
Figure 35:
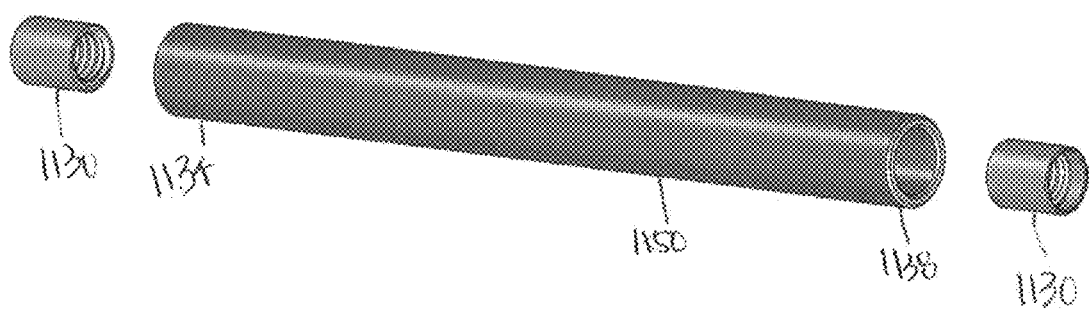
FIGS. 35 and 36 are exploded views of the carbon fiber rod of FIG. 34.
Figure 36:
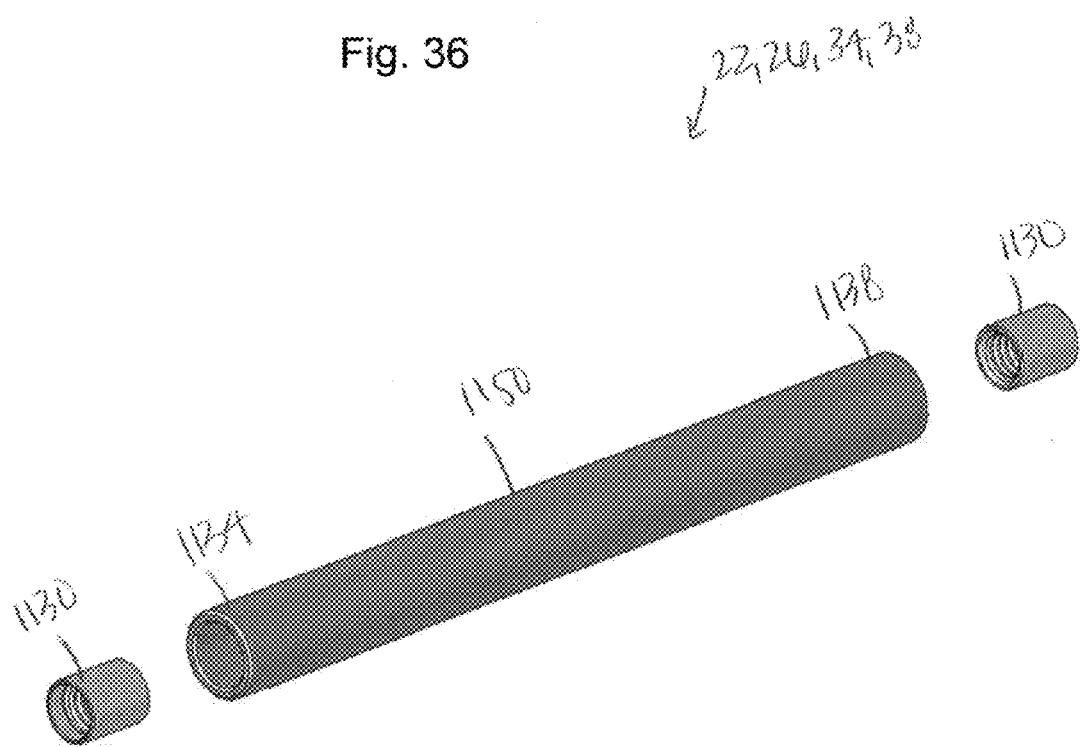
Figure 39:
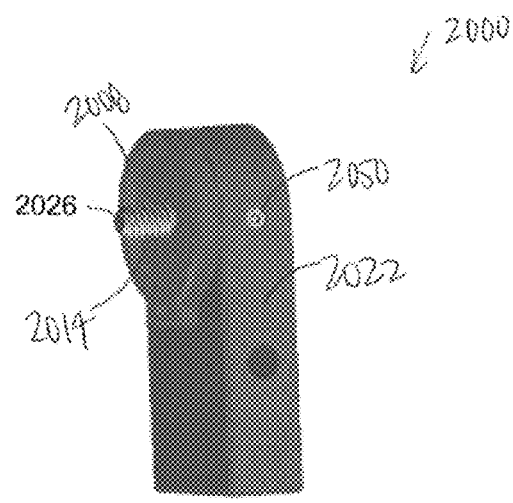
FIG. 39 is a perspective view of a swivel mount assembly.
Figure 40:
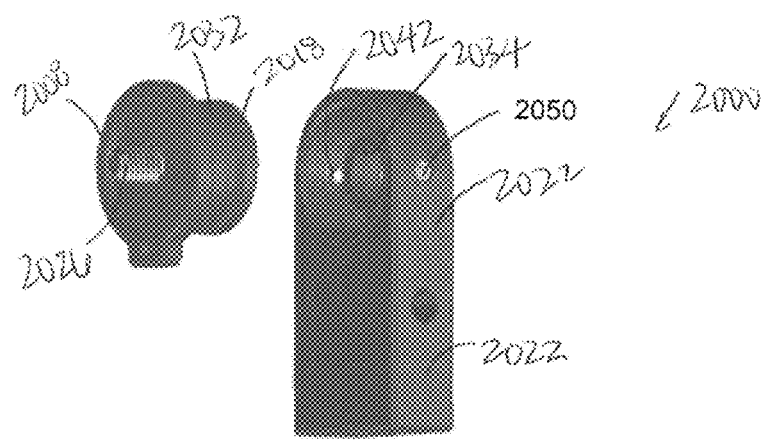
FIGS. 40 and 41 are partial exploded views of the swivel mount assembly of FIG. 39.
Figure 41:
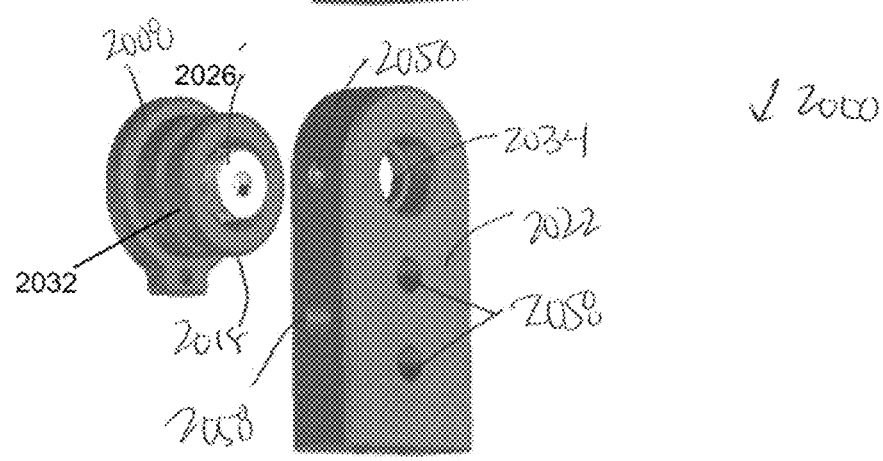
Figure 42:
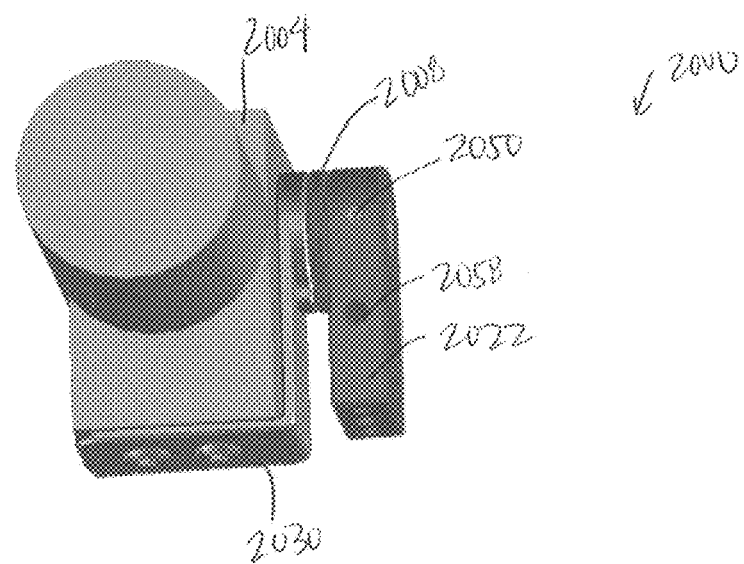
FIG. 42 is a perspective view of a swivel mount assembly coupled to a camera viewfinder.
Figure 43:
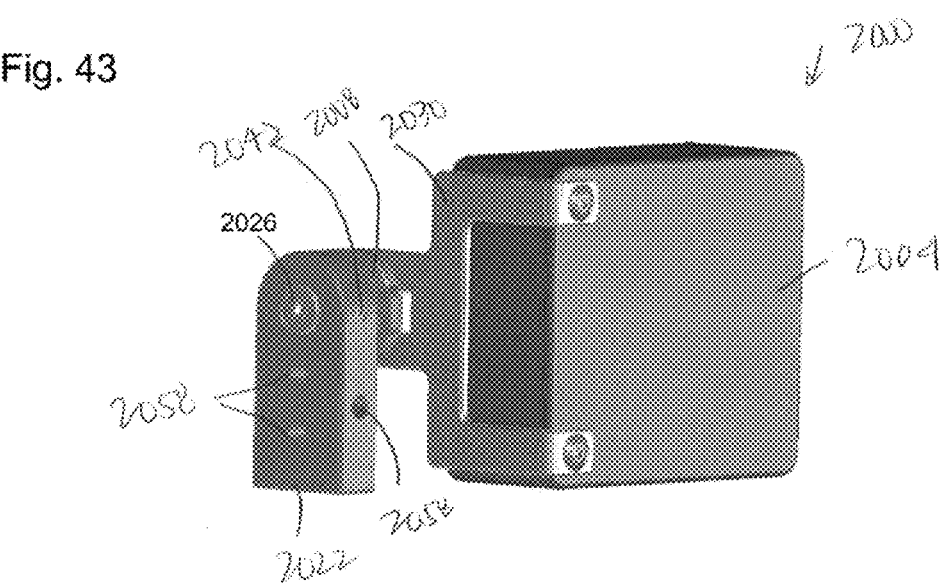
FIG. 43 is a perspective view of a swivel mount assembly coupled to another camera viewfinder.
Figure 44:
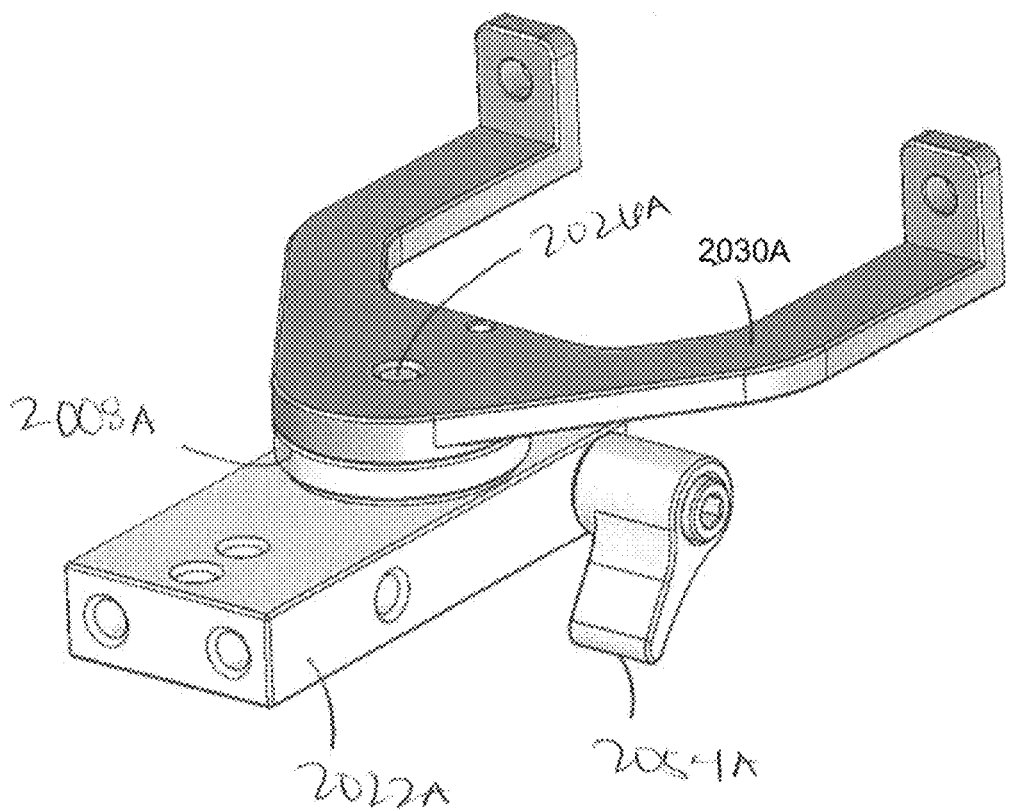
FIGS. 44 and 45 are perspective views of another swivel mount assembly.
Figure 45:
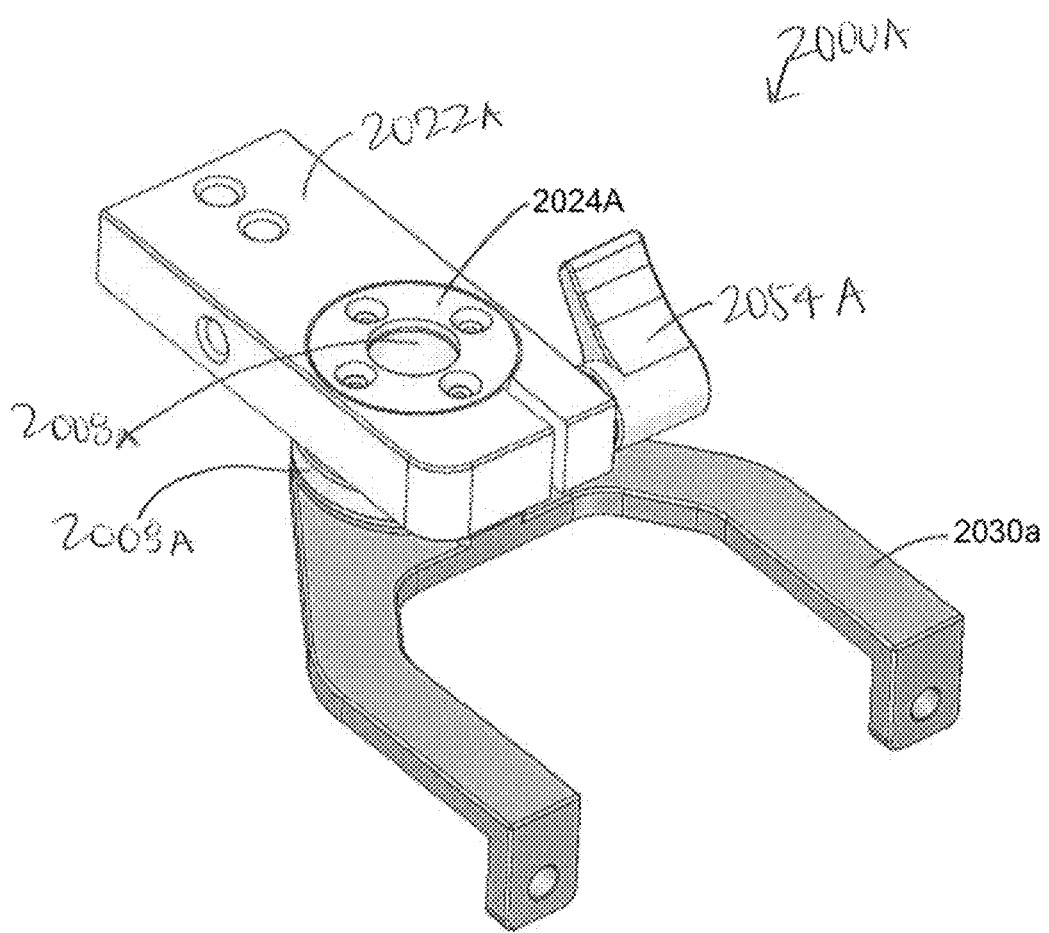
Figure 46:
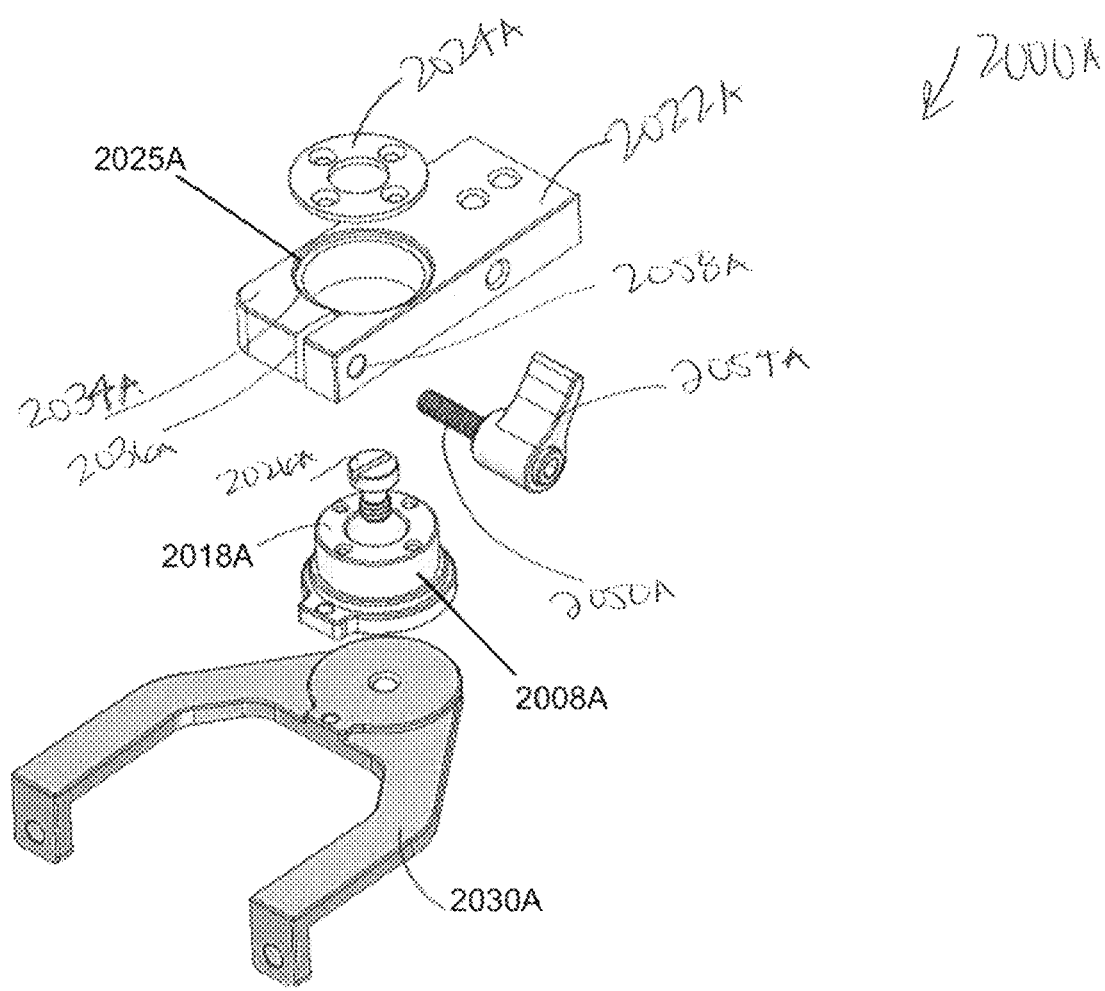
FIGS. 46 and 47 are exploded views of the swivel mount assembly of FIGS. 44 and 45.
Figure 47:
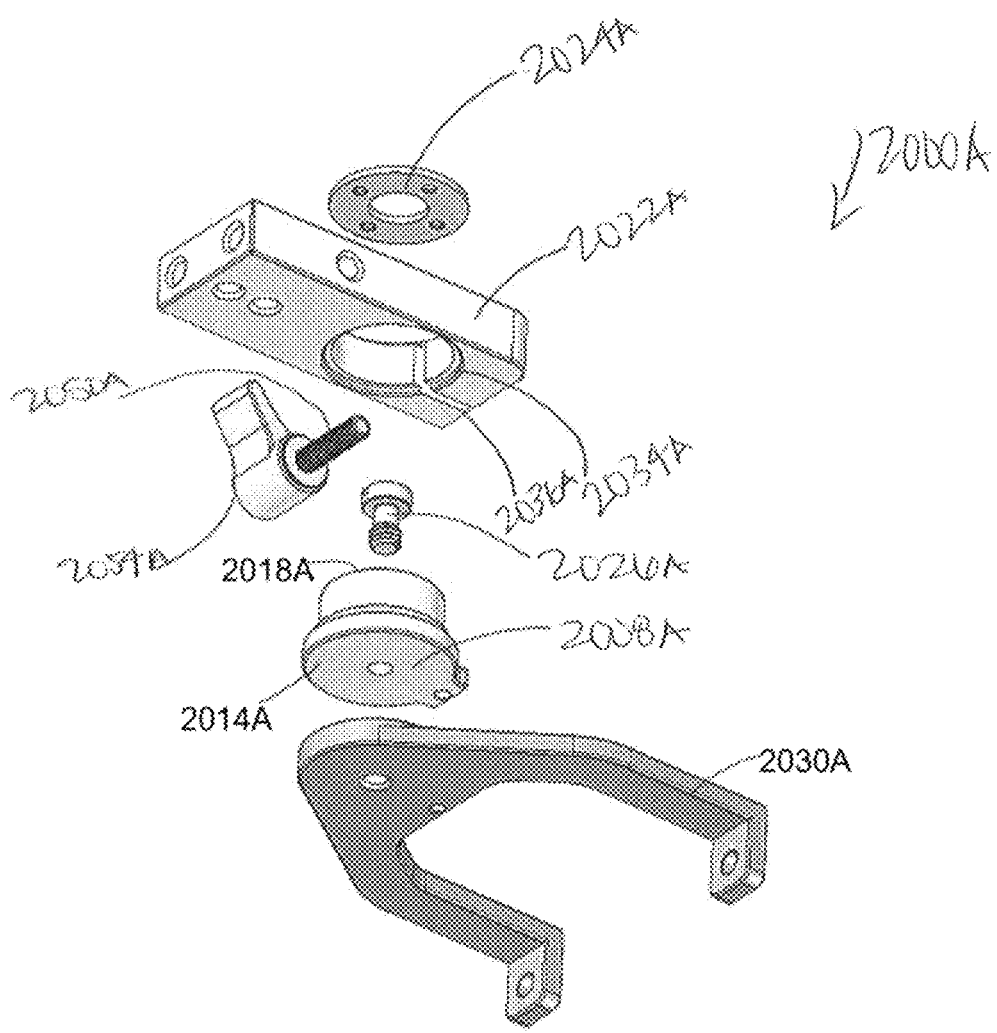

Referring to FIGS. 34-36, the carbon fiber rods 22, 26, 34, 38, which couple the handle assembly 18 and the counterweight assembly 30, respectively, to the main support assembly 14, are formed from cylindrical carbon fiber tubes 1150 with a generally smooth inner surface and first and second ends 1134, 1138. The outer diameter of the carbon fiber rods is approximately 15 mm.

Female threaded inserts 1130 are cylindrically shaped with an outer diameter proportioned for insertion into either of the first or second ends 1134, 1138. Specifically, an outer diameter of the insert 1130 is concentric with an inner diameter of the carbon fiber tubes 1150 to ensure a plumb connection. The female inserts are formed with an inner threaded surface, for example, ⅜ 16 female threads. Alternatively, a male insert 1132 (FIGS. 37 and 38) having a first end configured for insertion into either end 1134, 1138 can have a second end with an external threaded surface, for example, ⅜ 16 male threads. The inserts 1130, 1132 may be made of any suitable material, such as aluminum (e.g., 6061 aluminum), and milled or machined and permanently bonded to form a secure coupling with the inner surface of the carbon fiber tubes 1150. More specifically, the rods 22, 26, 34, 38 can be assembled by first milling or machining the necessary threads or other formations into or onto an insert 1130, 1132 and then bonding the insert to the tube 1150, or alternatively by first bonding the insert to the tube 1150 and then subsequently milled or otherwise machines while in place. The rods 22, 26, 34, 38 may include any combination of male and female inserts at either end 1134, 1138. For example, an extension rod can be formed from a carbon fiber rod having one male insert and one female insert. Additional accessories are attachable directly to the inserts 1130, 1132.

During assembly, the carbon fiber rods 22, 26, 34, 38 are coupled to the first clamping assemblies 530, 534 and the first and the second handles 590, 594 are coupled to the carbon fiber rods 22, 26. In particular, the carbon fiber rods 22, 26, 34, 38 are inserted into the openings 542, 546 of the first and second clamping assemblies 530, 534. Rotation of the levers 558, 562 tightens the clamping portions of each of the openings 542, 546 about the carbon fiber rods 22, 26, 34, 38 to secure the carbon fiber rods 22, 26, 34, 38 to the main support assembly 14.

The clamping apertures 712 of the second clamping members 674 of the handle clamping assembly 666, 668 are positioned over the free ends of the carbon fiber rods 22, 26. The first clamping member 670, which is coupled to one of the handles 590, 594, is coupled to the second clamping member 674. In particular, the serrated surfaces 704, 758 are oriented such that the through-hole 700 or partially threaded hole 700A and the threaded aperture 750 are aligned and the shaft 766 is inserted. Rotation of the release handle 762 operates to tighten or release the clamping members 670, 674 relative to one another.

Similarly, the counterweight assembly 30 is coupled to the second pair of carbon fiber rods 34, 38. The first and second openings 918, 922 of the third clamping assembly 914 are positioned over the free ends of the carbon robs 34, 38, after which rotation of the first and second release levers or actuators 938, 942 increases the clamping force on the carbon fiber rods 34, 38.

If the cheeseplate mount assembly 1400 is used, it is alternatively coupled to the second pair of carbon fiber rods 34, 38 in a similar manner as described above with respect to coupling of the counterweight assembly 30.

It should be understood that the first and the second handles 590, 594 may alternatively be coupled to the second pair of carbon fiber rods 34, 38. In this case, the counterweight assembly 30 attaches to the first pair of carbon fiber rods 22, 26, as discussed above. By switching the handle assembly 18 and the counterweight assembly 30, the direction of the camera rig 10 can be reversed. When reversed, the pads 400, 404 may also be switched to be positioned appropriately against the user's shoulders.

The camera (not shown) that is mounted to the camera mount 230 may be positioned relative to the positioning member 130 and the shoulder support member 42 along the longitudinal axis A. The positioning member 130 may be moved forward or backward in the direction of the longitudinal axis A along the top surface 50 of the shoulder support member 42. In particular, loosening the fasteners 114, 118 permits movement of the positioning member 130 forward or backward along the top surface 50 in the longitudinal direction of axis A to change the position of the positioning member 130 relative to the shoulder support member 42. Tightening the fasteners 114, 118 secures the positioning member 130 in place.

Additionally or alternatively, the camera mount 230 may be moved relative to the positioning member 130. In particular, pivoting the lever 328 moves the fastener 332 up or down along the threaded aperture 304. Pivoting the lever 328 in a first direction moves the cam member 316 downward, which reduces the frictional interaction between the tapered surface 324 and the wall 222, thereby allowing the camera mount 230 to slide relative to the positioning member 130 along the longitudinal axis A. Pivoting the lever 328 in a second direction moves the cam member 316 upward against the wall 222, which increases the frictional force against the wall 222 by the tapered surface 324 to increase the friction between the two and tends to retain the camera mount 230 relative to the positioning member 130.

The clamping action of the pivoting lever 328 is adjustable as well. Due to the twelve point recess 333, the pivoting lever 328 can be positioned on the head 334 of screw 332 in different positions such that the range of movement of the pivoting lever 328 may be adjusted. In other words, the position where the lever 328 is tight or loose may be changed by changing the position of the lever 328 relative to the screw 322. Adjusting the range of movement of the pivoting lever 328 controls the distance the screw 332 can be threaded relative to the cam member 316.

The projection 210 prevents the camera mount 230 from accidentally being removed from the positioning member 130, as it acts as a stop surface when it comes in contact with the pin 362. A user can remove the camera mount 230 by depressing the actuator 358 against the biasing mechanism such that the pin 362 is moved away from the edge 370 and away from the distal projection 210. Free of contact with the projection 210, the camera mount 230 can slide completely out of engagement with the positioning member 130.

Additionally or alternatively, the camera can be further located frontward or rearward along the longitudinal axis A by changing the position of the fasteners 258, 262 relative to the elongated groove 254 of the camera mount 230 in a similar manner as discussed above with respect to fasteners 114, 118.

Some cameras are configured to be coupled directly to the shoulder support members 42. Therefore, the positioning member 130 and the camera mount 230 are removable to allow a camera to be coupled directly to the shoulder support member 42.

The slots 568 in the clamping assemblies 530, 534 are slidable along the projections 82, 86 on the shoulder support member 42 (or the projections 268 on the camera mount 230) in order to vertically position the clamping assemblies 530, 534. It is desired in the industry to maintain a distance of 85 mm between a center of the camera lens and a center of the rods 22, 26. Therefore, the clamping assemblies 530, 534 are adjustable relative to the main support assembly 14 to ensure that a distance of 85 mm can be maintained between the rods 22, 26 and any camera lens.

The third handle 1028 can also be laterally positioned relative to the longitudinal axis A. In particular, the release lever 1070 is loosened such that the handle mount 1026 is able to slide along the rails 974, 978 of the positioning member 962 of the counterweight assembly 30. Once appropriately positioned, the release lever 1070 is tightened to re-secure the handle mount 1026 to the positioning member 962.

In operation, certain additional features of the camera rig 10 can be manipulated based on the changing needs of the user. The camera rig 10 may be used with a tripod (not shown) in a first position (FIGS. 1, 3, 5,) or may be stabilized by the user's shoulder in a second position (FIG. 2, 4, 6). To facilitate this change in function, the mount 420 is pivotable between the illustrated first and second positions.

Figure 18:
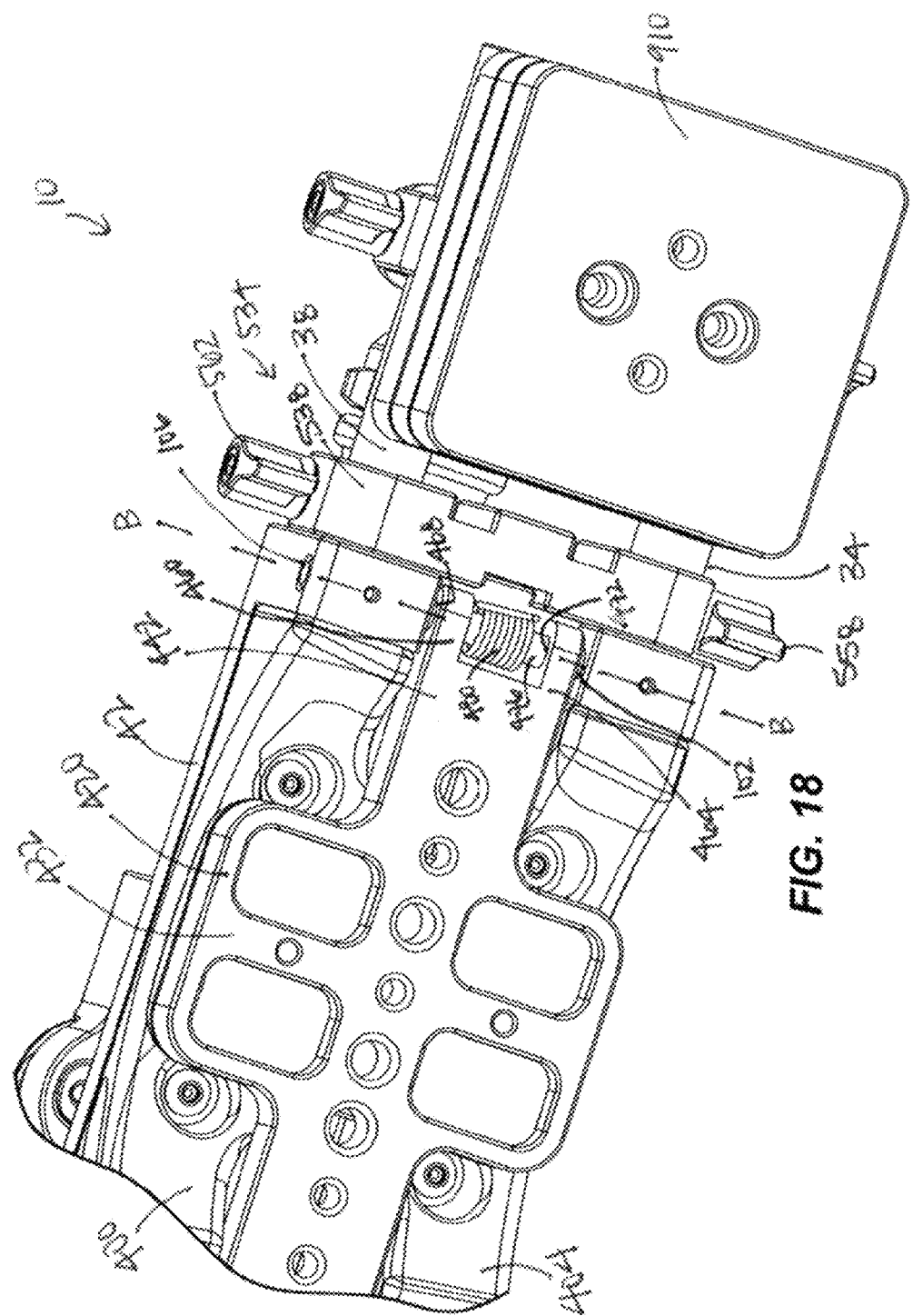
FIG. 18 is another enlarged partial view of the camera rig of FIGS. 1 and 2.

In the first position, the front side 438 of the mount 420 is received and secured within the first notch 94 of the first leg 74 such that the cam member 488 is positioned between the mount 420 and the shoulder support structure 42 (see FIGS. 16-18). When in the first position, the actuating lever 500 maintains a substantially upward force on the cam member 488. In particular, the engagement surface 508, which is biased into the first position, engages the cam surface 492 of the cam member 488, which retains the mount 420 adjacent the pads 400, 404. In this position, the bottom surface 442 of the mount 420 is flush with the bottom of the shoulder support member 42 and the apertures 454 extending through the mount 420 are accessible to be coupled to a support surface or interface of a tripod (not shown).

Figure 4:
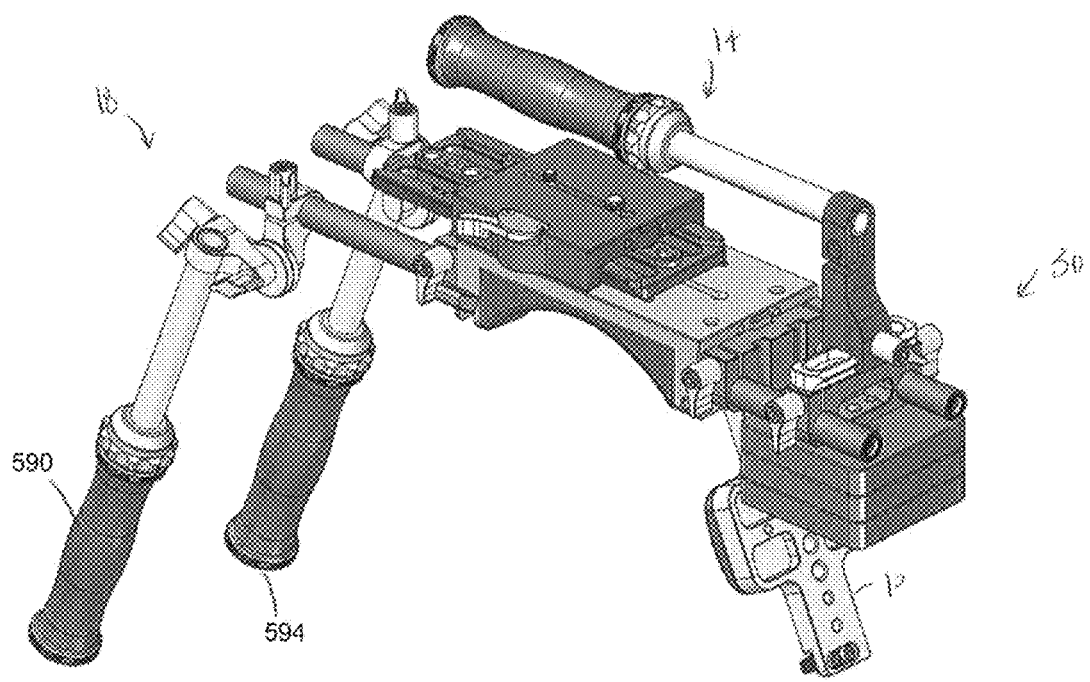
Figure 5:
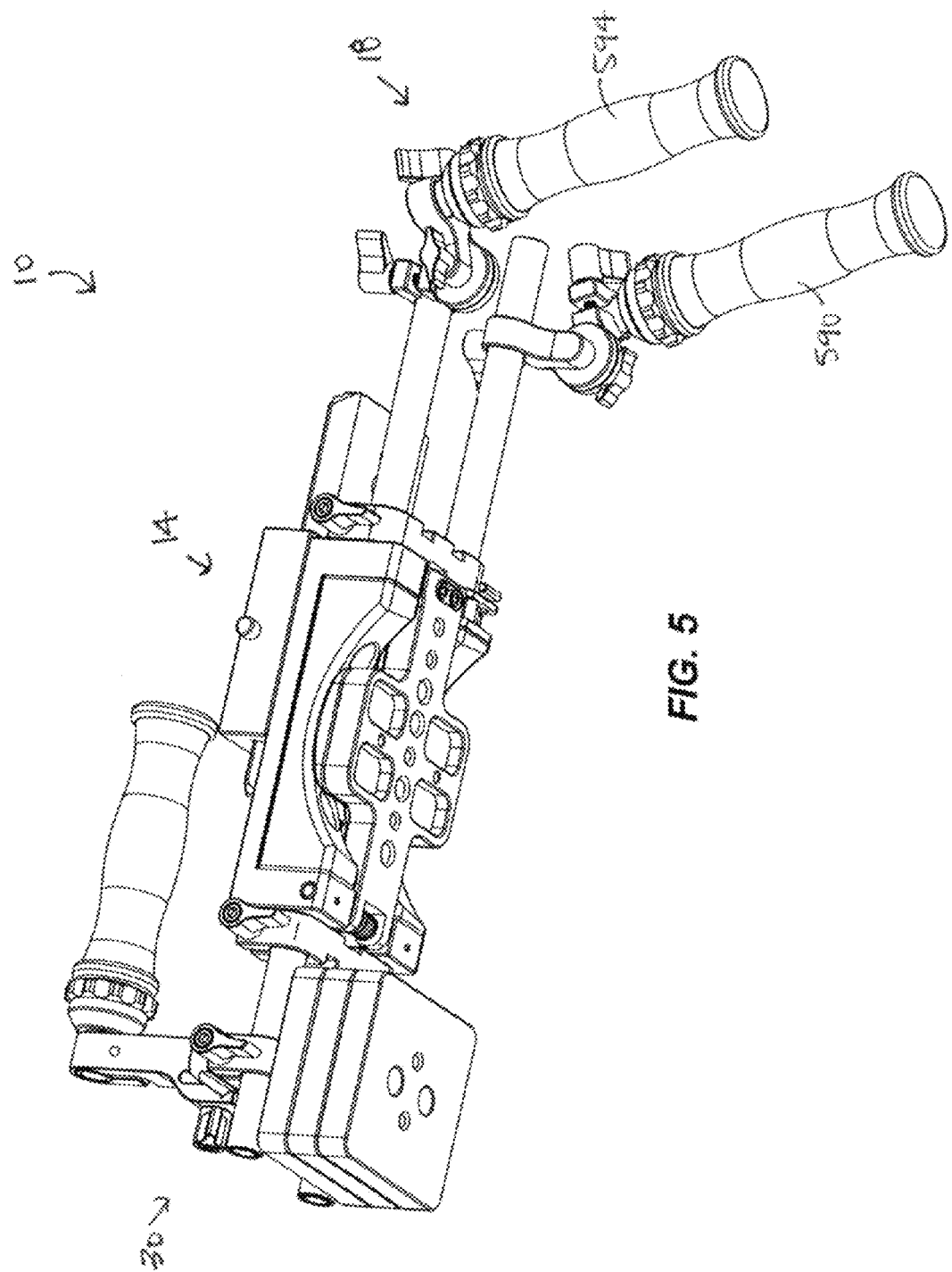
FIGS. 5 and 6 are bottom perspective views of the camera rig illustrated in FIGS. 1 and 2.
Figure 6:
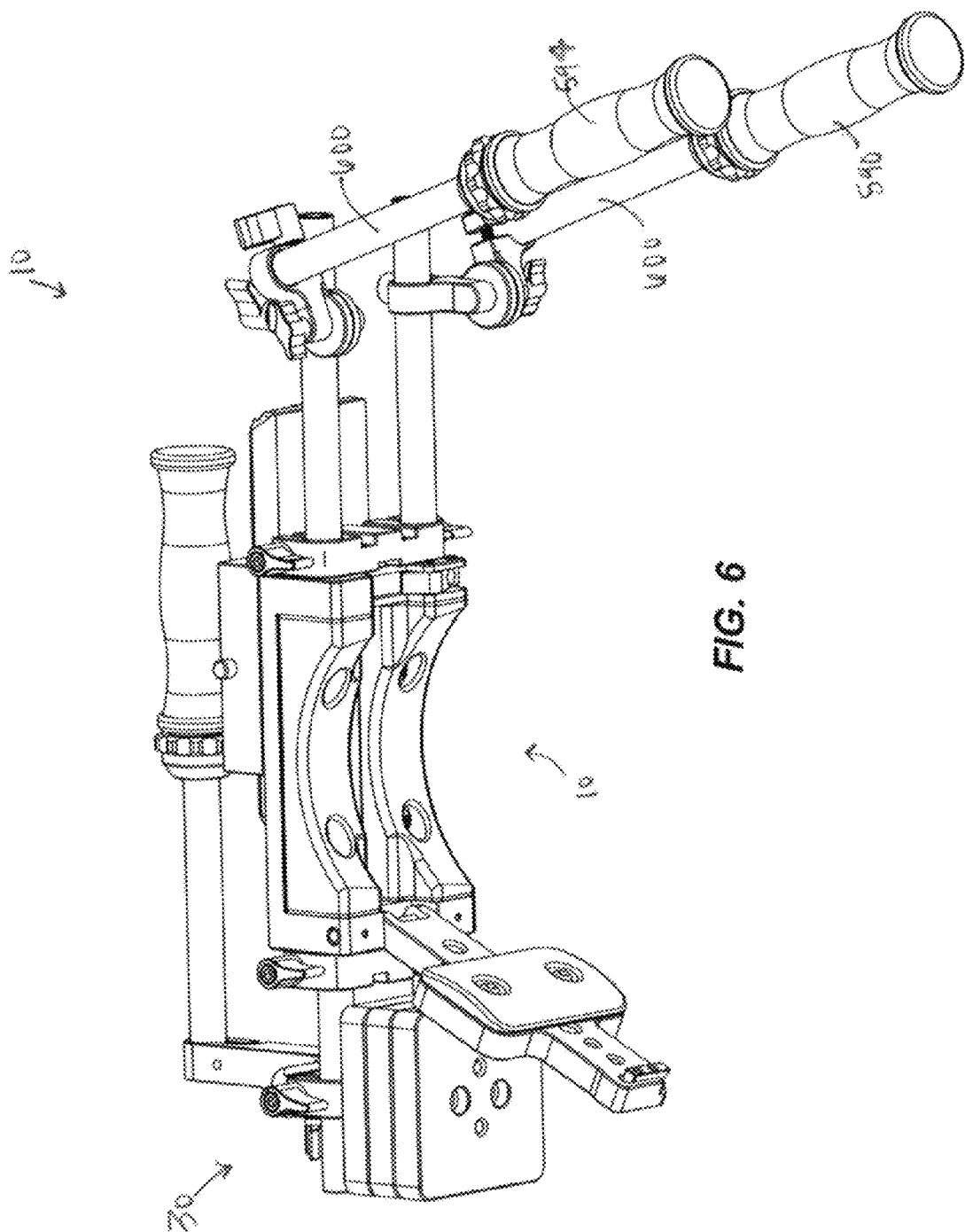

To move the mount 420 from the first position to the second position, a user depresses the arm 504, which pivots the engagement surface 508 out of contact with the cam surface 492 of the cam member 488. The mount 420 is biased to the second position by the biasing member 480 such that releasing the engagement surface 508 permits the front side 438 of the mount 420 to swing downwardly and remain generally as shown in FIGS. 2, 4, 6. The body 538 of the second clamping assembly 534, which is adjustable along the alignment projection 82, determines a stop surface that limits the rotation of the mount 420 when in the second position. In particular, movement of the mount 420 ceases when the bottom surface 432 contacts the body 538. With the mount 420 in the second position, the pads 400, 404 are accessible to be supported by a user's shoulder and the pad 446 is positioned to be adjacent to the user's rear torso (e.g., upper back) for mobile use of the attached camera. Alternatively, if in the reversed configuration in which the handle assembly 18 and the counter weight assembly 30 are switched, the pivotable member 420 swings forward such that the pad 446 rests against the user's front torso (e.g., chest). When use of the tripod is necessary, the mount 420 can be moved back to the first position by manually forcing it against the bias of the biasing member 480 to the first position. The user transforms the rig 10 from shoulder mountable to tripod mountable by swinging the mount 420 into or out of place.

In an embodiment with a friction joint in lieu of a biasing spring 480, the friction developed by the friction joint is sufficient to retain the mount 420 in the first position and in the second position. In such a case, the alternative or additional lever moves a wedge or wedge member against the mount 420, which must be retracted in order to manually move the mount 420 into the second or open position.

When assembled, the first and the second handles 590, 594, 590A, 594A and/or the third handle 1028, 1028A of the counterweight assembly 30 may be adjusted as well. The handles 590, 594, 1028 can be retracted or extended in a telescoping manner to change the length thereof. In particular, the handles 590, 594, 1028 are movable between a fully retracted position (FIGS. 1, 3, 5) and a fully extended position (FIGS. 2, 4, 6). Telescoping of the handles 590, 594, 1028 is infinitely variable such that any position between the retracted and extended positions can be achieved.

To move one or more of the handles 590, 594, 1028 between the fully retracted position and the fully extended position, the locking member 638 is rotated in a first direction to loosen the collar 654 relative to the inner rod 600. While the locking member 638 is loose, the outer rod 612 can slide relative to and along the inner rod 600 to increase or decrease the length of the handles 590, 594, 1028. Once the length is appropriately adjusted, the locking member 638 is rotated in an opposite direction to tighten the clamping member 654 about the inner rod 600, thereby locking the handles 590, 594, 1028 in a desired position.

To move one or more of the handles 590A, 594A, 1028A between the fully retracted position and the fully extended position, the release lever 661A is rotated in a first direction to loosen the clamping aperture 660A relative to the inner rod 600A. While the clamping aperture 660A is loose, the outer rod 612A can slide relative to and along the inner rod 600A to increase or decrease the length of the handles 590A, 594A. Once the length is appropriately adjusted, the release lever 660A is rotated in an opposite direction to tighten the clamping aperture 660A about the inner rod 600A, thereby locking the handles 590A, 594A in a desired position.

Additionally, the first and the second handles 590, 594, 590A, 594A of the handle assembly 18 can be pivotably adjusted relative to the carbon fiber rods 22, 26. To adjust the rotational position of the handles 590, 594, a user loosens the handles 762 of the first and the second clamping assemblies 666, 668. The interaction between the threaded shaft 766 and the threaded aperture 750 separates the faces 704, 758 and thus the first and second clamping members 670, 674. With the serrated faces 704, 758 no longer in contact, a user can rotate the second portion 674 relative to the first portion 670 and into a new relative angular position. The user then tightens the handles 762, drawings the serrated faces 704, 758 together and locking them relative to each other.

Referring to FIGS. 39-43, a swivel mount 2000 can be coupled to the camera rig 10 for mounting an electronic viewfinder 2004 ("EVF"). The swivel mount 2000 includes a rotatable member 2008 with a first end 2014 configured for connection to the EVF 2004 and a second end 2018 pivotable when received within an arm 2022. The rotatable member 2008 includes a threaded fastener 2026 extending therethrough for coupling the swivel mount 2000 to a bracket 2030, to which the EVF 2004 is attached. In some embodiments, the rotatable member 2008 is coupled directly to an EVF 2004. The first arm 2022 is fixedly coupled to an articulating arm (not shown), which is known in the industry and couples directly to a camera rig.

The second end 2018 of the movable member 2008 includes a circumferential channel 2032 and is configured to be rotatably received within an aperture 2034 of the arm 2022. The arm 2022 has one or more radially oriented holes 2042, 2050 each configured to receive an adjustment or set screw. The set screw(s) can be positioned toward or away from the channel 2032 to add or reduce the angular friction necessary to adjust the member 2008. The first arm 2022 also includes additional apertures 2058 for receiving other fasteners (not shown) as needed. In operation, a user manually adjusts a rotational position of the EVF 2004 relative to the arm 2022. The set screws can be tightened as desired to more securely retain the EVF 2004 in a certain position.

FIGS. 44-47 illustrate an alternative embodiment of the swivel mount 2000A. The swivel mount 2000A includes a rotatable member 2008A with a first end 2014A configured for connection to the EVF and a second end 2018A extending into a first arm 2022A. Specifically, the rotatable member 2008A is received within a clamping aperture 2034A of the arm 2022A. An annular plate 2024A is secured to the second end 2018A of the rotatable member 2008A and positioned flush against the arm 2022A in a circumferential recess 2025A. A threaded fastener 2026A extends through the plate 2024A and the rotatable member 2008A, and is threadingly coupled to a bracket 2030A. Like the arm 2022 discussed above, the arm 2022A is fixedly coupled to an articulating arm (not shown) known in the industry.

The clamping aperture 2034A of the arm 2022A is similar to the other clamping apertures discussed herein. In other words, the clamping aperture 2034A includes a channel 2036A that defines opposing clamping portions. When the movable member 2008A is positioned within the clamping aperture 2034A, a threaded shaft 2050A of a release lever or actuator 2054A extends through a passage 2058A of the two clamping portions. As discussed above, rotation of the release lever 2054A operates to tighten or release the clamping aperture 2034A and therefore a clamping force on the movable member 2008A. In operation, a user manually adjusts a rotational position of the EVF 2004 relative to the arm 2022A. The lever 2054A can be tightened and loosened as desired to more securely rotate and secure retain the EVF in a certain position.

Figure 48:
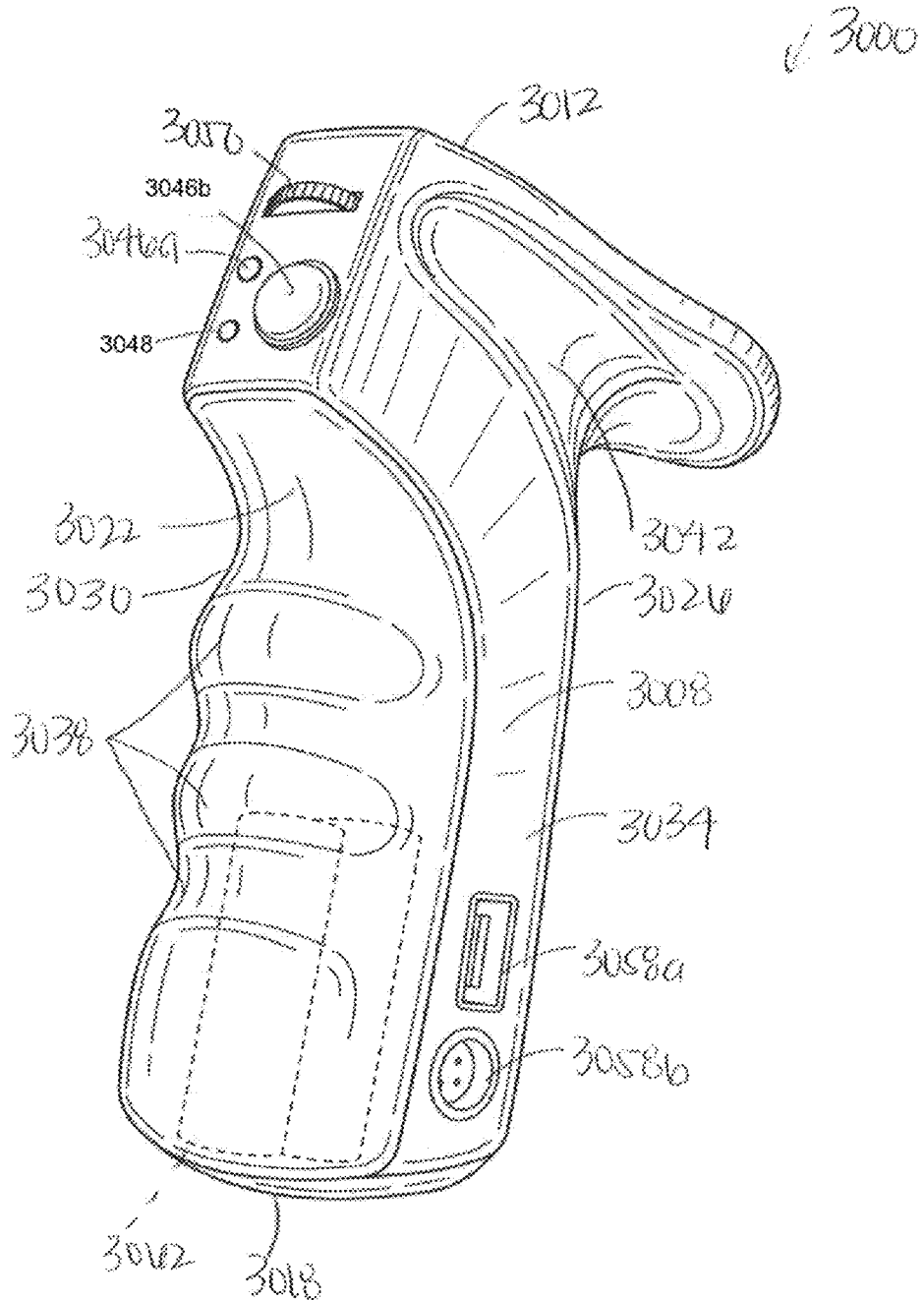
FIG. 48 is a perspective view of a smart grip handheld controller.

Referring to FIG. 48, an ergonomic grip or "smart grip" 3000 is single-handedly operable to control certain functions of a camera. The smart grip 3000 includes a body 3008 ergonomically formed to fit a user's hand. For example, FIG. 48 shows a grip formed for a right-hand user, though the grip could be alternatively formed for a left-hand user. The grip 3000 includes a top surface 3012, a bottom surface 3018, a front side 3022, a back side 3026, a first side 3030, and a second side 3034. The front side 3022 and the first side 3030 of the smart grip 3000 include an outer surface having finger grooves 3038 that ergonomically and appropriately place the user's fingers. Similarly, the back side 3026 and the second side 3034 include an outer surface having a groove 3042 for the user's thumb. The front side 3022 presents one or more buttons 3046a, 3046b and a turn dial 3050 that are all communicatively coupled to a control unit (i.e., circuit board, not shown) that is housed within the body 3008. For example, when pressed or actuated, the first button 3046a may be a power ON/OFF button, with an indicator 3048 indicating whether or not the power is on or off. For example, the indicator 3048 may be an LED that is on when the power is on and off when the power is off. The second button 3046b may electronically focus (i.e., autofocus) the view, electronically control one or more LEDs, and or electronically start and stop the camera's recording function. The turn dial 3050 may also control the camera aperture. Interfaces 3058a, 3058b are included on the second side 3034 as well to enable the smart grip 3000 to communicate with the camera through wired connections. For example, a USB interface 3058a can communicate with USB capable cameras (i.e., video capable DSLRs) and a four-pin interface 3058b can communicate with certain cinema style cameras. In other embodiments, a Lanc interface (not shown) can communicate with video camcorder types of cameras. Each of the above-described connections can provide power to the smart grip as well. Alternatively, the smart grip may be configured for wireless communications with the camera. The smart grip 3000 may also be battery powered (i.e., include one or more batteries 3062) if necessary. In one embodiment, the smart grip 3000 can replace one of the first or the second handles 590,594 of the handle assembly 18 of the camera rig 10.

Another alternative camera rig 4010 is generally shown in FIGS. 49 and 51-55 and in some respects is similar to the camera rigs of FIGS. 1-38, described above. Therefore, like structure will be indicated with like reference numbers and only the differences further detailed below.

Figure 49:
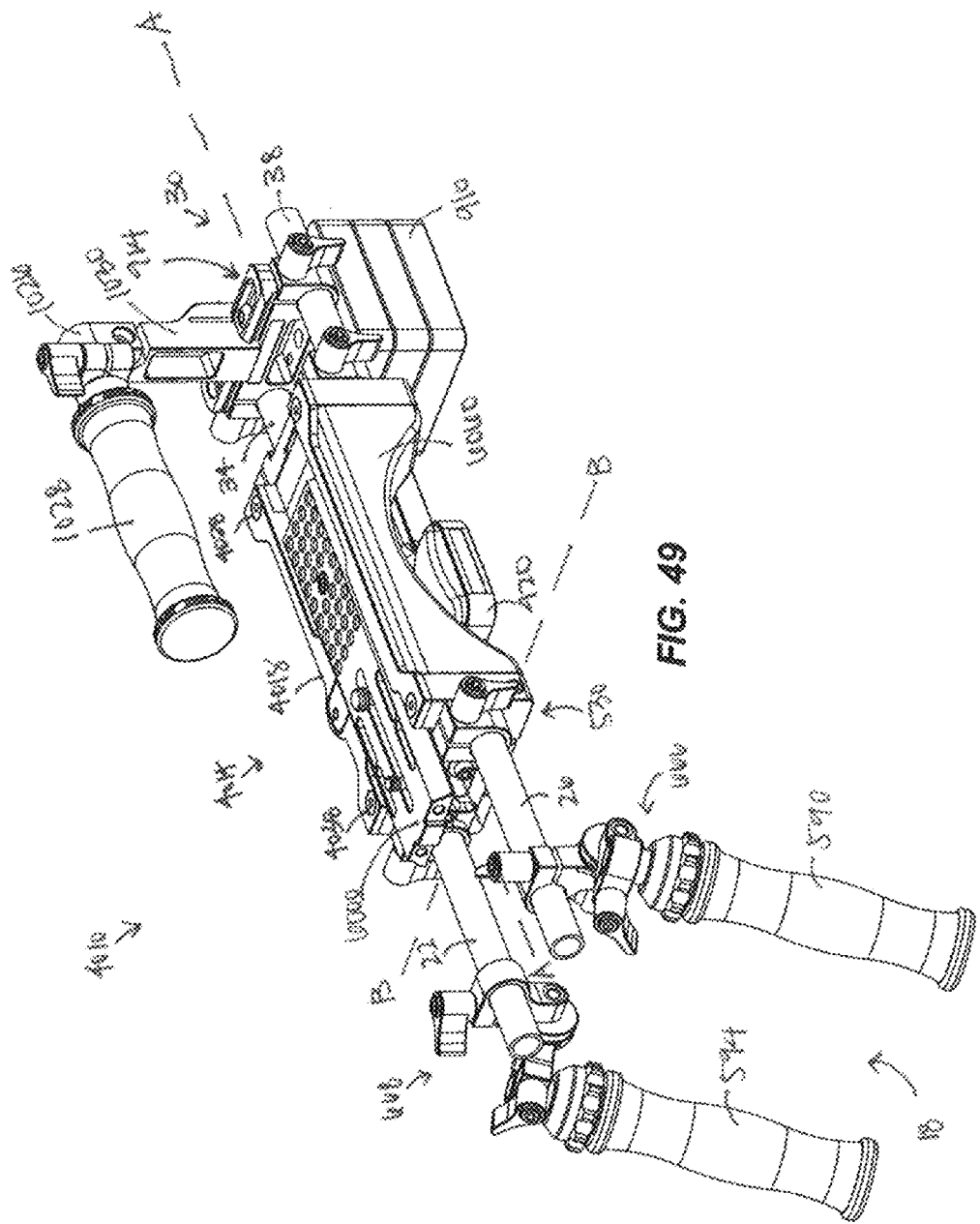
FIG. 49 is a front perspective view of another camera rig including a main support assembly, a handle assembly, and a counterweight assembly.

The camera rig 4010 includes a main dual-purpose support assembly 4014 coupled to a handle assembly 18 by a first pair of carbon fiber rods 22, 26 and to a counterweight assembly 30 by a second pair of carbon fiber rods 34, 38. The camera rig 4010 defines a longitudinal axis A (FIG. 49). In the embodiment of FIGS. 49 and 51-55, the handle assembly 18 is similar to that of handle assembly 18 of FIGS. 23 and 24, however, in other embodiments, the handle assembly 18A of FIGS. 23A and 24A may be used instead.

With further reference to FIGS. 54-57, the main support assembly 4014 includes a shoulder support member 4018 with a frame or body 4022 having a first leg 4026 and a second leg 4030 that are coupled to a center member 4034 by fasteners 4038 (i.e., screws and the like of FIG. 49). The first leg 4026 defines a first end and the second leg 4030 defines a second end. When coupled, the first leg 4026, the second leg 4030 and the center member 4034 define an elongate channel 4050. The elongate channel 4050 includes a first side 4052 that has a first groove 4054 defining a tapered surface and a second side 4056 that has a second groove 4058 defining a tapered surface. An elongated slot 4062 of the channel 4050 extends therethrough from an upper surface 4066 to a lower surface 4070 and is generally parallel to the longitudinal axis A.

The center member 4034 includes first and second cutaways 4080, 4084 on opposite ends thereof that are sized and shaped to receive the first and the second legs 4026, 4030, respectively. In particular, the first and the second legs 4026, 4030 each include raised portions 4088, 4092 that define a recess 4094 therebetween. Accordingly, the raised portions 4088, 4092 are received by the cutaways 4080, 4084 and the recessed portions 4094 partially define the elongate channel 4050. Therefore, as shown in FIGS. 54-57, the first and the second legs 4026, 4030 are sized and shaped to be matingly coupled to the center member 4034 and also further extend the elongate channel 4050. In other embodiments, the first and the second legs 4026, 4030 may be integrally formed with the center member 4034.

Additionally, each of the legs 4026, 4030 includes an alignment projection 5000, 5004 oriented perpendicularly to the longitudinal axis A. The alignment projection 5004 is removably coupled to the second leg 4030. The first leg 4026 further forms a first notch 5008 extending parallel to the longitudinal axis A and a recess 5012 extending transverse to the longitudinal axis A. The second leg 4030 forms a second notch 5016 extending parallel to the longitudinal axis A and an aperture 5020 extending generally transverse to axis A.

Figure 55:
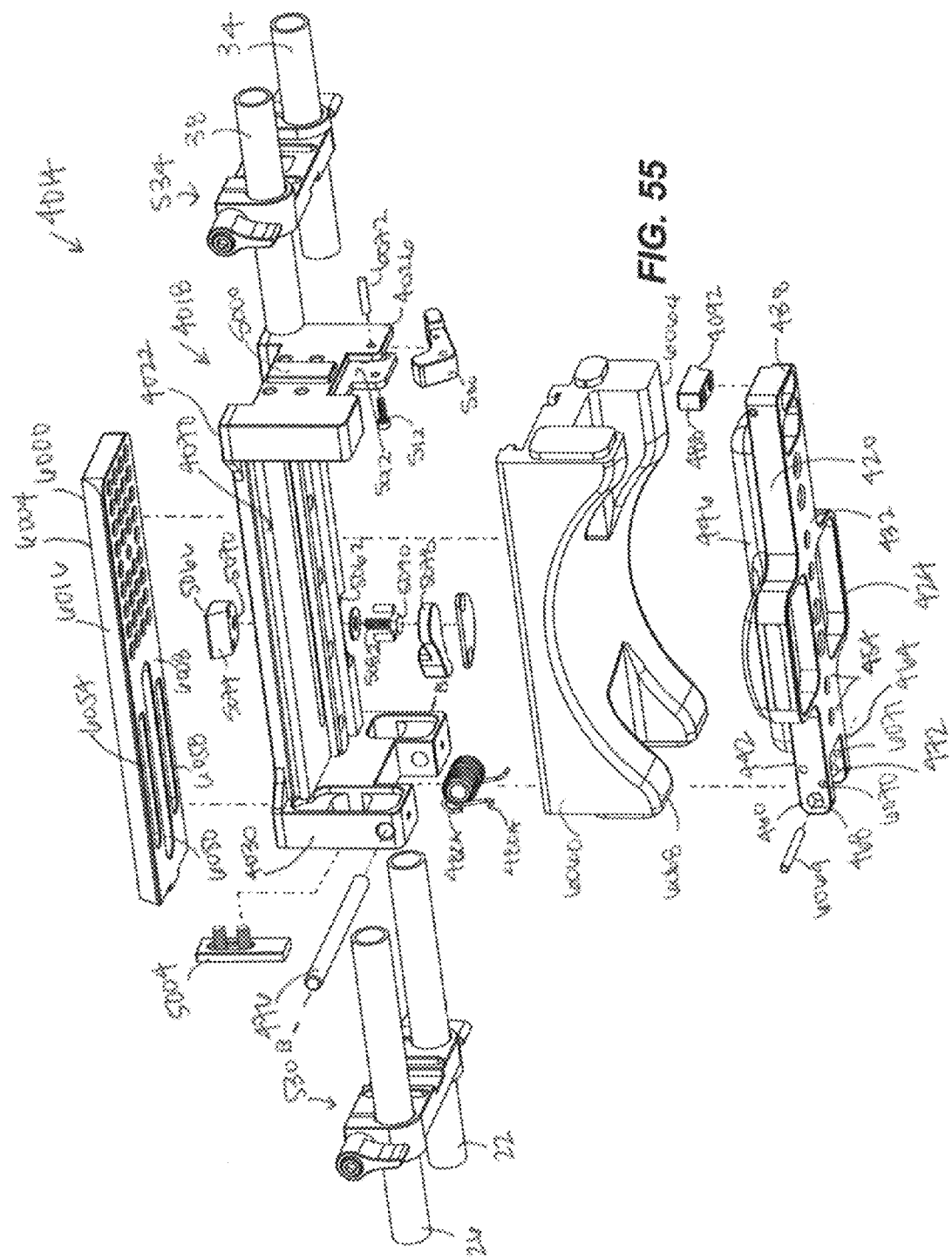
Figure 56:
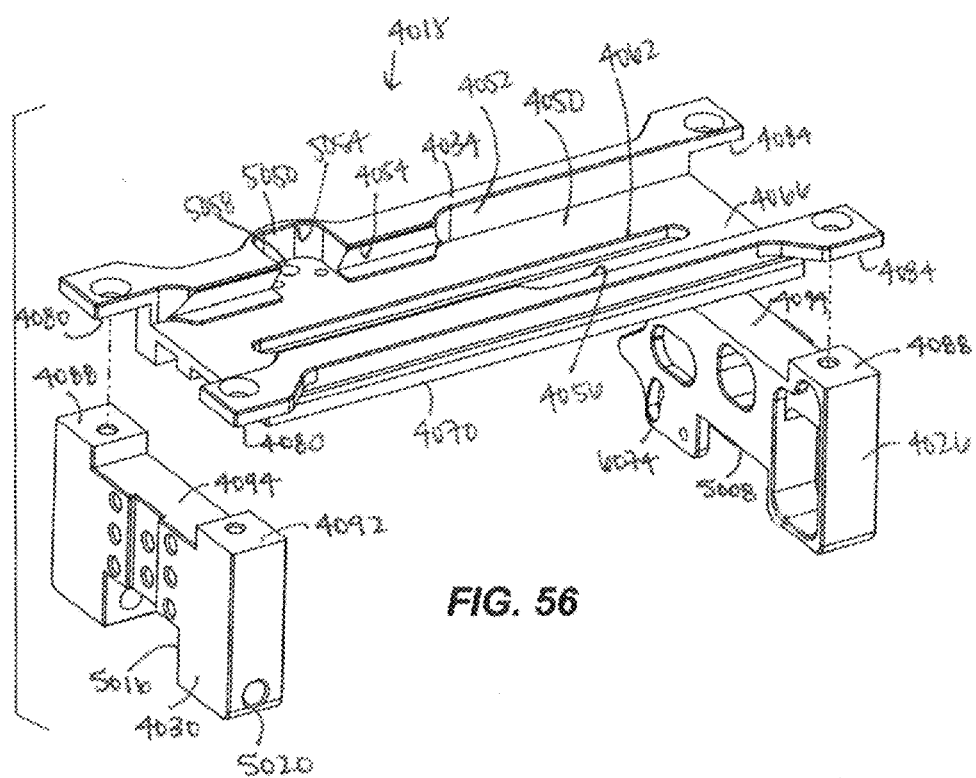
FIGS. 56 and 57 are exploded views of the shoulder support member of the main support assembly illustrated in FIGS. 54 and 55.
Figure 57:
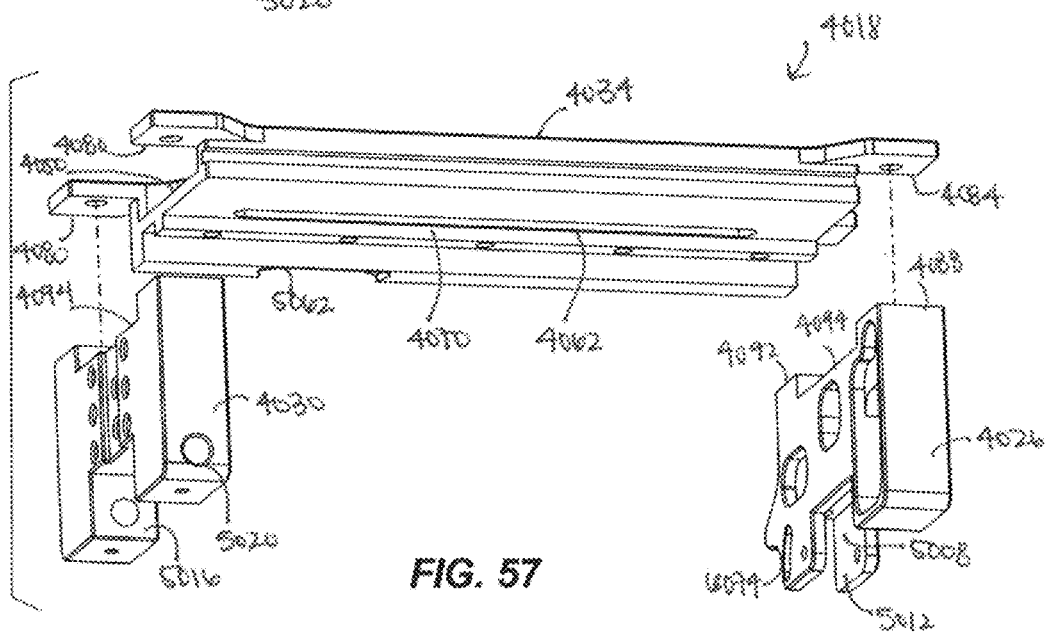
Figure 58:
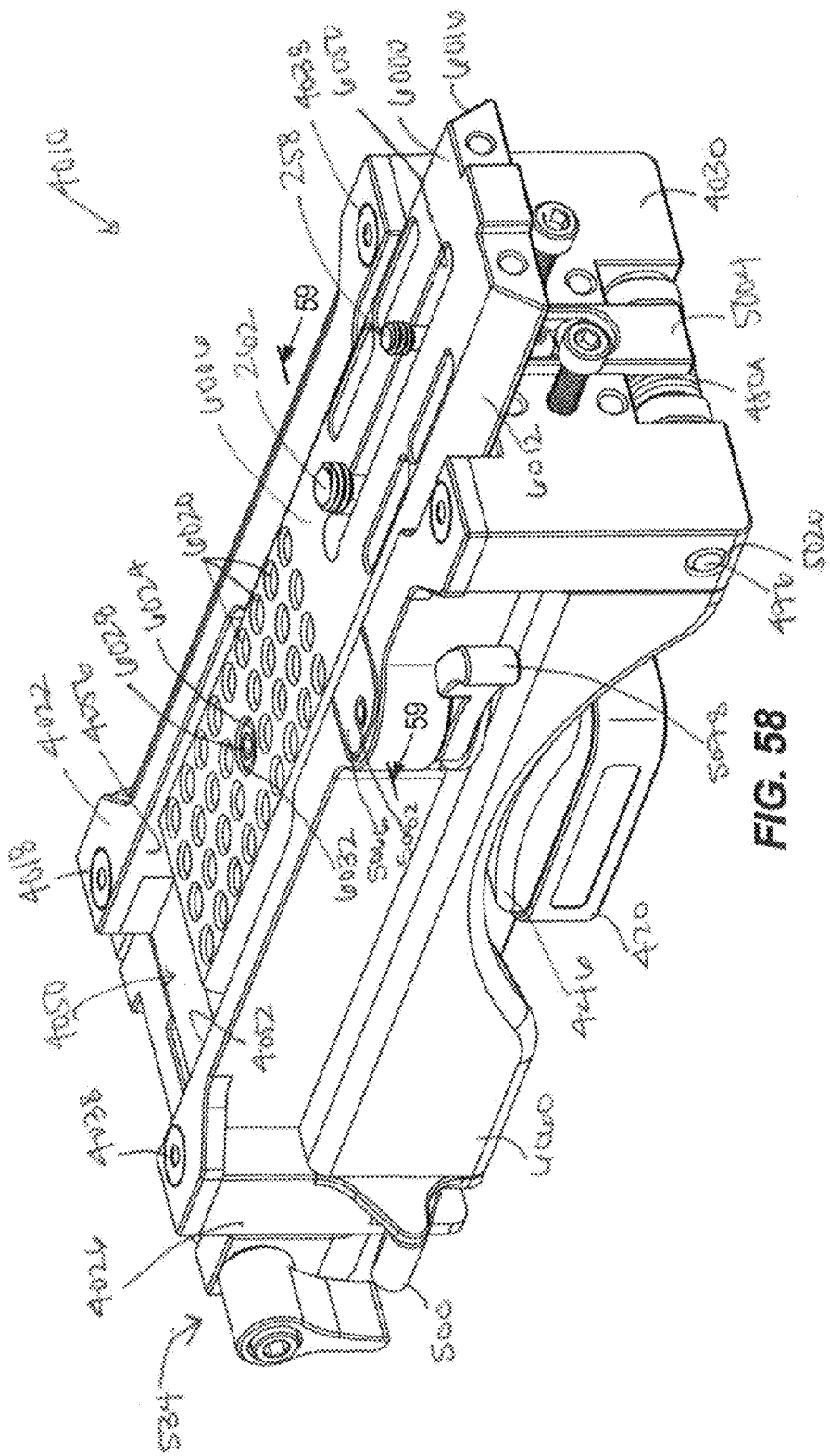
FIG. 58 is a perspective view of the main support assembly illustrated in FIGS. 54 and 55.
Figure 59:
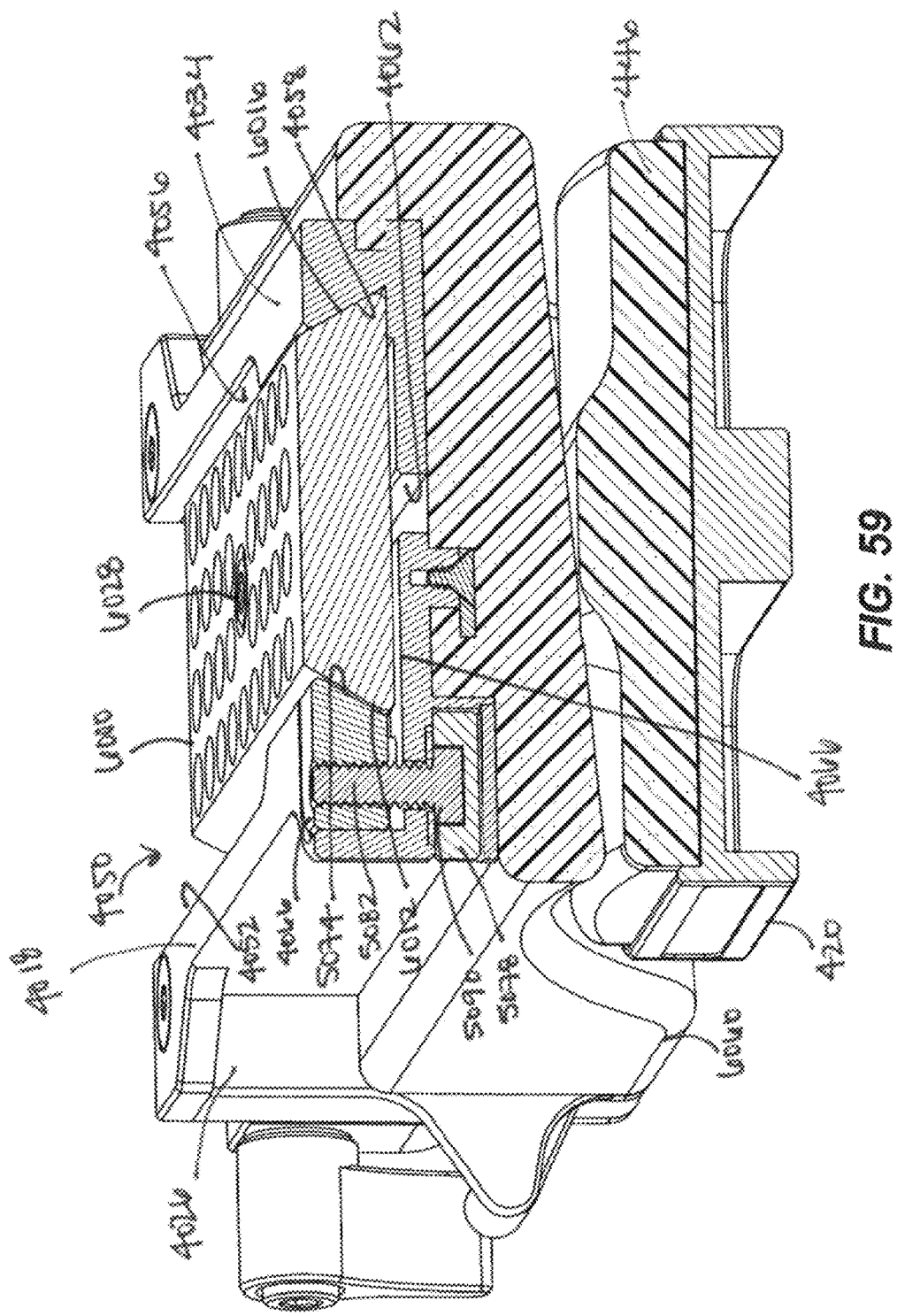
FIG. 59 is a section view along section line 59-59 of FIG. 58.

A substantially arcuate projection 5050 is formed as a recess 5054 within the first side 4052 of the shoulder support member 4018. The projection 5050 defines an aperture 5058 and an opening 5062 (FIGS. 55 and 57). The recess 5054 is configured to receive a cam member 5066 having a threaded aperture 5070. The cam member 5066 includes a tapered surface 5074 substantially flush with the tapered surface of the first groove 4054, as shown in FIG. 59. A lever 5078 slideably secured within the opening 5062 to the projection 5050 is operably and removably coupled to an actuating screw 5082 extending through the apertures 5058, 5070. In particular, the lever 5078 includes a recess 5086 that is sized and shaped to receive and secure a head 5090 of the actuating screw 5082. In the illustrated embodiment, the recess 5086 is a twelve point recess, although other embodiments may include recesses 5086 with different configurations.

Referring again to FIGS. 54-55, a positioning member 6000 is translatably received by the grooves 4054, 4058 in the shoulder support member 4018. The positioning member 6000 includes a body 6004 having a top surface 6006, a bottom surface 6008, a first side 6012 defining a first tapered wall, and a second side 6016 defining a second tapered wall. The first and the second sides 6012, 6016 are configured to be received within the grooves 4054, 4058, respectively, such that the tapered walls of the positioning member 6000 engage the tapered surfaces of the grooves 4054, 4058 of the shoulder support member 4018, the interaction of which slidably couples the positioning member 6000 to the shoulder support member 4018.

The positioning member 6000 includes a plurality of cylindrical apertures 6020 that extend perpendicular to the longitudinal axis A. A central cylindrical aperture 6024 is configured to receive a threaded a fastener 6028. In one embodiment, a first end 6032 of the fastener 6028 is flush with the top surface 6006 of the positioning member 6000 and a second, threaded end (not shown) of the fastener 6028 extends through the positing member 6000 into the elongate slot 4062 in the shoulder support member 4018. As such, the fastener 6028 is slidable with the positioning member 6000 along the length of the slot 4062.

The positioning member 6000 includes a central elongate aperture 6050 and peripheral elongate aperture pairs 6054, 6058 on either side of the central elongate aperture 6050. The elongate apertures 6050, 6054, 6058 extend parallel to the longitudinal axis A. A pair of threaded fasteners 258, 262 extends through the central elongate aperture 6050. In one embodiment, the fasteners 258, 262 may be differently sized. The diameter of each projecting end of each fastener 258, 262 is larger than a width of the central elongate aperture 6050, while the diameter of each shaft of fasteners 258, 262 is smaller than the width of the central elongate aperture 6050. As such, the fasteners 258, 262 are slidable along the length of the central elongate aperture 6050 but will not fall through the central elongate aperture 6050 if not otherwise secured. A top end of each of the fasteners 258, 262 is configured to threadingly couple to a camera (not shown) thereby securing the camera to the positioning member 6000 and accordingly to the main support assembly 4014.

Referring again to FIGS. 54-55, the main support assembly 4014 further includes a pad 6060 integrally formed and coupled to the bottom surface 4070 of the shoulder support member 4018. The pad 6060 extends between the first leg 4026 and the second leg 4030 and defines two pad portions that form a substantially arcuate edge portion 6064, 6068. The shoulder pad 6060 is constructed from a soft, cushioning material such as rubber (e.g., foam rubber), a gel, silicone, or similar substances. In other embodiments, the pads 400, 404 discussed above and shown in FIGS. 7-8 may alternatively be used.

A pivotable support member in the form of a tripod plate or mount 420 (FIGS. 54-55) includes a body 424 having a top surface 428, a bottom surface 432, a first side 438, and a second side 442. An arcuate pad 446 is secured to the top surface 428 and substantially conforms to the edge portions 6064, 6068. The pad 446 is constructed from a soft material such as rubber (e.g., silicone). The bottom surface 432 is substantially flat and forms a mounting surface for the camera rig, e.g., for mounting the camera rig to a tripod (i.e., tripod interface). In particular, a series of tapped holes 454 are positioned to interface with different tripod quick release plates (not shown). In the illustrated embodiments, the tapped holes 454 are ¼ 20 and ⅜ 16 tapped holes, although other size tapped holes may be used as necessary.

Figure 50:
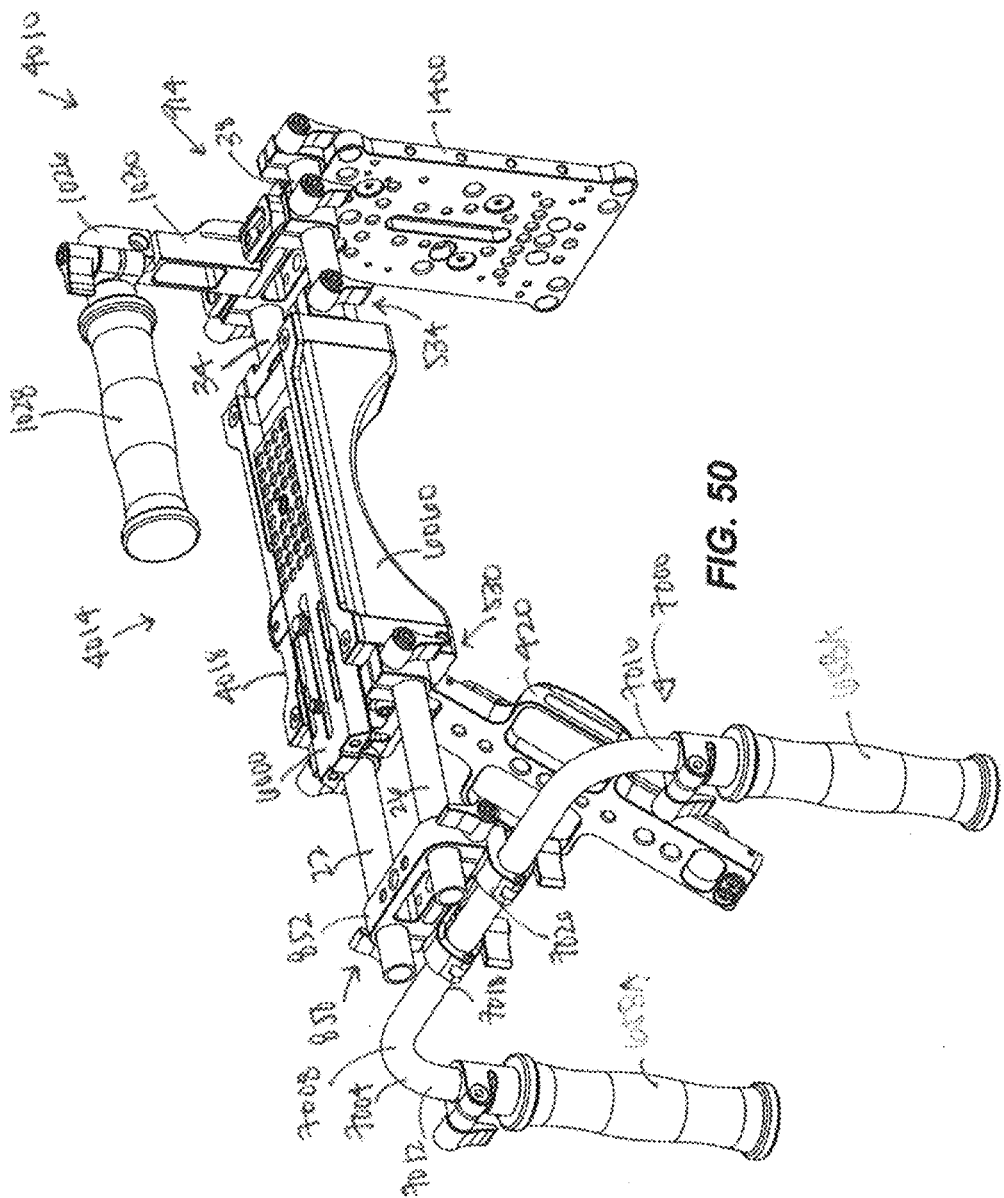
FIG. 50 is a front perspective view of another camera rig including a main support assembly, a handle assembly, and a counterweight assembly.
Figure 51:
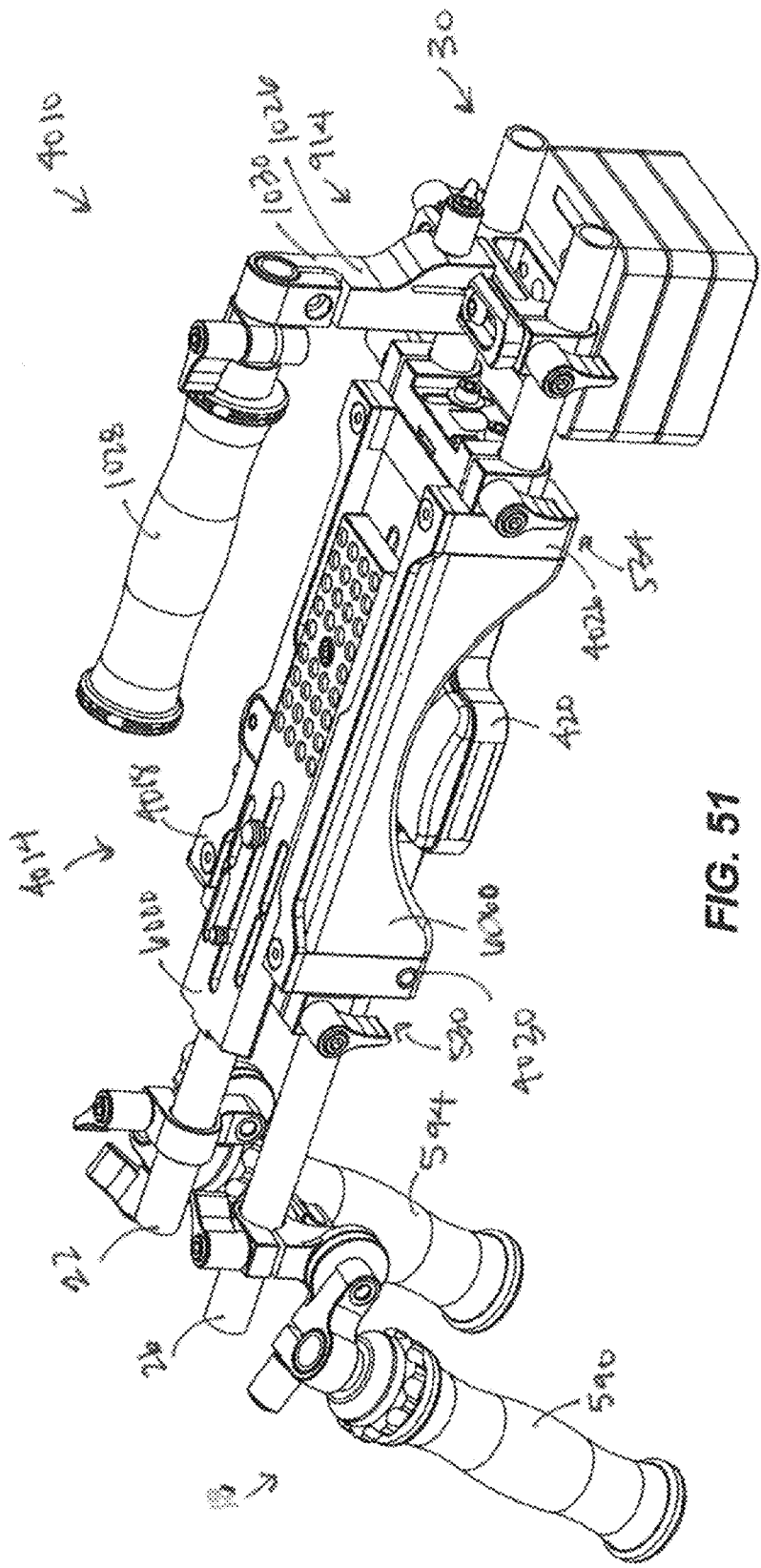
FIG. 51 is a rear perspective view of the camera rig illustrated in FIG. 49.
Figure 52:
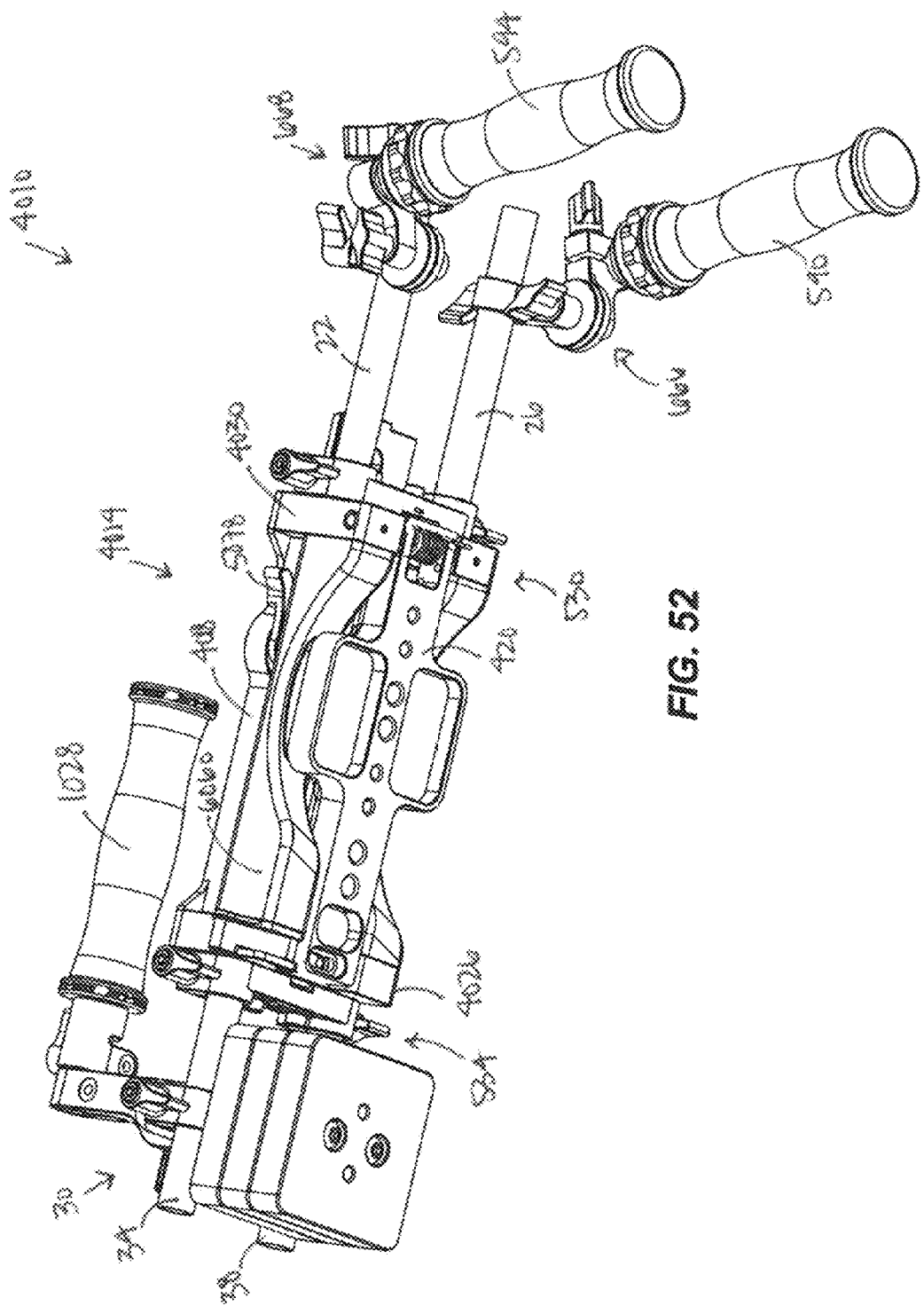
FIGS. 52 and 53 are bottom perspective views of the camera rig illustrated in FIG. 49.
Figure 54:
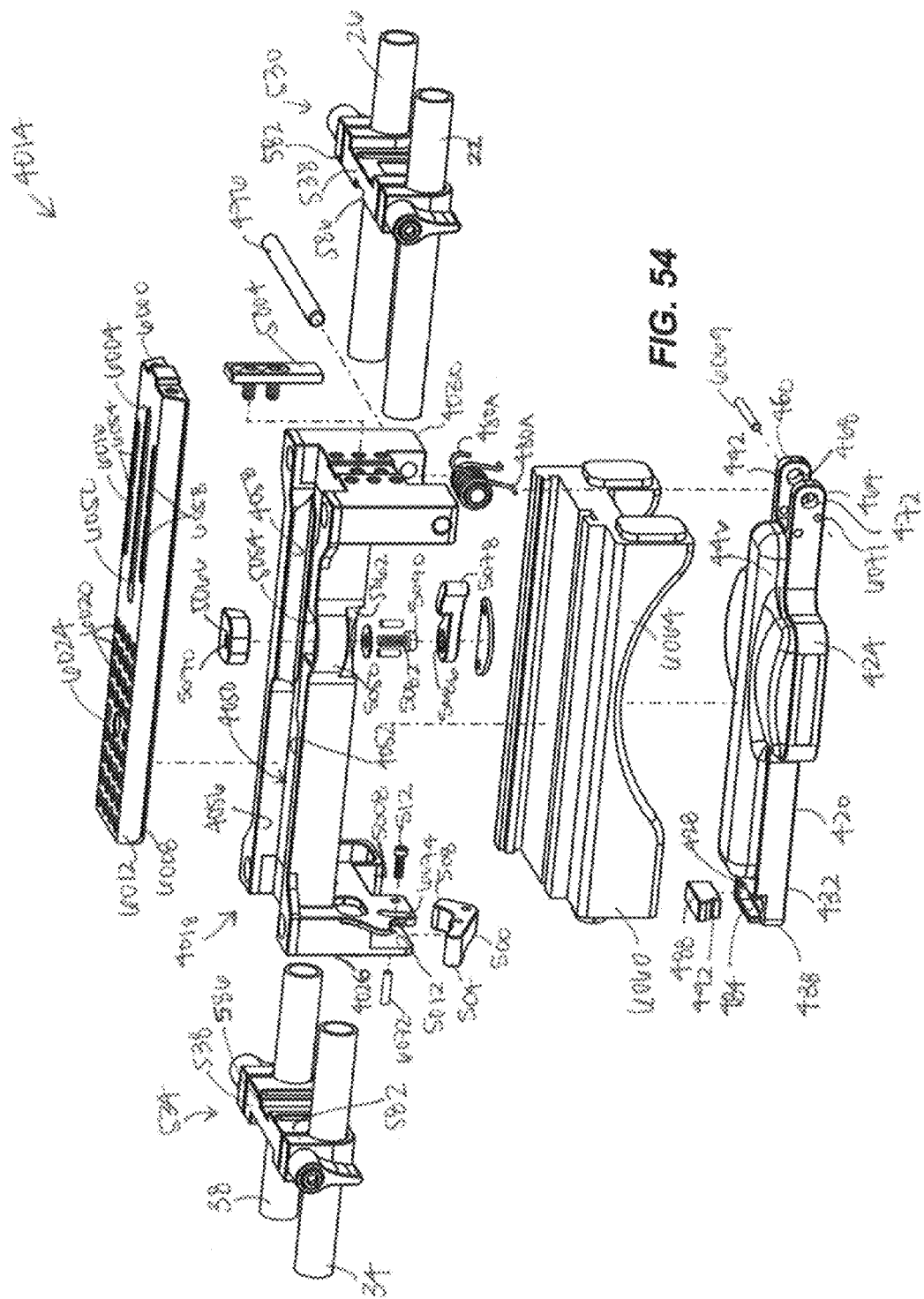
FIGS. 54 and 55 are exploded views of a main support assembly of the camera rig illustrated in FIG. 49.

The second side 442 of the mount 420 is coupled within the second notch 5016 of the shoulder support member 4018. Specifically, the second side 442 comprises a pair of projections 460, 464, each with an aperture 468, 472 configured to receive a pivot pin 476, about which a biasing member, illustrated in the form of a two torsion springs 480A, 480A, is positioned. Other embodiments, such as the one illustrated in FIGS. 1A, 2A, and 18A include only one biasing mechanism, illustrated in FIG. 18 in the form of torsion springs 480. The ends of the pivot pin 476 are each received in the apertures 5020 of the second leg 4030 previously described and specifically shown in FIG. 18A, such that a pivoting axis B is defined generally perpendicular to the axis A. In the embodiment of FIGS. 54 and 55, a stop member 6069 extends through apertures 6070, 6071 in the respective projections 460, 464. The first side 438 of the mount 420 has a further aperture 484 that receives a cam member 488 with a cam surface 492. In the illustrated embodiment, the cam member 488 is coupled to the top surface 428 but in other embodiments may be integrally formed as one piece with the mount 420. As also illustrated in FIGS. 54-55, an actuating lever 500 includes an arm 504 and an engagement surface 508. A guiding member 512 is coupled to the actuating lever 500 and projects through an arcuate groove 6074 in a wall of the first leg 4026. A pivot pin 6072 extends through an aperture 520 of the actuating lever 500 to define a pivot axis parallel to the longitudinal axis A. The actuating lever 500 is rotatable about the pivot pin 6072 such that the engagement surface 508 can operatively engage and disengage the cam surface 492, as will be further described below. The actuating lever 500 is biased in a first position as illustrated in FIG. 50, such as with a biasing spring (not shown).

In additional or alternative embodiments, in lieu of a biasing spring 480 oriented about the pivot pin 476, a friction joint operative with the pivot pin 476 may pivotally secure the second side 442 of the mount 420 to the shoulder support member 4018. In such a case, an alternative or additional lever (not shown) is configured to move a wedge or similar member against a portion of the mount 420 to secure the mount at that position.

Referring to FIGS. 50 and 61-63, an alternative adjustable "wide grip" handle clamping assembly 7000 includes a support member 7004 having a tubular U-shaped body 7008 that has a first end 7012 and a second end 7016 on opposite sides of a central portion 7018. Each of first and the second ends 7012, 7016 of the body 7008 is received within and slidable relative to the outer cylindrical rods (shown in FIG. 24A) of the handles 18A in lieu of cylindrical rods 600A of FIG. 24A. Therefore, as discussed above with respect to FIGS. 23A and 24A, the are slideable relative to the respective ends 7012, 7016. The central portion 7018 of the body 7008 is received by and coupled to a clamping member 7020 that includes a body 7024 having a first opening 7028 and a second opening 7032. Each of the openings 7028, 7032 leads to a channel 7036, 7040, respectively. The channels 7036, 7040 each define an opposing clamping portion (FIG. 62). First and second release levers or actuators 7044, 7048 include threaded shafts 7052, 7056 that extend through passages 7060, 7064 and the two clamping portions of each channel 7036, 7040.

The body 852 of the auxiliary clamping assembly 850 is coupled to the body 7024 of the clamping member 7020. The auxiliary clamping assembly 850 is configured to receive one of the carbon fiber rods 22, 26 as discussed above.

With continued reference to FIGS. 50 and 61-63, the body 7024 is slidably coupled to the U-shaped body 7008 of the support member 7004 to change the position of the support member 7004 with respect to the main support assembly 4014.

In other embodiments the wide grip assembly may include the features of FIGS. 1A, 2A, and 31A or FIGS. 26-31, as discussed above. Alternatively, relevant portions of the handle 18 of FIGS. 23 and 24 may be substituted for the handle 18A.

During assembly of the embodiment of FIGS. 49-55, the carbon fiber rods 22, 26, 34, 38 are coupled to the first clamping assemblies 530, 534 and the first and the second handles 590, 594 are coupled to the carbon fiber rods 22, 26 as discussed above. Similarly, the counterweight assembly 30 is coupled to the second pair of carbon fiber rods 34, 38 as discussed above. If the cheeseplate mount assembly 1400 (FIG. 50) is used, it is alternatively coupled to the second pair of carbon fiber rods 34, 38 in a similar manner as described above with respect to coupling of the counterweight assembly 30.

The camera (not shown) that is mounted to the positioning member 6000 may be positioned relative to the shoulder support member 4018 along the longitudinal axis A. The positioning member 6000 may be moved forward or backward in the direction of the longitudinal axis A within the channel 4050 along the surface 4066 of the shoulder support member 4018. In particular, pivoting the lever 5078 moves the screw 5082 up or down along the threaded aperture 5070. Pivoting the lever 5078 in a first direction moves the cam member 5066 upward, which reduces the frictional interaction between the tapered surface 5074 and the first side 6012 of the positioning member 6000, thereby allowing the positioning member 6000 to slide relative to the shoulder support member 4018 along the longitudinal axis A. Pivoting the lever 5078 in a second direction moves the cam member 5066 downward against the first side 6012 of the positioning member 6000, which increases the frictional force against the first side 6012 by the tapered surface 5074 to increase the friction between the two and tends to retain the positioning member 6000 relative to the shoulder support member 4018.

The clamping action of the pivoting lever 5078 is adjustable as well. Due to the twelve point recess 5086, the pivoting lever 5078 can be positioned on the head 5090 of screw 5082 in different positions such that the range of movement of the pivoting lever 5078 may be adjusted. In other words, the position where the lever 5078 is tight or loose may be changed by changing the position of the lever 5072 relative to the screw 5082. Adjusting the range of movement of the pivoting lever 5072 controls the distance the screw 5082 can be threaded relative to the cam member 5066.

The fastener 6028 prevents the positioning member 6000 from being removed from the shoulder support member 4018, as it acts as a stop surface when it comes in contact with opposite ends of the elongate slot 4062. A user can remove positioning member 6000 by removing the fastener 6028 and sliding the positioning member 6000 completely out of the channel 4050.

Additionally or alternatively, the camera can be further located frontward or rearward along the longitudinal axis A by changing the position of the fasteners 258, 262 relative to the aperture 6050 of the positioning member 6000 in a similar manner as discussed above with respect to FIGS. 1-38.

The slots 586 in the clamping assemblies 530, 534 are slidable along the projections 5000, 5004 on the shoulder support member 4018 in order to vertically position the clamping assemblies 530, 534. It is desired in the industry to maintain a distance of 85 mm between a center of the camera lens and a center of the rods 22, 26. Therefore, the clamping assemblies 530, 534 are adjustable relative to the main support assembly 4014 to ensure that a distance of 85 mm can be maintained between the rods 22, 26 and any camera lens.

The third handle 1028 can also be laterally positioned relative to the longitudinal axis A as discussed above.

Figure 53:
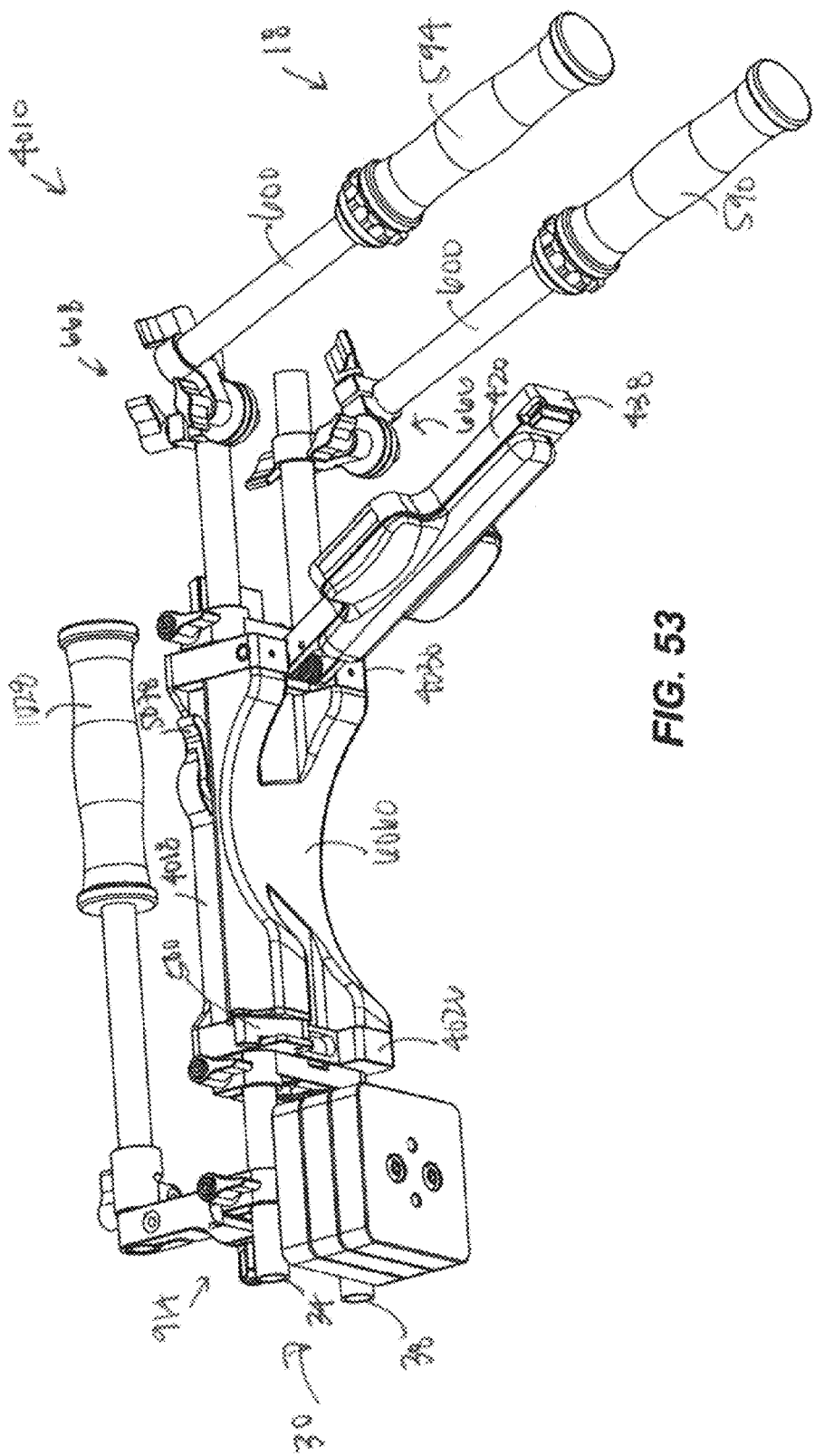

Like the camera rigs of FIGS. 1-38, in operation, certain additional features of the camera rig 4010 can be manipulated based on the changing needs of the user. The camera rig 4010 may be used with a tripod (not shown) in a first position (FIGS. 49, 51, 52) or may be stabilized by the user's shoulder in a second position (FIGS. 50 and 53). To facilitate this change in function, the mount 420 is pivotable between the illustrated first and second positions.

Figure 60:
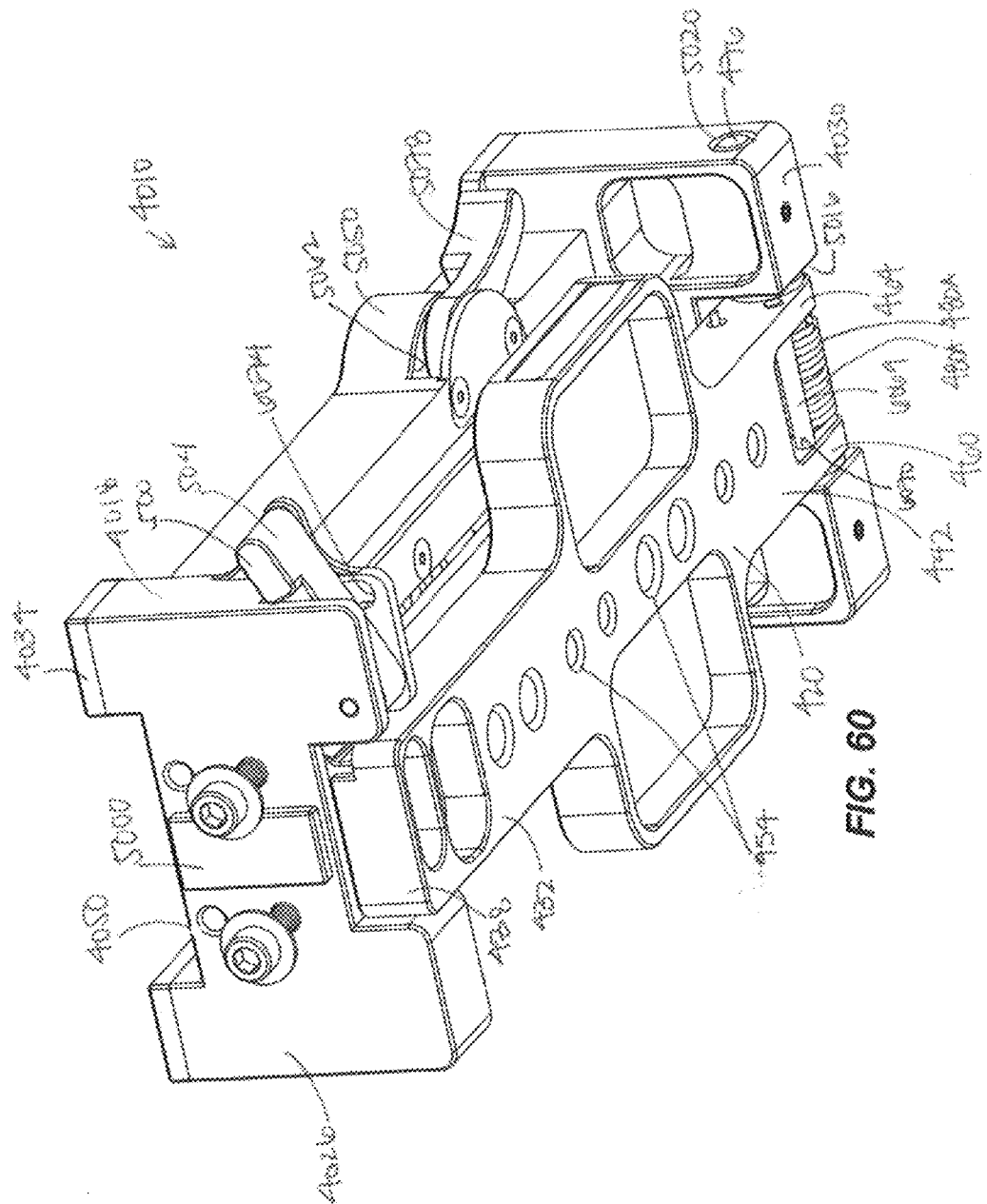
FIG. 60 is another perspective view of the main support assembly illustrated in FIGS. 54 and 55.
Figure 63:
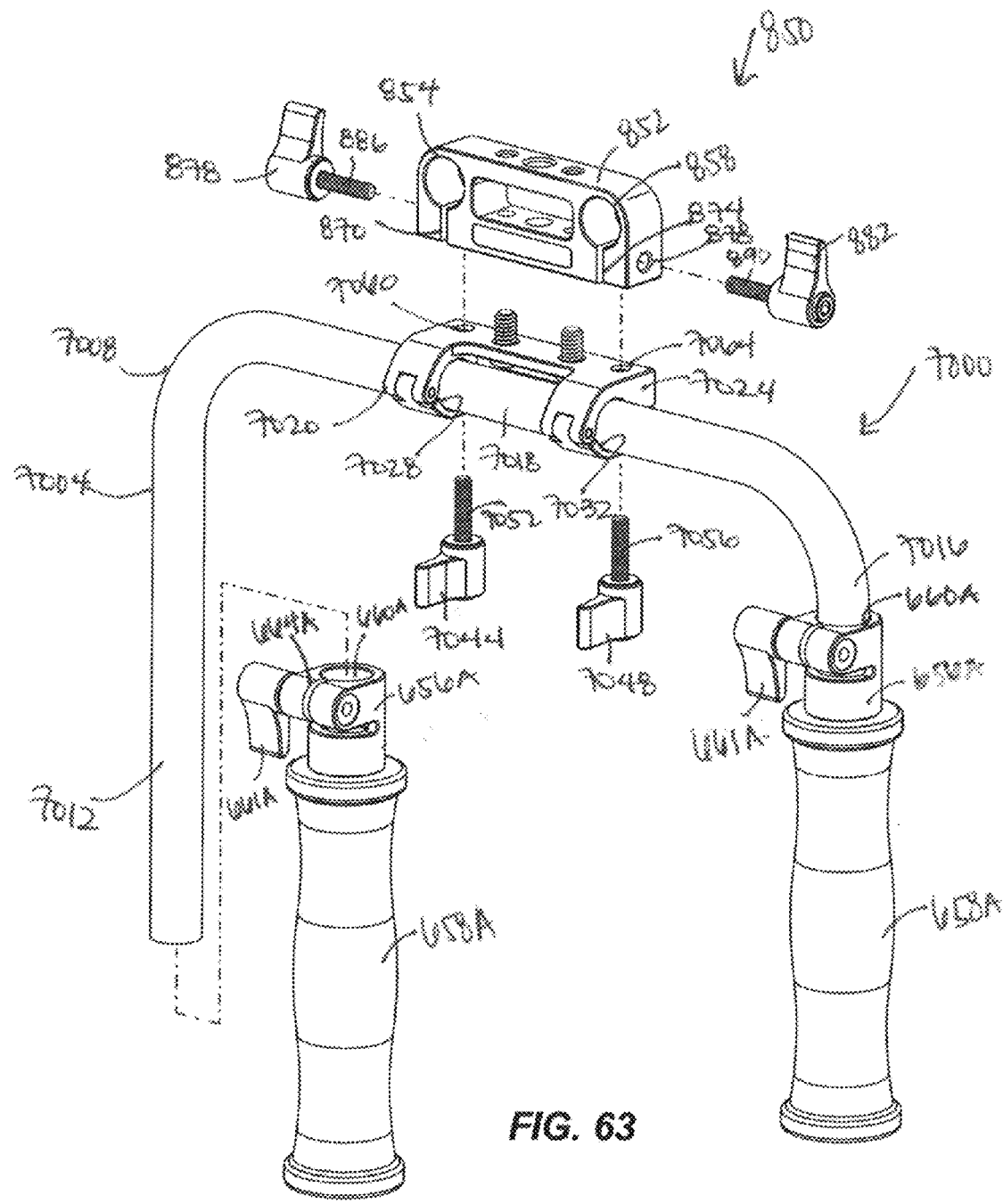
FIG. 63 is a partial exploded view of the handle assembly of FIGS. 61 and 62.

In the first position, the first side 438 of the mount 420 is received and secured within the first notch 5008 of the first leg 4026 such that the cam member 488 is positioned between the mount 420 and the shoulder support structure 4018 (see FIG. 60). When in the first position, the actuating lever 500 maintains a substantially upward force on the cam member 488. In particular, the engagement surface 508, which is biased into the first position, engages the cam surface 492 of the cam member 488, which retains the mount 420 adjacent the pad 6060. In this position, the bottom surface 432 of the mount 420 is flush with the bottom of the shoulder support member 4018 and the apertures 454 extending through the mount 420 are accessible to be coupled to a support surface or interface of a tripod (not shown).

To move the mount 420 from the first position to the second position, a user depresses the arm 504, which pivots the engagement surface 508 out of contact with the cam surface 492 of the cam member 488. The mount 420 is biased to the second position by the biasing member 480 such that releasing the engagement surface 508 permits the first side 438 of the mount 420 to swing downwardly and remain generally as shown in FIGS. 50 and 53. One of the torsion springs 480A is coupled to the alignment projection 5004 and the other torsion spring 480A is coupled to the mount 420 such that the torsion springs 480A, 480A can control the movement of the mount 420. The stop member 6069 limits the rotation of the mount 420 when in the second position. In particular, movement of the mount 420 ceases when the stop member 6069 contacts the alignment projection 5004. The alignment projection 5004 is removably coupled to the shoulder support member 4018 to change the vertical position thereof such that a maximum rotation of the mount 420 can be adjusted. With the mount 420 in the second position, the pad 6060 is accessible to be supported by a user's shoulder and the pad 446 is positioned to be adjacent to the user's front torso (e.g., chest) for mobile use of the attached camera. When use of the tripod is necessary, the mount 420 can be moved back to the first position by manually forcing it against the bias of the biasing member 480 to the first position. The user transforms the rig 4010 from shoulder mountable to tripod mountable by swinging the mount 420 into or out of place.

In an embodiment with a friction joint in lieu of a biasing spring 480A, 480A, the friction developed by the friction joint is sufficient to retain the mount 420 in the first position and in the second position. In such a case, the alternative or additional lever moves a wedge or wedge member against the mount 420, which must be retracted in order to manually move the mount 420 into the second or open position.

When assembled, the first and the second handles 590, 594 and/or the third handle 1028 of the counterweight assembly 30 may be adjusted as well as discussed above. Additionally, the first and the second handles 590A, 594A of the handle assembly 18A can be pivotably adjusted relative to the carbon fiber rods 22, 26 as discussed above.

Various features and advantages of the invention are set forth in the following claims.

What is claimed is:

1. A support assembly for a camera rig, the support assembly comprising:
   a frame including a first end and a second end;
   a positioning member movably coupled to the frame and configured to removably secure a camera; and
   a support member presenting a mounting surface and pivotably coupled to the frame adjacent the first end or the second end,
   wherein the support member includes a first side and a second side, wherein the first side is pivotably coupled to the frame adjacent one of the first end and the second end, the support member pivotable between a first position in which the second side is coupled to the frame adjacent to the other of the first end and the second end and a second position in which the second side is uncoupled from the frame.

2. The support assembly of claim 1, wherein the mounting surface is configured to secure the support assembly to an opposing surface when the support member is in the first position.

3. The support assembly of claim 2, wherein the opposing surface is a camera tripod mount.

4. The support assembly of claim 1, wherein the support assembly is configured to be supported by the shoulder of a user when the support member is in the second position.

5. The support assembly of claim 4, wherein the support member presents a contact surface opposite the mounting surface when the support member is in the second position, the contact surface positioned for contacting the front torso of the user.

6. The support assembly of claim 1, wherein the frame includes a channel configured to at least partially receive the positioning member.

7. The support assembly of claim 6, wherein the channel defines a longitudinal axis along which the positioning member is configured to move, the channel including a groove extending parallel to the longitudinal axis along at least one side, wherein the positioning member includes a tapered surface that is matingly received within and translatable along the groove of the channel.

8. The support assembly of claim 1, wherein the frame defines a longitudinal axis along which the positioning member is configured to move, and wherein the support member is pivotable about an axis perpendicular to the longitudinal axis.

9. The support assembly of claim 1, wherein the frame includes a first pad member and the support member includes a second pad member configured to mate with the first pad member.

10. A camera rig comprising:
    a frame having a first leg and a second leg;

a positioning member translatable along the frame, wherein the positioning member is configured for affixing a camera thereto;

a support member pivotably coupled to the frame at one of the first and second legs, the support member securable to a surface;

a counterweight assembly couplable to the first leg or the second leg of the frame; and a handle assembly couplable to the other of the first leg or the second leg of the frame, the handle assembly including first and second handles retractable and extendable in a telescoping manner;

wherein the support member is pivotable between a first position in which the support member is additionally coupled to the other one of the first and the second legs and a second position in which the support member is uncoupled from the other one of the first and the second legs.

11. The camera rig of claim 10, wherein the counterweight assembly and the handle assembly are each couplable to the frame via at least one carbon fiber rod.

12. The camera rig of claim 10, wherein the support member is configured to secure the camera rig to a surface when the support member is in the first position.

13. The camera rig of claim 10, wherein the camera rig is configured to be supported by the shoulder of a user when the support member is in the second position.

14. The camera rig of claim 13, wherein the support member presents a contact surface when the support member is in the second position, the contact surface positioned for contacting the front torso of the user.

* * * * *